United States Patent
Wang et al.

(10) Patent No.: US 10,074,371 B1
(45) Date of Patent: Sep. 11, 2018

(54) VOICE CONTROL OF REMOTE DEVICE BY DISABLING WAKEWORD DETECTION

(71) Applicant: Amazon Technologies, Inc., Seattle, WA (US)

(72) Inventors: Peng Wang, Kirkland, WA (US); Pathivada Rajsekhar Naidu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/458,628

(22) Filed: Mar. 14, 2017

(51) Int. Cl.
*G10L 15/00* (2013.01)
*G10L 15/22* (2006.01)
*G10L 15/18* (2013.01)
*G10L 15/30* (2013.01)
G10L 15/08 (2006.01)
H04M 7/00 (2006.01)

(52) U.S. Cl.
CPC .......... *G10L 15/22* (2013.01); *G10L 15/1815* (2013.01); *G10L 15/30* (2013.01); *G10L 2015/088* (2013.01); *G10L 2015/223* (2013.01); *H04M 7/006* (2013.01)

(58) Field of Classification Search
CPC ... G10L 15/08; G10L 2015/088; G10L 15/22; G10L 2015/223
USPC ........................................ 704/231, 275, 251
See application file for complete search history.

(56) References Cited

U.S. PATENT DOCUMENTS

| | | | | |
|---|---|---|---|---|
| 7,117,159 | B1 * | 10/2006 | Packingham | G10L 13/00 704/275 |
| 8,706,827 | B1 * | 4/2014 | Noble | G10L 13/027 704/9 |
| 8,811,602 | B2 * | 8/2014 | Khanduri | H04M 9/082 379/406.06 |
| 8,938,394 | B1 * | 1/2015 | Faaborg | G06F 3/167 704/270 |
| 9,691,378 | B1 * | 6/2017 | Meyers | G10L 15/08 |
| 2007/0032225 | A1 * | 2/2007 | Konicek | H04M 1/72513 455/417 |
| 2009/0112602 | A1 * | 4/2009 | Alfred | H04L 12/2818 704/273 |
| 2011/0274293 | A1 * | 11/2011 | Yue | H04M 1/60 381/107 |
| 2013/0216056 | A1 * | 8/2013 | Thyssen | H04M 9/082 381/66 |
| 2014/0195247 | A1 * | 7/2014 | Parkinson | G10L 21/06 704/275 |

(Continued)

*Primary Examiner* — Shaun A Roberts
(74) *Attorney, Agent, or Firm* — Pierce Atwood LLP

(57) ABSTRACT

A system configured to enable remote control to allow a first user to provide assistance to a second user. The system may receive a command from the second user granting remote control to the first user, enabling the first user to initiate a voice command on behalf of the second user. In some examples, the system may enable the remote control by treating a voice command originating from the first user as though it originated from the second user instead. For example, the system may receive the voice command from a first device associated with the first user but may route the voice command as though it was received by a second device associated with the second user. To enable this functionality, during a remote control session the first device may disable wakeword detection so that the voice command is correctly routed to the second device.

23 Claims, 36 Drawing Sheets

(56) References Cited

U.S. PATENT DOCUMENTS

| | | | |
|---|---|---|---|
| 2014/0337018 A1* | 11/2014 | Samuel | H03G 3/32 |
| | | | 704/205 |
| 2015/0088514 A1* | 3/2015 | Typrin | G06F 3/167 |
| | | | 704/249 |
| 2015/0154976 A1* | 6/2015 | Mutagi | H04L 12/281 |
| | | | 704/275 |
| 2015/0170645 A1* | 6/2015 | Di Censo | G10L 15/22 |
| | | | 704/275 |
| 2015/0271341 A1* | 9/2015 | Kleiner | H04W 12/06 |
| | | | 455/411 |
| 2016/0277588 A1* | 9/2016 | Jang | H04M 9/082 |

* cited by examiner

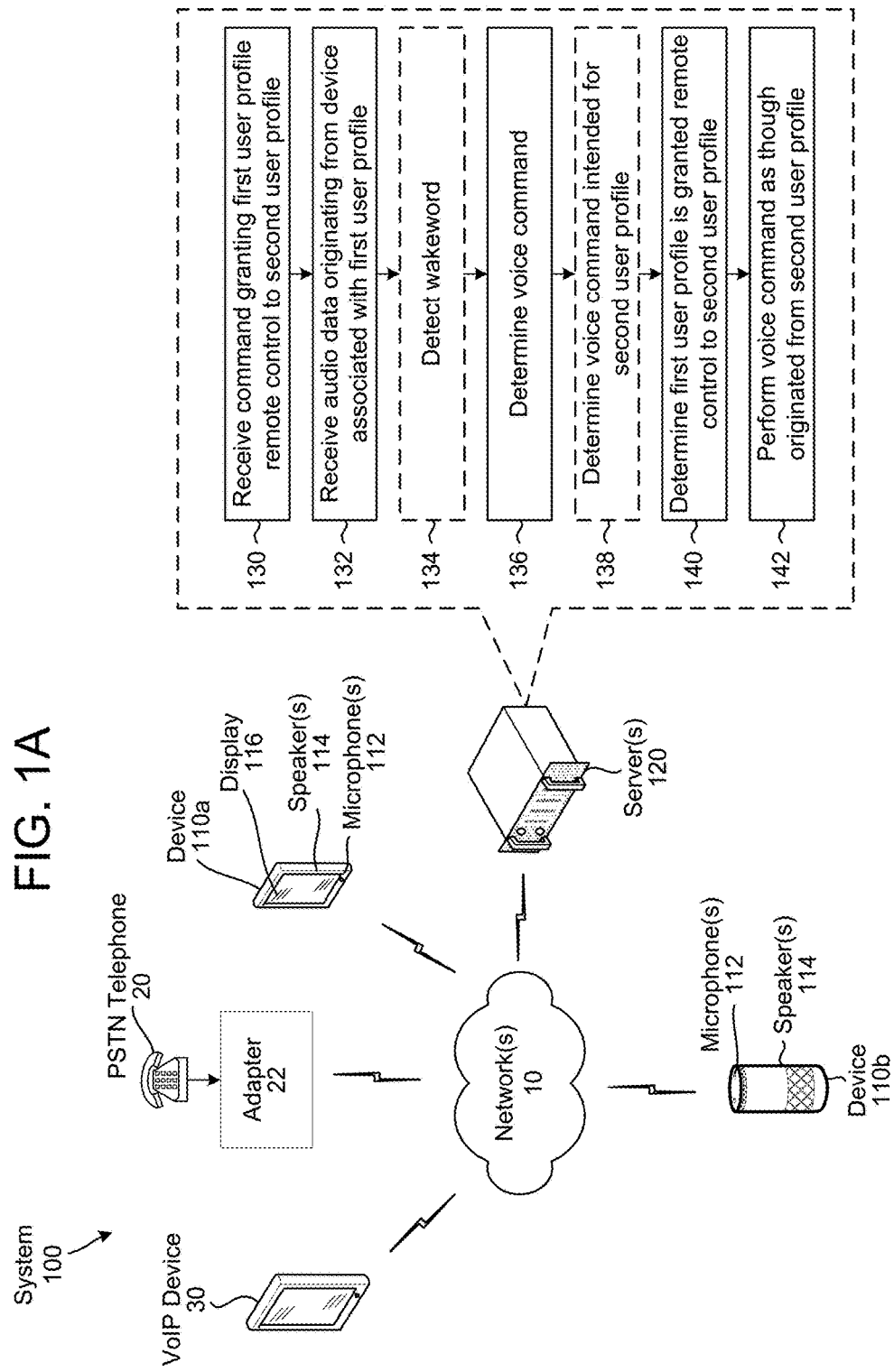

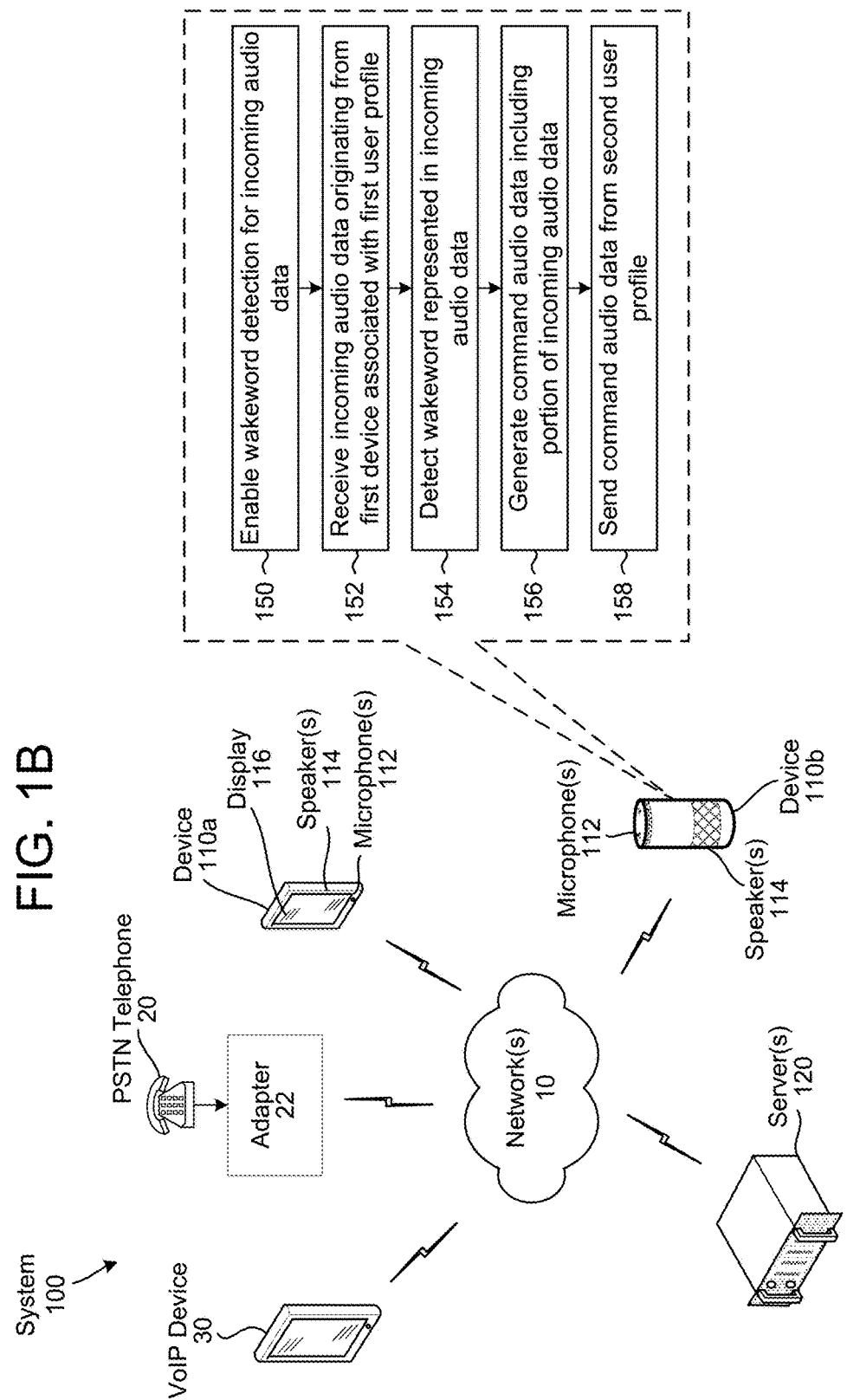

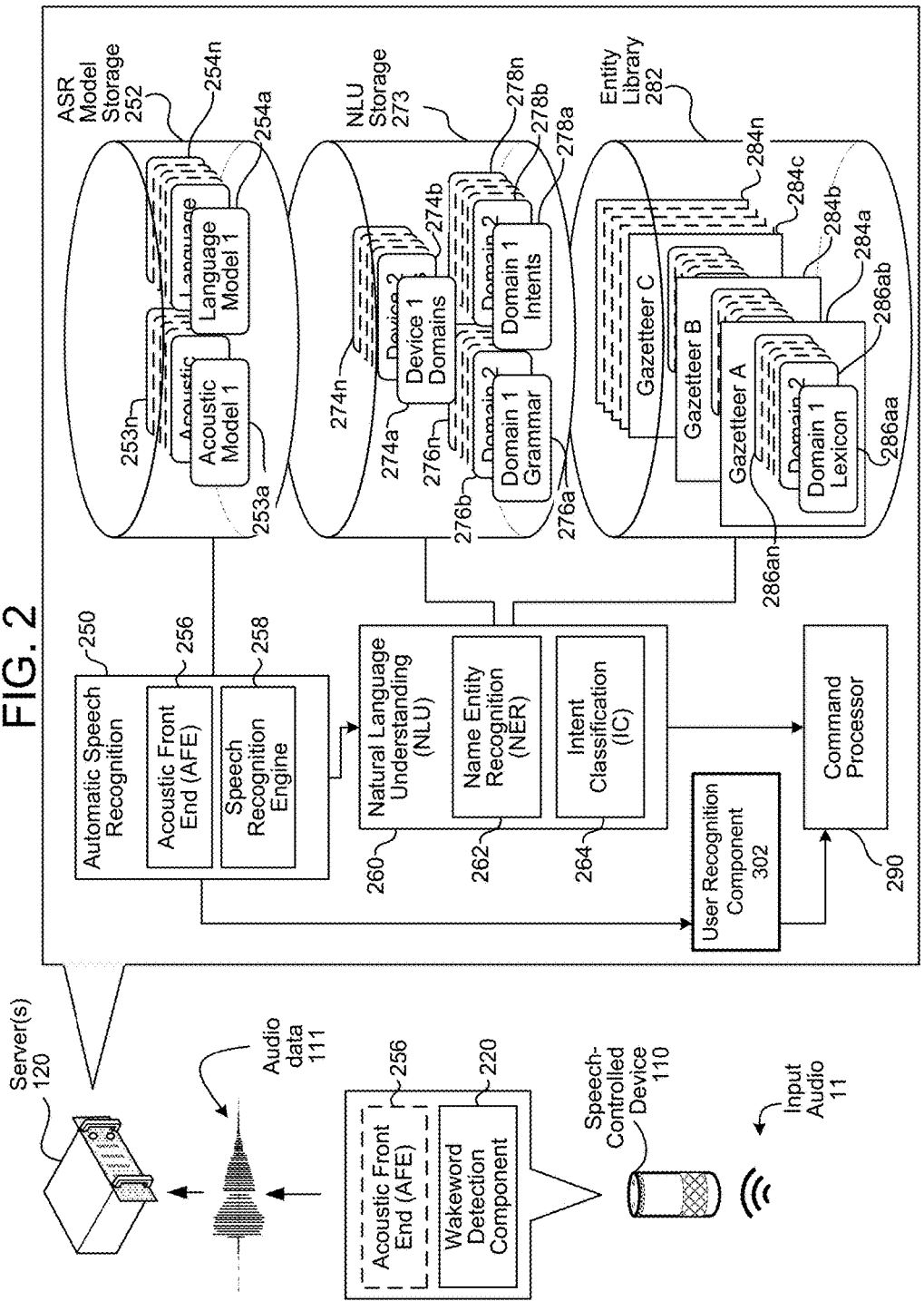

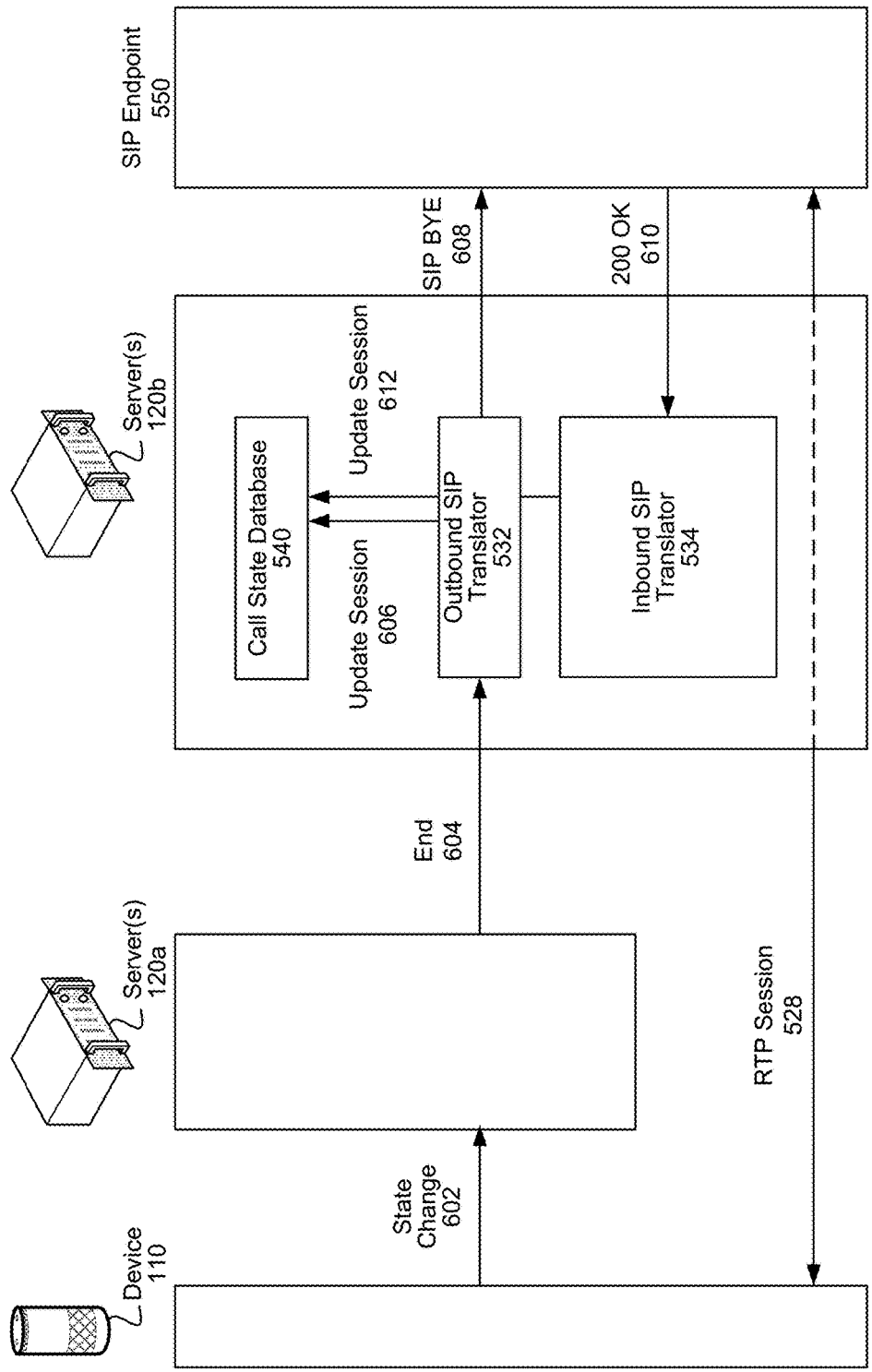

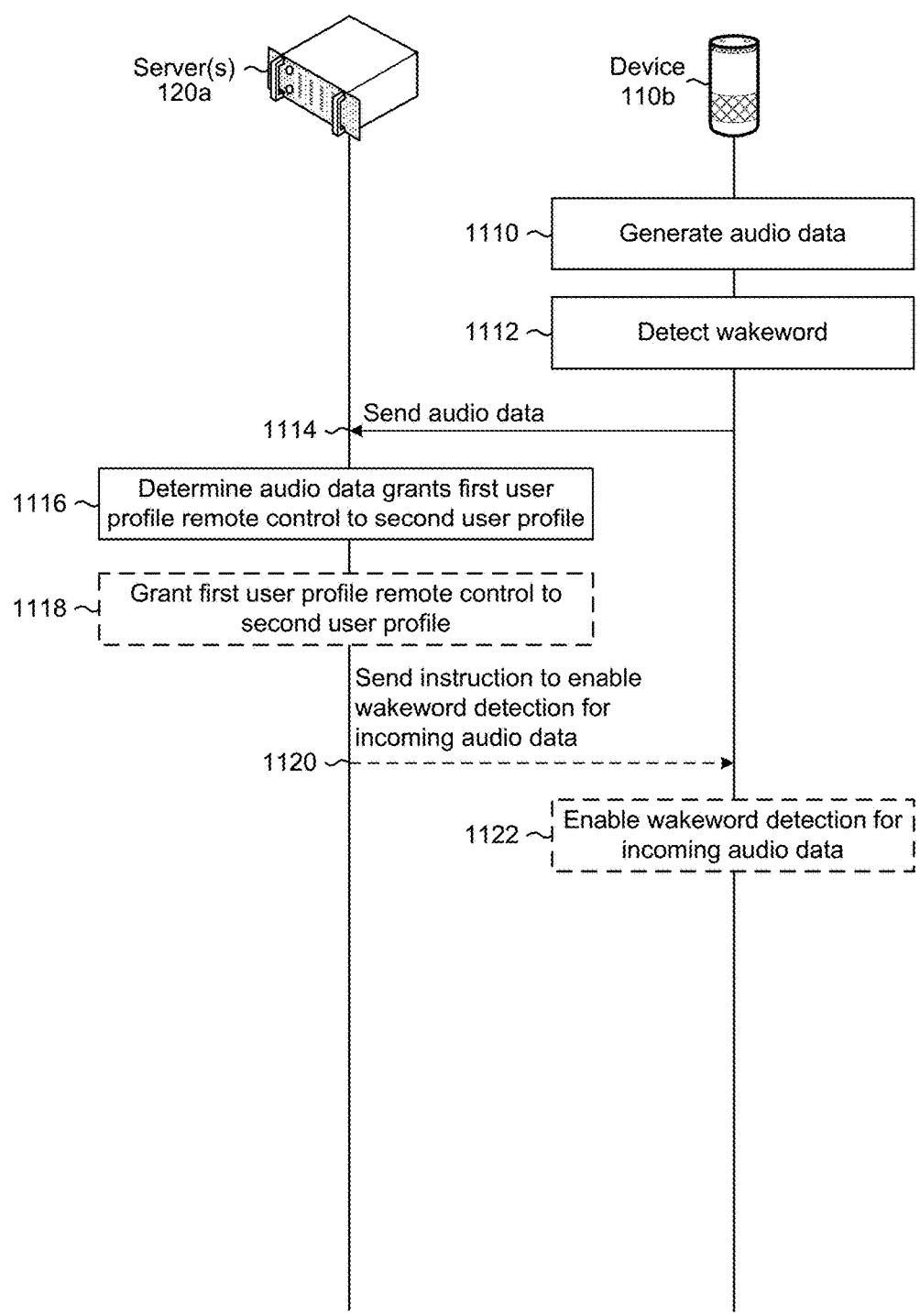

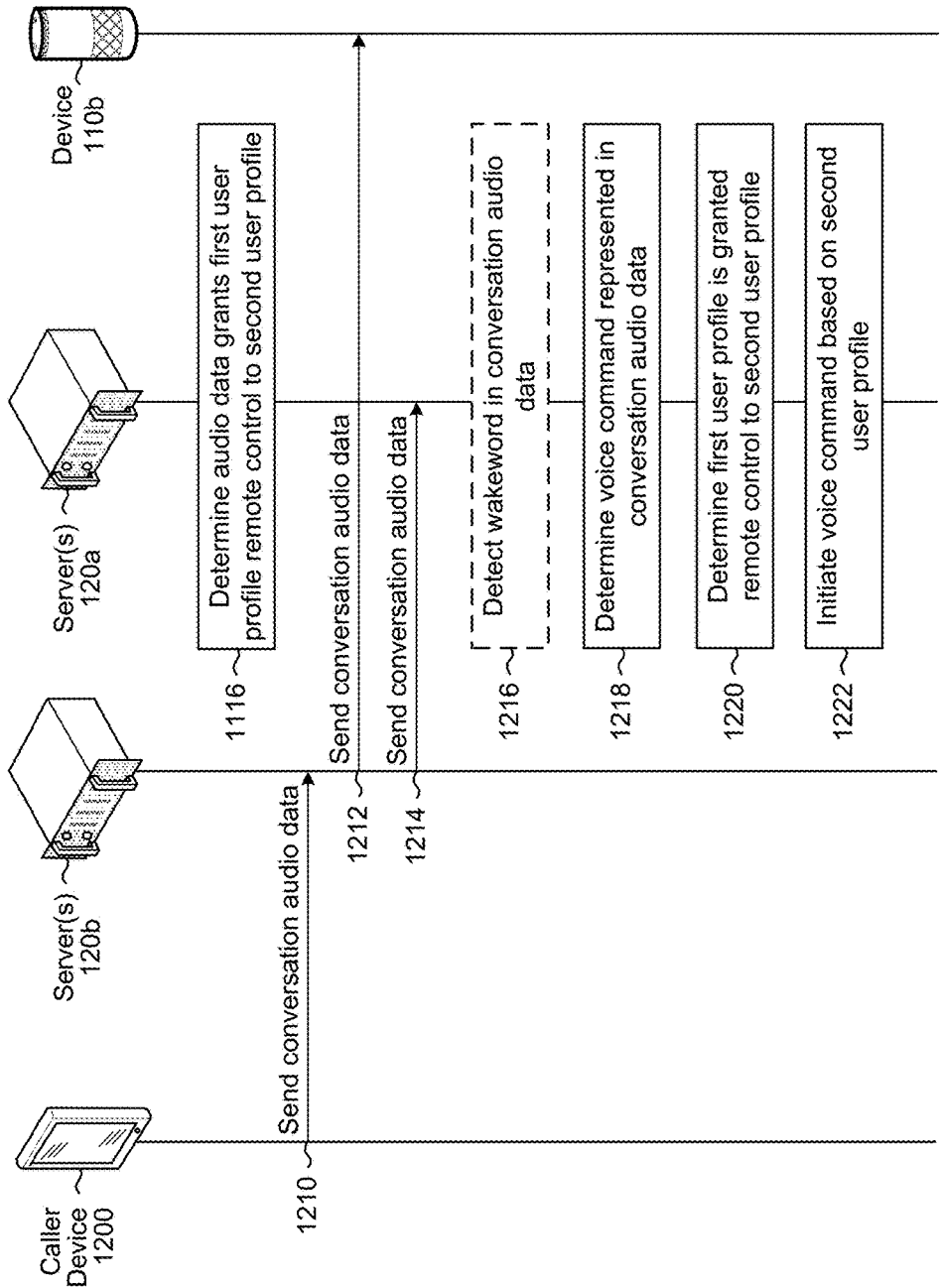

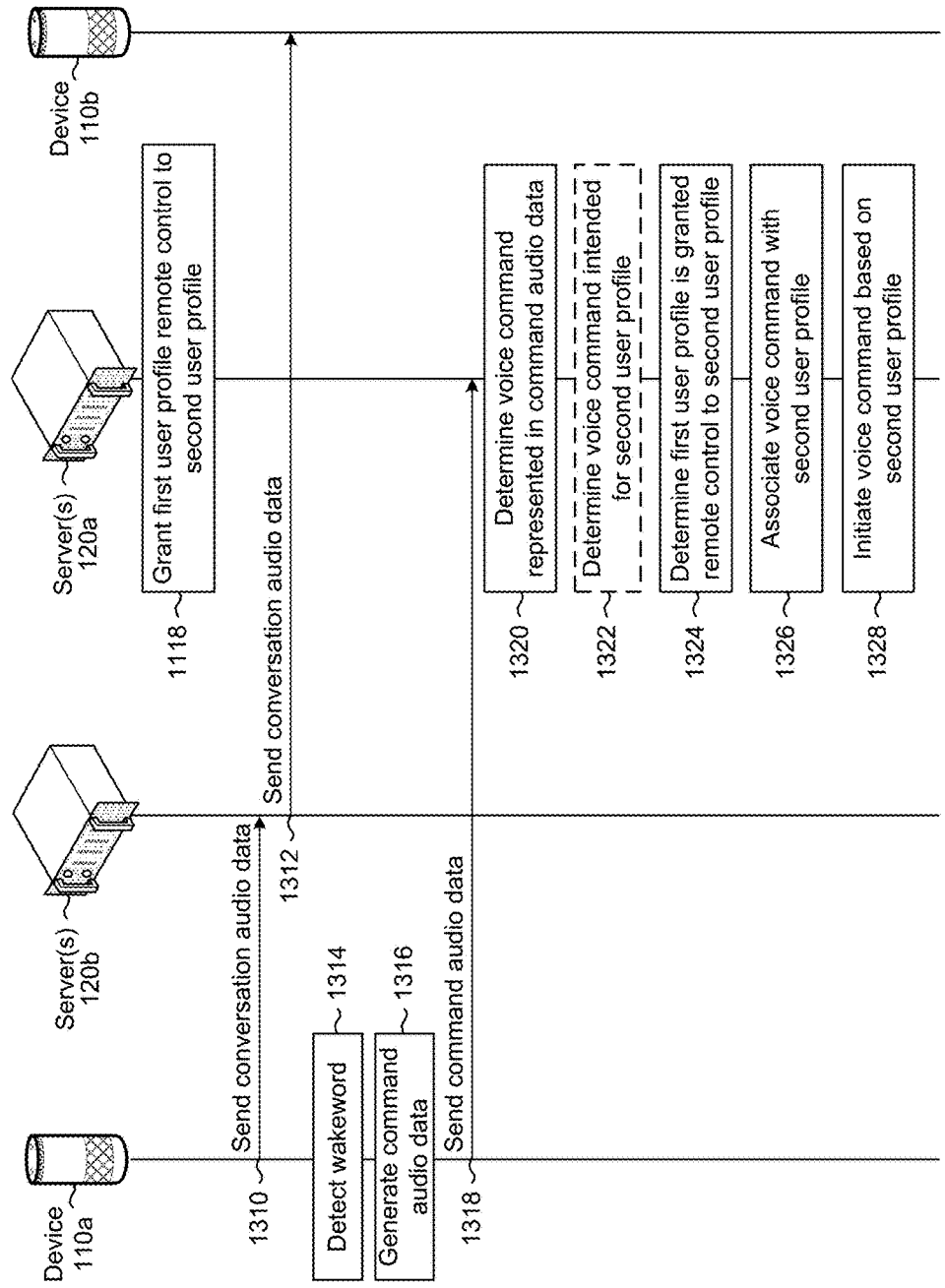

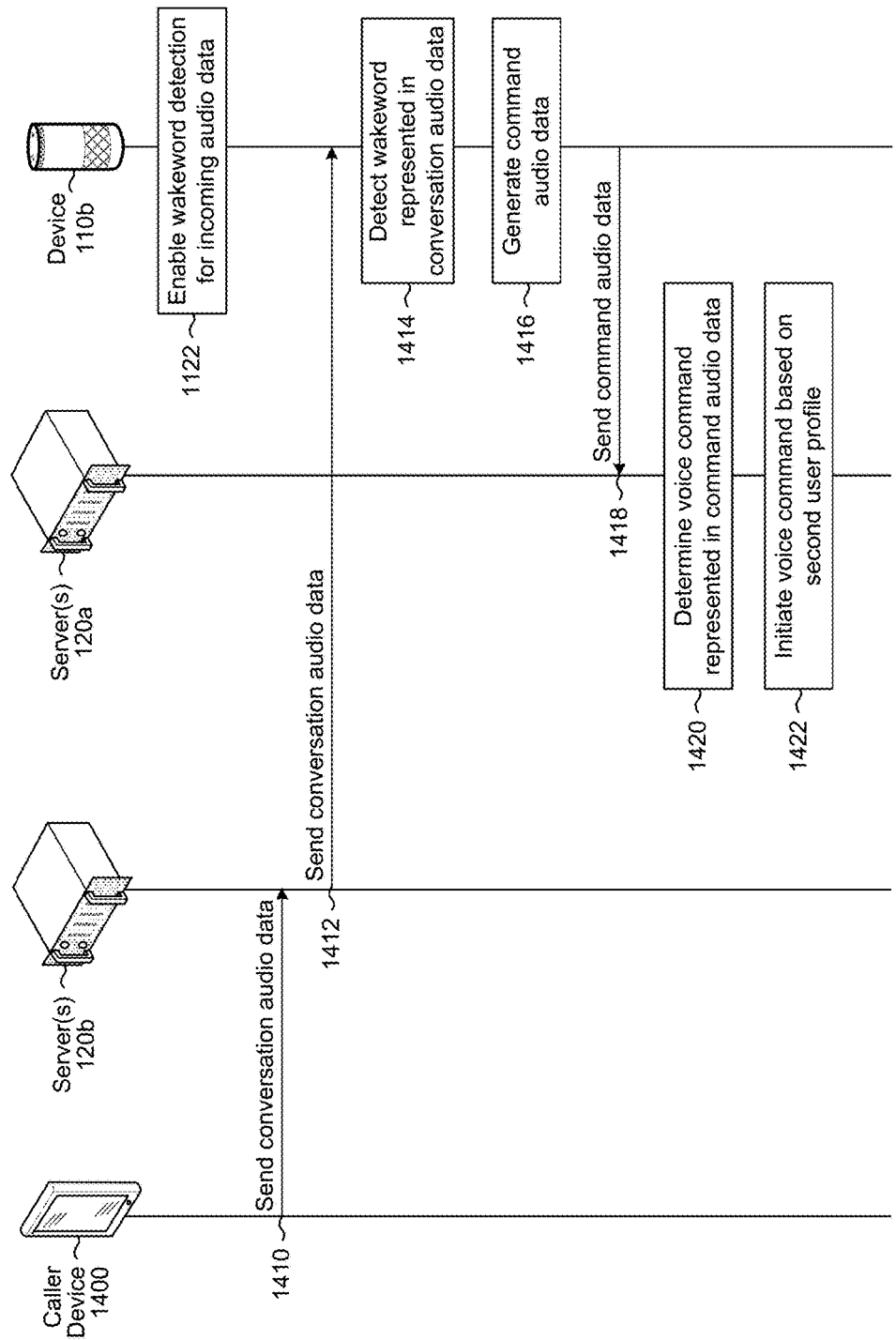

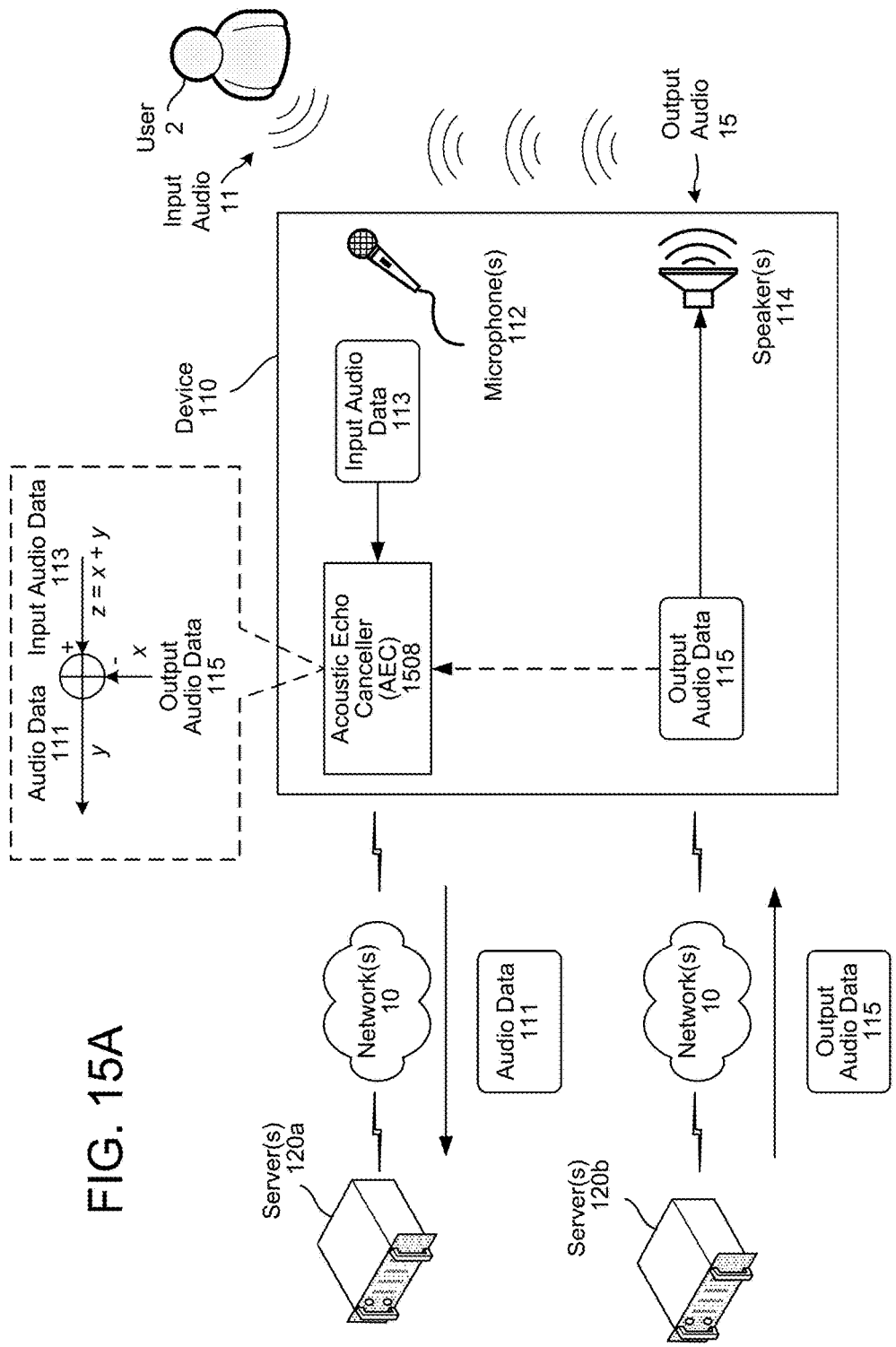

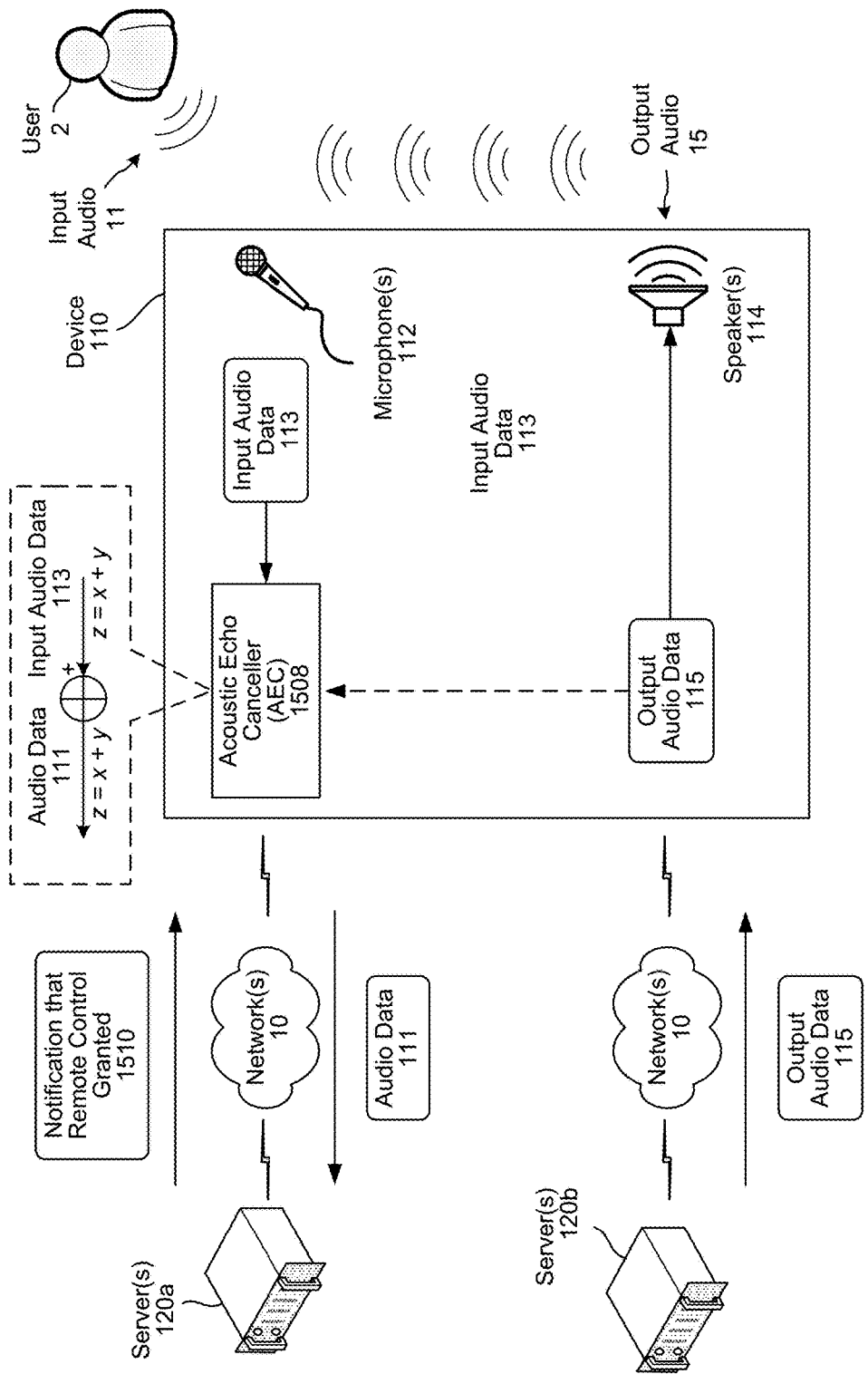

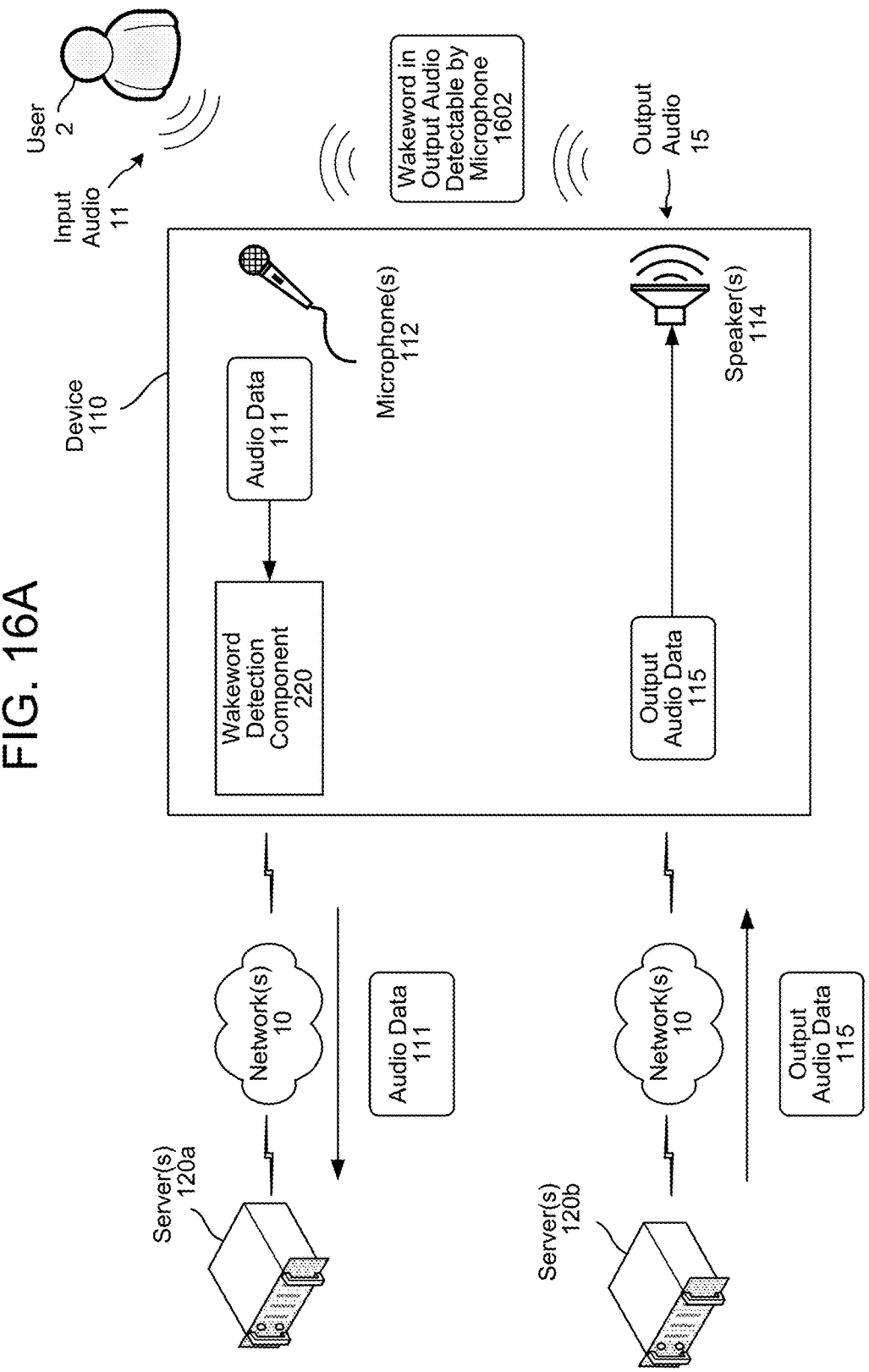

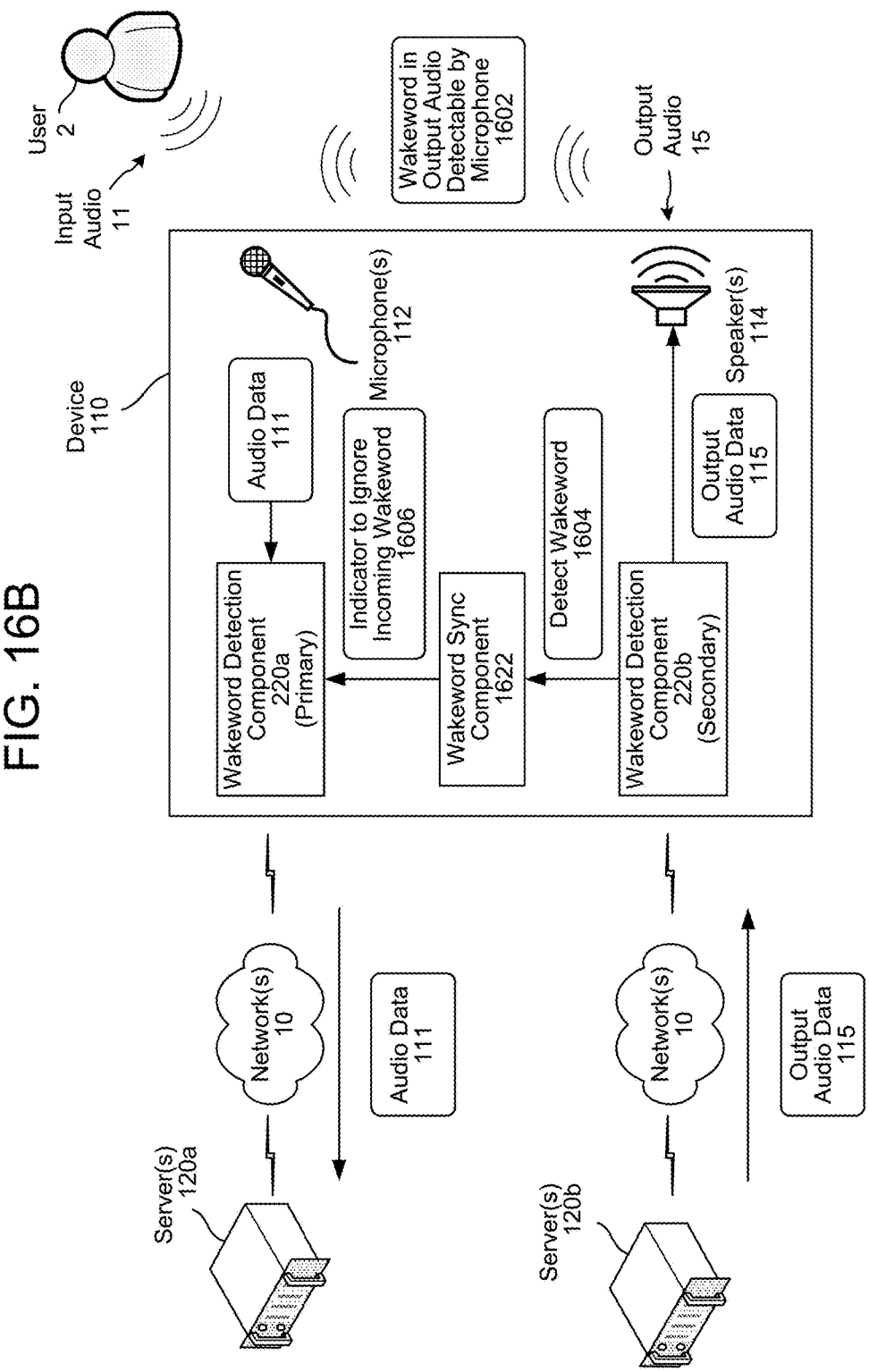

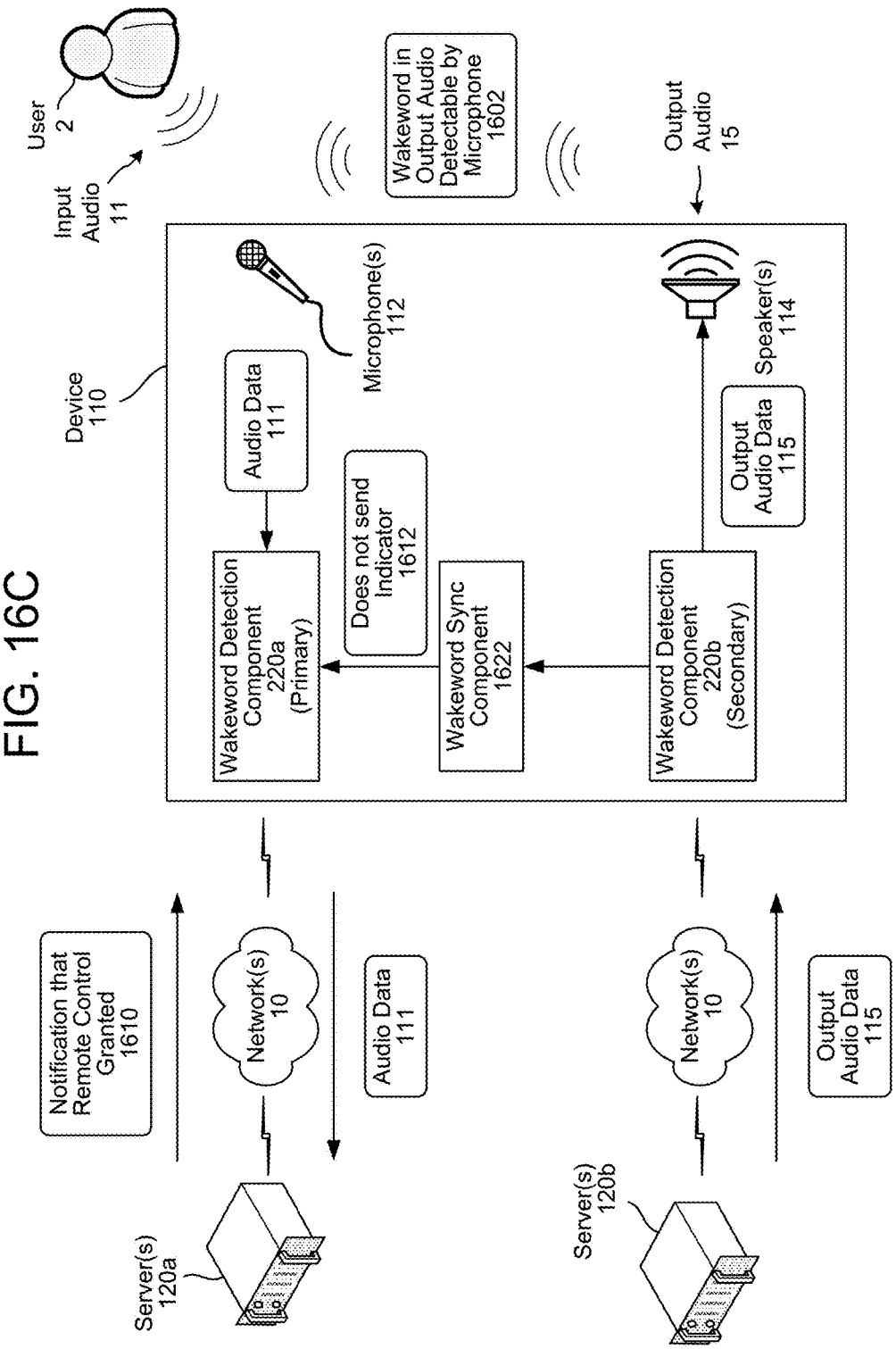

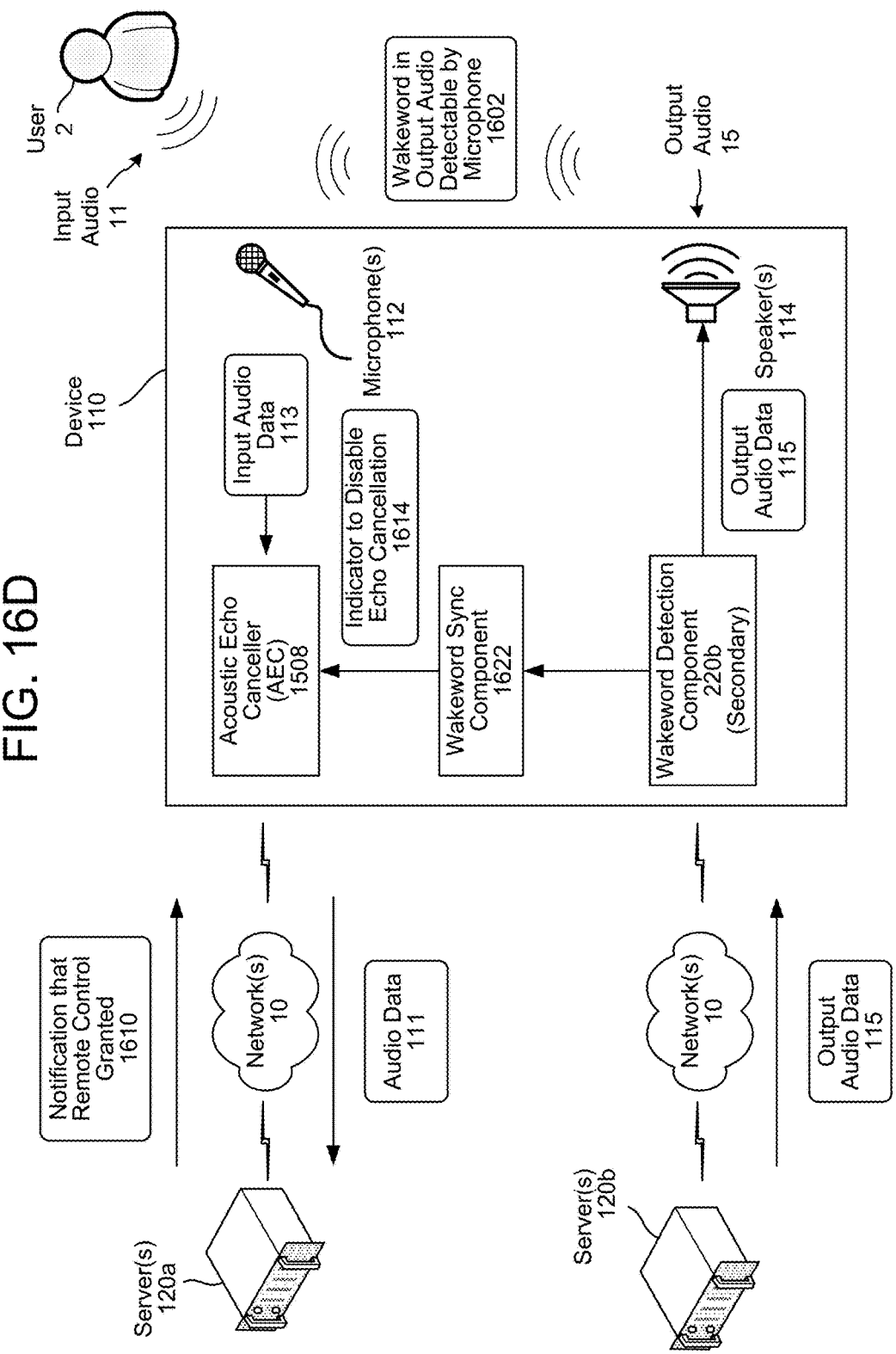

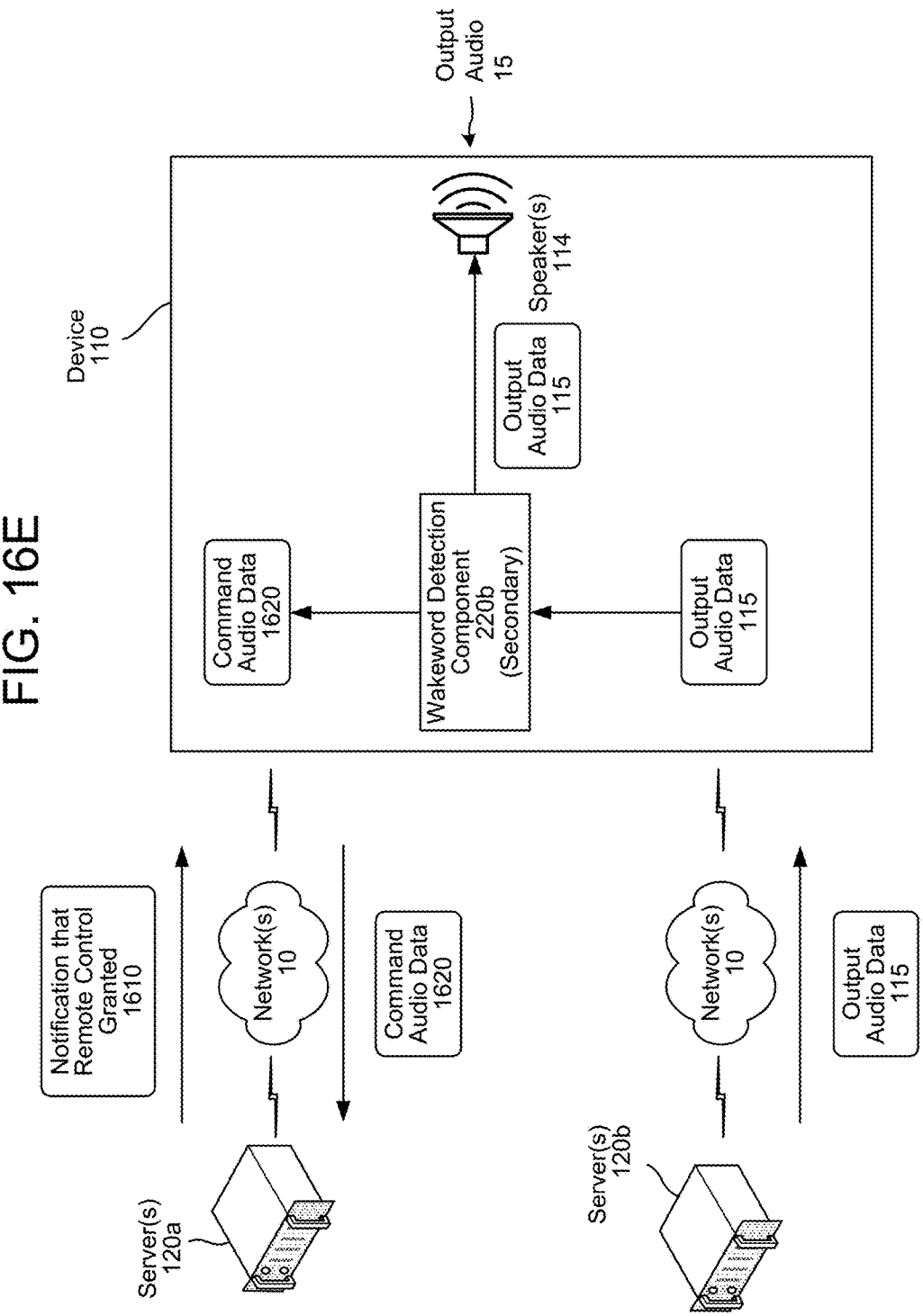

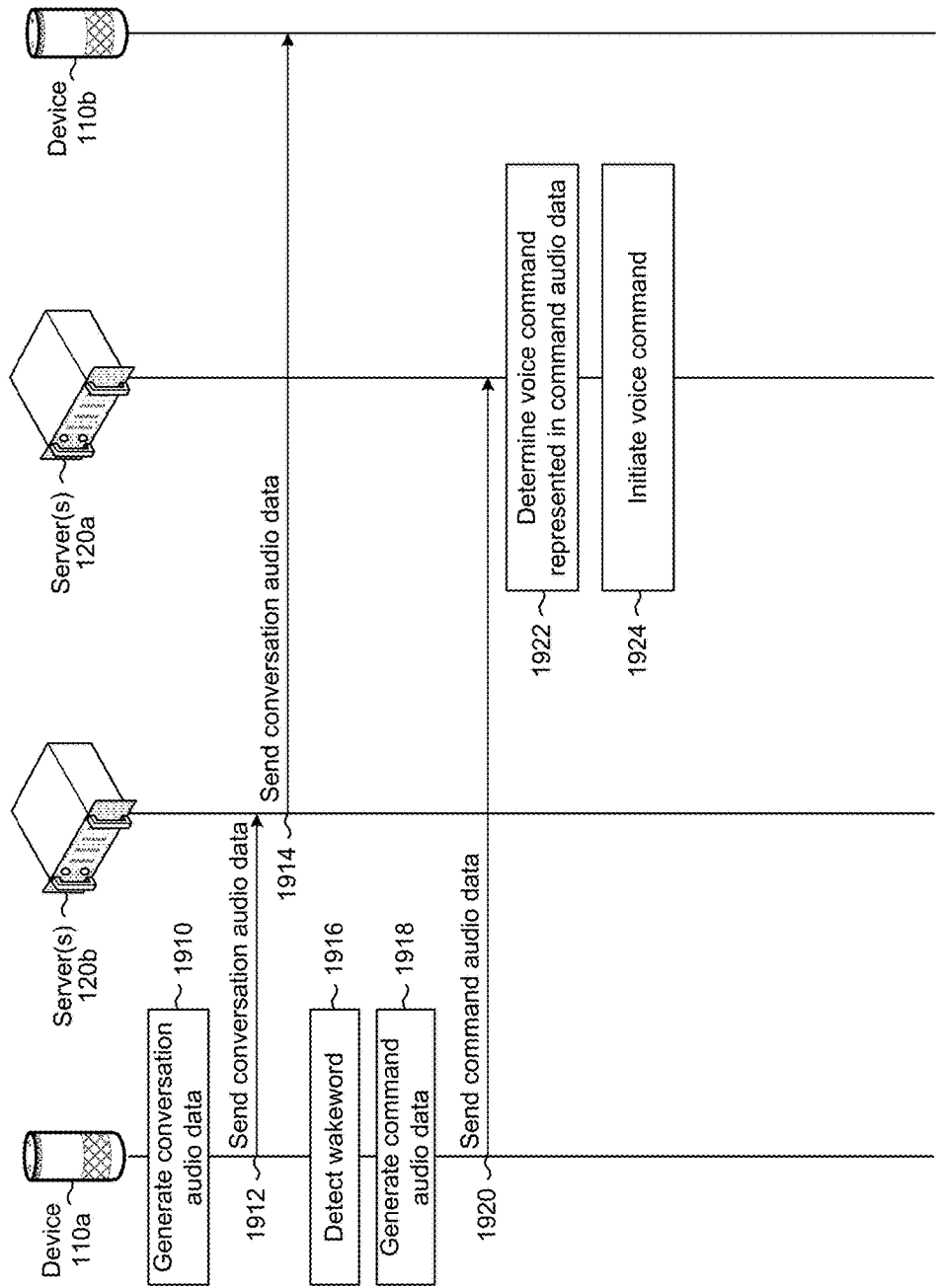

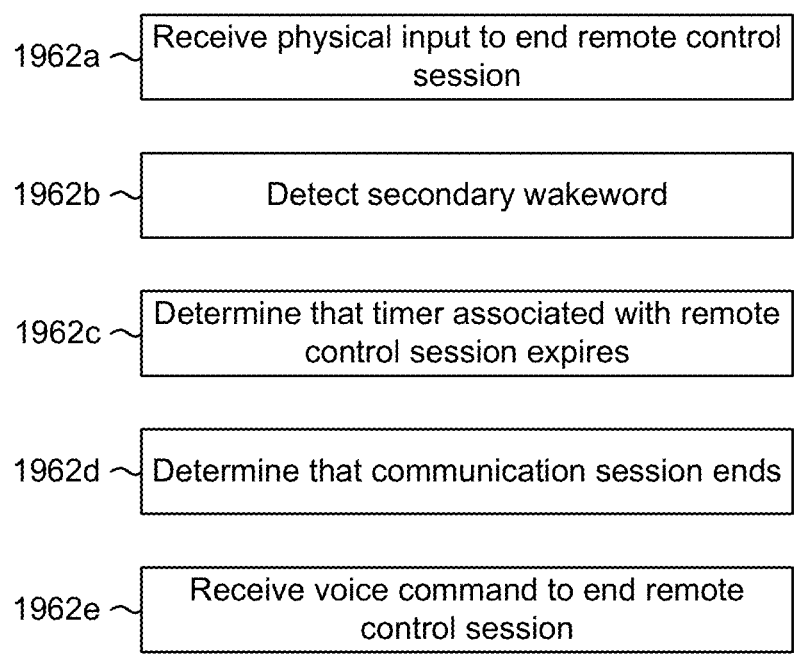

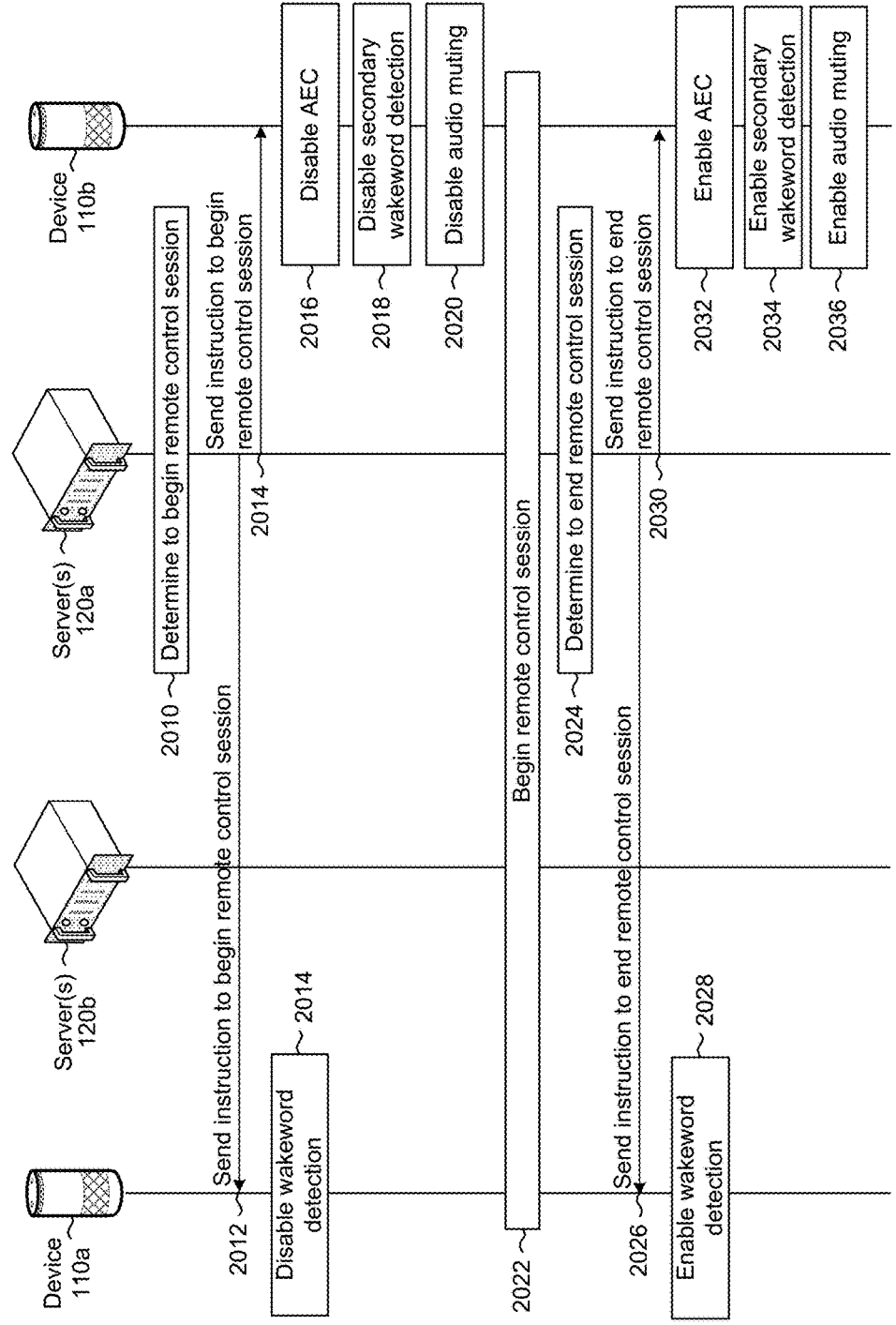

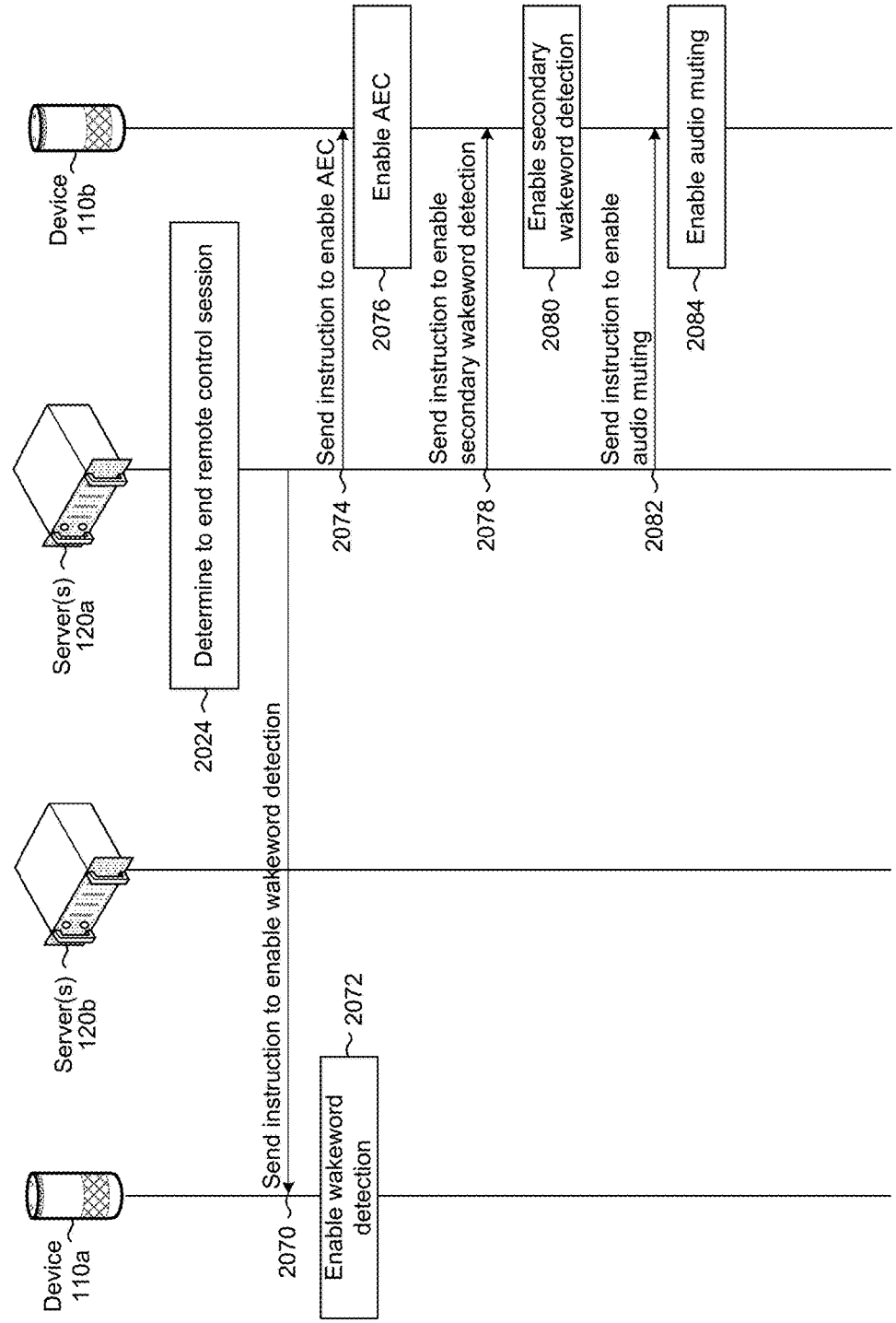

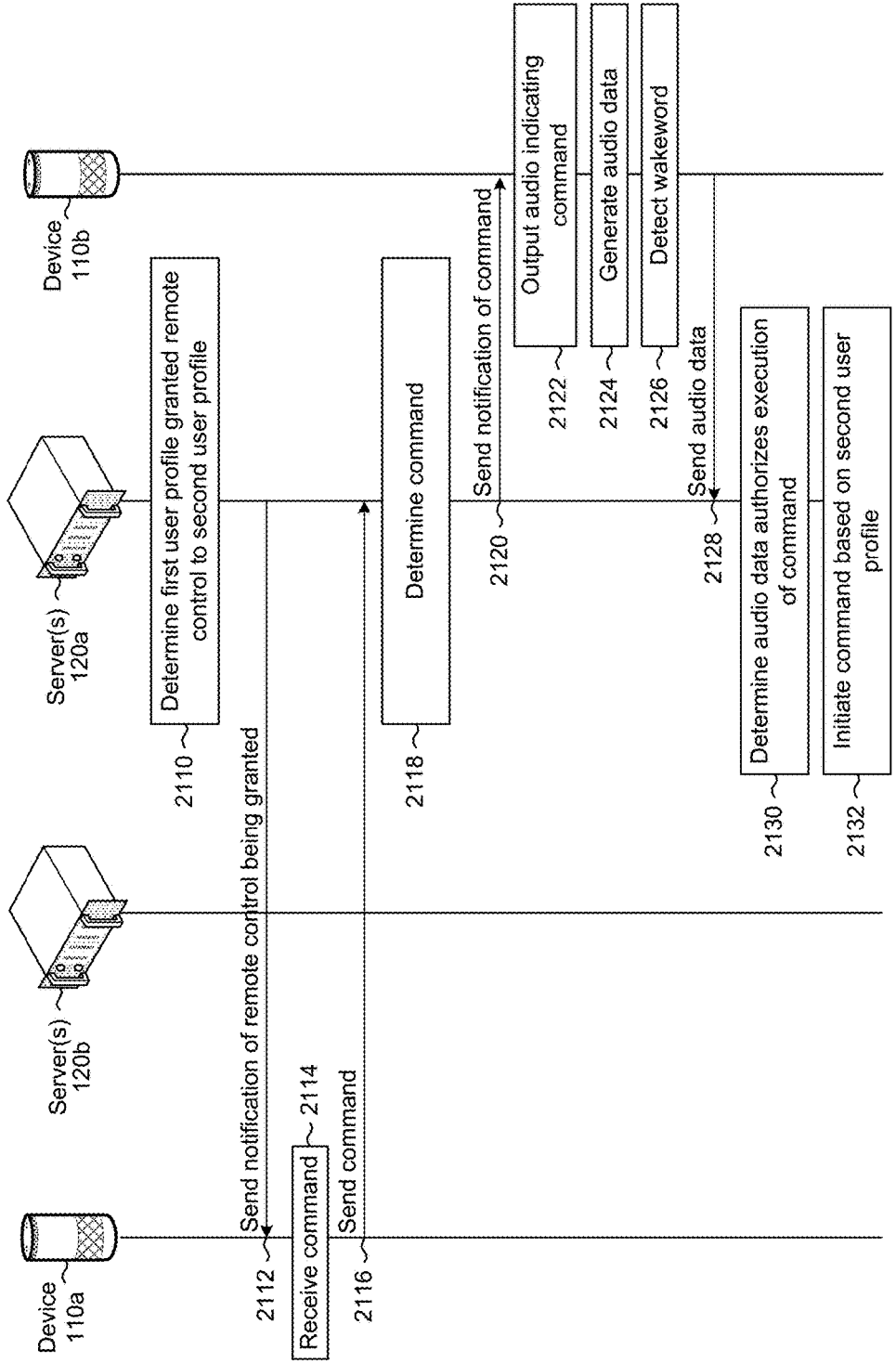

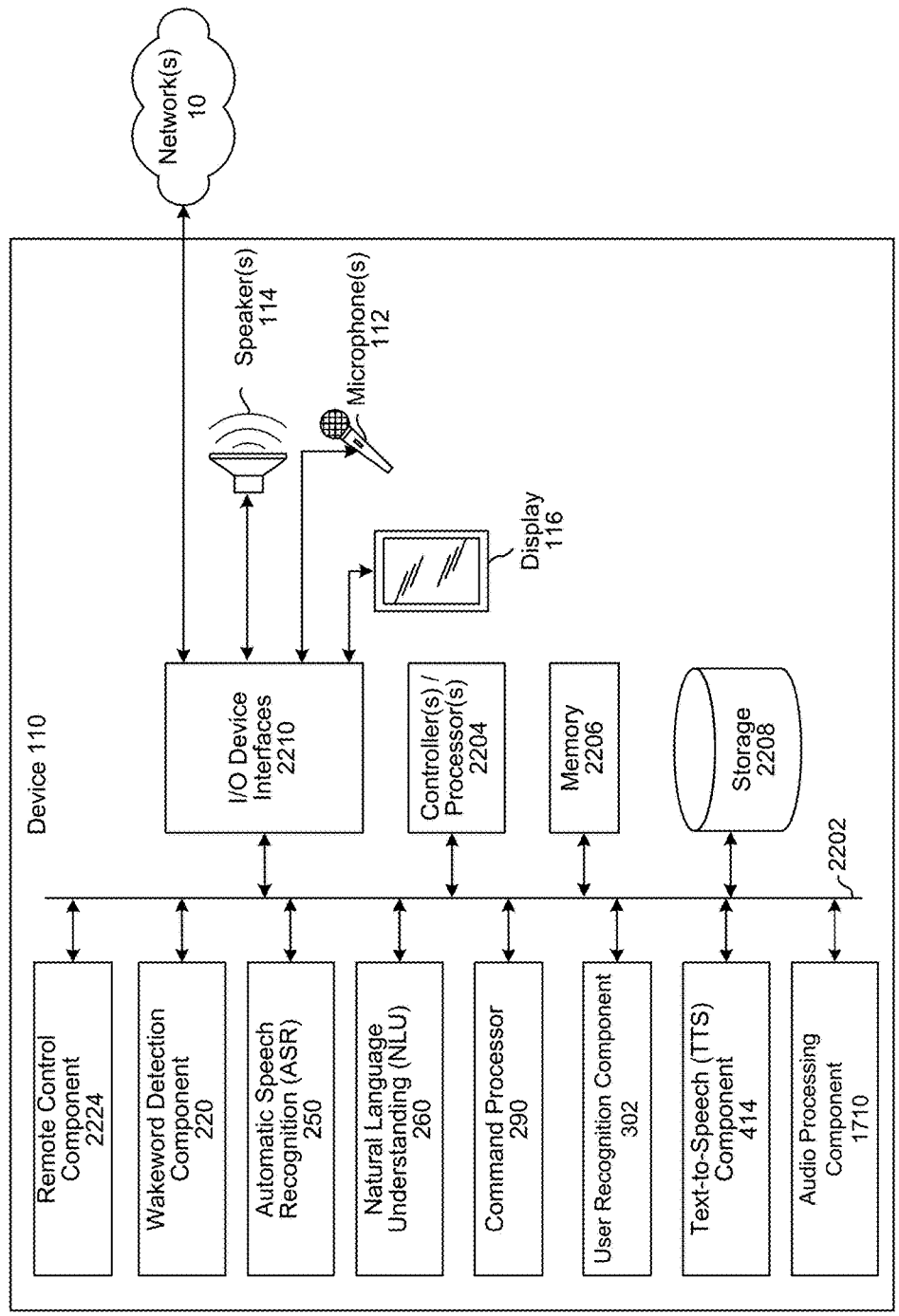

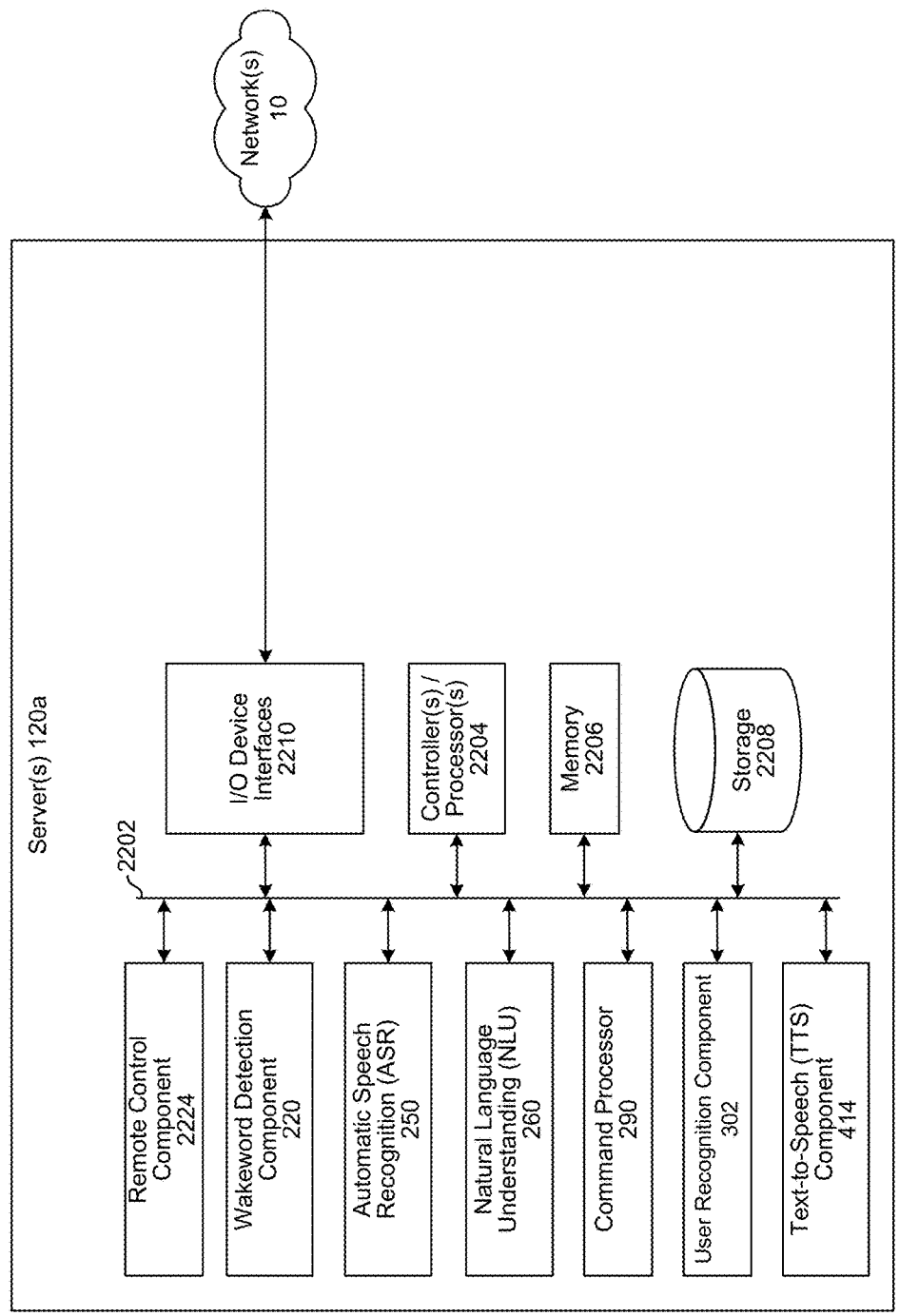

VOICE CONTROL OF REMOTE DEVICE BY DISABLING WAKEWORD DETECTION

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by audio devices, televisions, media devices, computers, hand-held devices, telephone computer systems, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B illustrate systems according to embodiments of the present disclosure.

FIG. 2 is a conceptual diagram of how a spoken utterance is processed according to examples of the present disclosure.

FIG. 6A-6B illustrate examples of signaling to end a communication session according to examples of the present disclosure.

FIG. 11 is a communication diagram conceptually illustrating an example of granting a first user profile remote control to a second user profile according to examples of the present disclosure.

FIG. 12 is a communication diagram conceptually illustrating an example of enabling remote control by detecting a voice command during a conversation according to examples of the present disclosure.

FIG. 13 is a communication diagram conceptually illustrating an example of enabling remote control by associating a voice command originating from a first user profile with a second user profile according to examples of the present disclosure.

FIG. 14 is a communication diagram conceptually illustrating an example of enabling remote control by detecting a wakeword represented in incoming audio data according to examples of the present disclosure.

FIGS. 15A-15B illustrate examples of temporarily disabling acoustic echo cancellation when remote control is granted according to examples of the present disclosure.

FIGS. 16A-16E illustrate examples of disabling or modifying a secondary wakeword engine when remote control is granted according to examples of the present disclosure.

FIGS. 19A-19C are communication diagrams conceptually illustrating example methods of disabling and enabling wakeword detection according to examples of the present disclosure.

FIGS. 20A-20C are communication diagrams conceptually illustrating example methods of beginning and ending remote control sessions according to examples of the present disclosure.

FIG. 21 is a communication diagram conceptually illustrating an example method for enabling asynchronous remote control according to examples of the present disclosure.

FIGS. 22A-22C are block diagrams conceptually illustrating example components of a system for enabling remote control for voice commands according to examples of the present disclosure.

DETAILED DESCRIPTION

Figure 3:
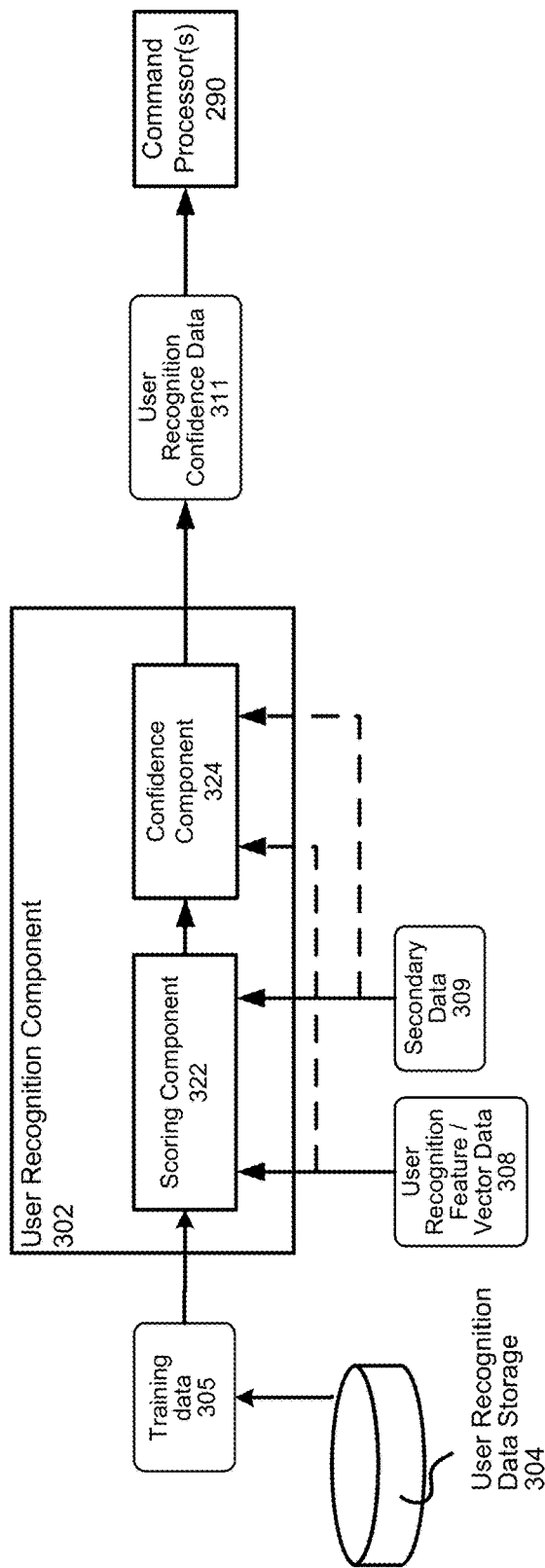
FIG. 3 illustrates an example of a user recognition component according to examples of the present disclosure.

Electronic devices may be used to perform speech processing and interpret voice commands from a user. In some circumstances, a first user may be unable to operate the device correctly and/or may need assistance in operating the device from a second user. While the second user may assist the first user by instructing the first user, the device may only respond to voice commands from the first user. Therefore, the second user may not directly control the device and the device may be unable to enable outside assistance from the second user.

To improve a process of receiving assistance from the second user, devices, systems and methods are disclosed that enable remote control to the second user. For example, the first user may grant the second user remote control, enabling the second user to initiate a voice command on behalf of the first user. In some examples, the system may enable the remote control by treating a voice command originating from the second user as though it originated from the first user instead. For example, the system may receive the voice command from a first device associated with the second user but may route the voice command as though it was received by a second device associated with the first user. Additionally or alternatively, the second device may enable wakeword detection for incoming audio data, enabling the second device to detect a wakeword and corresponding voice command from incoming audio data received from the first device. For example, the device may disable and/or modify echo cancellation processing and/or secondary wakeword detection processing, enabling the device to detect the voice command from audio output based on the incoming audio data and/or from the incoming audio data itself.

FIG. 1A illustrates a high-level conceptual block diagram of a system 100 configured to enable remote control by associating a voice command originating from a first user profile with a second user profile. Although FIG. 1A, and other figures/discussion illustrate the operation of the system in a particular order, the steps described may be performed in a different order (as well as certain steps removed or added) without departing from the intent of the disclosure. As illustrated in FIG. 1A, the system 100 may include a Voice over Internet Protocol (VoIP) device 30, a public switched telephone network (PSTN) telephone 20 connected to an adapter 22, a first device 110a, a second device 110b and/or a server(s) 120, which may all be communicatively coupled to network(s) 10. The server(s) 120 may include one or more server(s) 120a that are configured to process voice commands and/or one or more server(s) 120b that are configured to enable and/or facilitate communication sessions.

The VoIP device 30, the PSTN telephone 20 and/or the first device 110a may communicate with the second device 110b via the network(s) 10. For example, one of the VoIP device 30, the PSTN telephone 20 and the first device 110a may send audio data to the second device 110b and may receive audio data from the second device 110b via the network(s) 10. While the second device 110b may receive audio data from multiple devices, for ease of explanation the disclosure illustrates the second device 110b sending audio data to and/or receiving audio data from a single device at a time.

The VoIP device 30 may be an electronic device configured to connect to the network(s) 10 and to send and receive data via the network(s) 10, such as a smart phone, tablet or the like. Thus, the VoIP device 30 may send audio data to and receive audio data from the second device 110b during a VoIP communication session or the like. In contrast, the PSTN telephone 20 may be a landline telephone (e.g., wired telephone, wireless telephone or the like) connected to the PSTN (not illustrated), which is a landline telephone network that may be used to communicate over telephone wires, and the PSTN telephone 20 may not be configured to directly connect to the network(s) 10. Instead, the PSTN telephone 20 may be connected to the adapter 22, which may be configured to connect to the PSTN and to transmit and/or receive audio data using the PSTN and configured to connect to the network(s) 10 (using an Ethernet or wireless network adapter) and to transmit and/or receive data using the network(s) 10. Thus, the PSTN telephone 20 may use the adapter 22 to send audio data to and receive audio data from the second device 110b during a VoIP communication session or the like.

The first device 110a and the second device 110b may be electronic devices configured to determine voice commands using the server(s) 120a. For example, the first device 110a may be associated with a first user profile and may send first audio data to the server(s) 120a, the server(s) 120a may determine a first voice command represented in the first audio data and may perform a first action corresponding to the first voice command (e.g., execute a first command, send an instruction to the first device 110a and/or other devices to execute the first command, etc.) based on the first user profile. Similarly, the second device 110b may be associated with a second user profile and may send second audio data to the server(s) 120a, the server(s) 120a may determine a second voice command represented in the second audio data and may perform a second action corresponding to the second voice command (e.g., execute a second command, send an instruction to the second device 110b and/or other devices to execute the second command, etc.) based on the second user profile. However, the device(s) 110 may not be associated with a user profile without departing from the disclosure. For example, the device(s) 110 may not be associated with a user profile but may execute a software application that is associated with the user profile.

The device(s) 110 may include microphone(s) 112, speakers 114, and/or a display 116. For example, FIG. 1A illustrates the second device 110b including the microphone(s) 112 and the speakers 114, while the first device 110a includes the microphone(s) 112, the speakers 114 and the display 116. While the second device 110b is illustrated as a speech-controlled device (e.g., second device 110b doesn't include a display 116), the disclosure is not limited thereto and the second device 110b may include the display 116 without departing from the disclosure. Using the microphone(s) 112, the device(s) 110 may capture outgoing audio data and determine a voice command and/or send the outgoing audio data to the server(s) 120a to determine the voice command. For example, the server(s) 120a may perform Automatic Speech Recognition (ASR) processing, Natural Language Understanding (NLU) processing and/or command processing to determine the voice command. The voice commands may control the device(s) 110, audio devices (e.g., play music over speakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like.

While the examples described herein illustrate the server(s) 120a performing multiple functions, the disclosure is not limited thereto. Instead, the device(s) 110 may perform any of the functions described herein without departing from the disclosure. For example, the server(s) 120a may assist the device(s) 110 with Automatic Speech Recognition (ASR) processing, Natural Language Understanding (NLU) processing, command processing, generating progress data, saving progress data and/or generating synthesized speech. A single server 120a may be capable of performing all speech processing or multiple server(s) 120a may combine to perform the speech processing. In addition, certain speech detection or command execution functions may be performed by device 110. Thus, the device(s) 110 and/or the server(s) 120a may perform the functions described herein without departing from the disclosure.

Additionally or alternatively, the device 110 may capture outgoing audio data and send the outgoing audio data to the server(s) 120b as part of a communication session (e.g., real time synchronous communication session, such as an audio conversation) and the device 110 may receive incoming audio data from the server(s) 120b as part of the communication session. For ease of explanation, the following description refers to capturing and sending audio data during the communication session. However, the disclosure is not limited thereto and the device 110 may capture and send video data during the communication session without departing from the present disclosure.

As discussed above, the device(s) 110 may be configured to capture and send audio data to the server(s) 120a to determine a voice command. As illustrated in FIG. 1A, the system 100 may be configured to enable remote control (e.g., remote access) by associating a voice command originating from a first user profile with a second user profile. For example, a "caller device" (e.g., VoIP device 30, PSTN telephone 20 or the first device 110a) may be associated with the first user profile and may communicate with (e.g., send audio data to and receive audio data from) a "callee device" (e.g., the second device 110b) that is associated with the second user profile. While communicating with the caller device, the callee device may grant the caller device remote control, enabling the caller device to initiate a voice command on behalf of the callee device. Thus, the caller device may send audio data corresponding to the voice command to the server(s) 120a and the server(s) 120a may associate the voice command with the second user profile, despite the voice command originating from the caller device associated with the first user profile.

Thus, the system 100 may enable the caller device (e.g., VoIP device 30, PSTN telephone 20 and/or first device 110a) to issue voice commands to the server(s) 120a on behalf of the callee device (e.g., second device 110b), such that the caller device may control any device or services associated with the second user profile. As used herein, "callee device" refers to a device 110 associated with a second user profile that grants remote control to a first user profile, while a "caller device" refers to an electronic device associated with the first user profile that initiates a voice command on behalf of the second user profile. In some examples, such as when the first device 110a communicates with the second device 110b, the first device 110a may be both a callee device and a caller device at different times in a conversation. However, for ease of explanation the present disclosure illustrates examples in which the first device 110a corresponds to the caller device and the second device 110b corresponds to the callee device.

For ease of explanation, the disclosure refers to remote control being granted to the first user profile, which may be associated with one or more devices and/or one or more users. However, the disclosure is not limited thereto and remote control may be granted to a specific device (e.g., VoIP device 30, PSTN telephone 20, first device 110a, etc.) or user (e.g., John Doe, Jane Doe, etc.) without departing from the disclosure. When remote control is given to a device, the server(s) 120a may determine and initiate voice commands represented in audio data received from the device without regard to the user speaking the voice commands. Thus, if the first device 110a captures audio data corresponding to first voice commands from a first user and second voice commands from a second user, the server(s) 120a may perform the first voice commands and the second voice commands. In contrast, when remote control is given to a user, the server(s) 120a may only determine and perform voice commands that are associated with the user. For example, the server(s) 120a may perform the first voice commands associated with the first user while ignoring the second voice commands associated with the second user.

For ease of explanation, the disclosure refers to providing the first user profile remote control to the second user profile, instead of referring to providing the caller device remote control to the callee device. This is because while the server(s) 120a receive voice commands from the caller/callee device, the server(s) 120a perform the voice commands based on the second user profile and are not limited to controlling the callee device. For example, the second device 110b may generate voice commands to turn on/off lights in proximity to the second device 110b, to play music over speakers in proximity to the second device 110b, to control a temperature of a thermostat, to configure user preferences or other settings associated with the second user profile, or the like. Thus, the voice commands are not limited to the second device 110b and may control other devices/services associated with the second user profile.

In some examples, the caller device may already be associated with a user profile. For example, the first device 110a may be associated with an existing user profile and the server(s) 120a may receive a first voice command from the first device 110a and execute the first voice command using the existing user profile. Thus, when the callee device grants remote control to the existing user profile, the server(s) 120a may receive a second voice command from the first device 110a, determine that the existing user profile has remote control to the second user profile and associate the second voice command with the second user profile instead of the existing user profile. However, the disclosure is not limited thereto and the caller device may be associated with a new user profile upon communicating with the callee device and/or being granted remote control to the second user profile. For example, prior to communication between the caller device (e.g., PSTN telephone 20) and the callee device (e.g., second device 110b), the server(s) 120a may not associate the caller device with a user profile and therefore must create a new user profile. Despite the caller device not being associated with an existing user profile, the server(s) 120a may receive a third voice command from the caller device, determine that the new user profile has remote control to the second user profile and associate the third voice command with the second user profile.

To illustrate an example of granting remote control, a first user (e.g., John) may use the first device 110a to speak with a second user (e.g., Bob) associated with the second device 110b and the second user profile. If the second user says "Alexa, grant remote control," the second device 110b may capture first audio data corresponding to the utterance, detect that the wakeword (e.g., "Alexa") is represented in the first audio data, and send the first audio data to the server(s) 120a for speech processing. The server(s) 120a may perform speech processing to understand the utterance and determine a command (e.g., grant remote control) represented in the first audio data. After determining the command, the server(s) 120a may perform an action corresponding to the command, such as executing the command (e.g., granting remote control of the second user profile to the first user, the first device 110a and/or the first user profile by associating the first user, the caller device and/or the first user profile with the second user profile), sending an instruction to execute the command to the second device 110b (e.g., enabling wakeword detection for incoming audio data by removing safeguards intended to prevent wakeword detection), or the like.

After remote control is granted, the first user may initiate voice commands on behalf of the second device 110b. For example, the first user may say "Alexa, turn on the lights" and the first device 110a may capture second audio data corresponding to the utterance, detect that the wakeword (e.g., "Alexa") is represented in the second audio data and send the second audio data to the server(s) 120a for speech processing. The server(s) 120a may perform speech processing to understand the utterance and determine a command (e.g., turn on the lights) represented in the second audio data. After determining the command, the server(s) 120a may perform an action corresponding to the command, such as sending an instruction to a light switch and/or a device controlling the light switch to turn on the lights. Typically, the server(s) 120a would perform the action using the first user profile, such as identifying a first light switch in proximity to the first device 110a and sending the instruction to the first light switch. However, as the first user profile is granted remote control to the second user profile, the server(s) 120a may perform the action using the second user profile. Thus, despite receiving the command from the first device 110a that is associated with the first user profile, the server(s) 120a may associate the command with the second user profile and may identify a second light switch in proximity to the second device 110b and send the instruction to the second light switch.

In some examples, instead of granting unrestricted remote control the system 100 may grant limited remote control. For example, the second user (e.g., Bob) may grant the first user (e.g., John) limited remote control in order to resolve a specific issue, such as enabling a feature for the second user profile and/or troubleshooting an issue associated with the second device 110b. In some examples, the limited remote control may correspond to specific commands, which may be associated with different categories of commands (e.g., security commands, audio commands, lighting commands, etc.), although the disclosure is not limited thereto. The specific commands may be identified by the second user (e.g., Bob), either as part of granting remote control (e.g., "Alexa, grant John remote control to audio commands") or based on user preferences (e.g., the second user stores user preferences indicating specific commands available during limited remote control). However, the disclosure is not limited thereto and the server(s) 120a may automatically determine commands and/or may identify default commands to include in limited remote control without departing from the disclosure.

In some examples, the second user may restrict who is granted remote control to the second user profile based on specific users. For example, if the second user says "Alexa, grant remote control," the server(s) 120a may initiate voice commands on behalf of the second device 110b based on any audio data originating from the first device 110a. Thus, if the first device 110a captures third audio data corresponding to a third user (e.g., Tim), the server(s) 120a may initiate voice commands corresponding to the third audio data using the second user profile. However, the second user may instead limit permissions by saying "Alexa, grant remote control to John." Thus, the server(s) 120a may initiate voice commands corresponding to the second audio data (e.g., John's command to turn on the lights) using the second user profile but may initiate voice commands corresponding to the third audio data (e.g., Tim's command) using the first user profile, thus limiting remote control to the indicated user. The server(s) 120a may use speech recognition and other techniques known to one of skill in the art to differentiate between multiple users.

In addition to restricting remote control to a specific user, the system 100 may enable different levels of remote control to different user profile(s) and/or user(s). For example, the first user (e.g., John) may be granted full remote control to unlimited commands (e.g., "Alexa, grant remote control to John") whereas the third user (e.g., Tim) may be granted limited remote control to specific commands (e.g., Alexa, grant Tim remote control to audio commands").

In some examples, the system 100 may automatically enable restricted remote control to each user present in a conversation unless the restricted remote control is explicitly revoked. For example, the system 100 may grant the first user (e.g., John) restricted remote control to the second user profile and may grant the second user (e.g., Bob) restricted remote control to the first user profile. Thus, the first user may initiate some voice commands on behalf of the second device 110b without requiring the second user to explicitly grant remote control to the first user. For example, the restricted remote control may enable simple voice commands (e.g., "Alexa, turn on the lights") that may be presume to be allowed by virtue of the conversation. The second user may revoke the restricted remote control to the first user at any time and/or may revoke restricted remote control to all users by changing user preferences to disable automatically granting restricted remote control.

In addition to controlling an amount of remote control (e.g., permission(s)) granted during remote control, the system 100 may determine a length of the remote control (e.g., length of permission). For example, the length of the remote control for the first user may extend for a session (e.g., extending for the length of the conversation), which requires that remote control be explicitly granted each session, for a fixed duration (e.g., a day, week, etc.), which enables the first user to initiate voice commands during a series of conversations, or may be permanent (e.g., always enabled), which enables the first user to initiate voice commands for the second user profile until the remote control is revoked.

When the length of remote control is limited to a single session, the system 100 may automatically identify that voice commands originating from the first device 110a are intended for the second device 110b/second user profile. Thus, after the second user grants remote control to the first user, the system 100 may treat all incoming voice commands received by the first device 110a as controlling the second user profile. For example, the system 100 may create an indicator, set a flag or other indicator in settings and/or user preferences that route voice commands received by the first device 110a to the second user profile. However, the disclosure is not limited thereto and the system 100 may identify that voice commands originating from the first device 110a are intended for the second user profile using other techniques without departing from the disclosure.

In some examples, the server(s) 120a may attempt to determine an intent of the user based on the utterance in order to identify the user profile with which to associate a voice command. For example, the system 100 may determine that a voice command originating from the first device 110a is intended for the first user profile and/or the second user profile based on context information included in the voice command (e.g., "Alexa, turn on lights in Bob's room") and/or an explicit command (e.g., "callee") to route the voice command to the second user profile (e.g., "Alexa, turn on lights for callee"). Thus, the server(s) 120a may differentiate between "Alexa, turn on the lights" (e.g., in a first room corresponding to a first location of the first device 110a) and "Alexa, turn on the lights in Bob's room" (e.g., in a second room corresponding to a second location of the second device 110b). As a result the system 100 may enable the first user to initiate voice commands associated with the first user profile and/or the second user profile during a single session.

In some examples, the system 100 may be unable to identify the intent and may request clarification from the user as to whether the voice command should be associated with the first user profile or the second user profile. Additionally or alternatively, the system 100 may employ two or more wakewords to allow explicit control. For example, a first wakeword may be associated with local commands (e.g., "Alexa, turn on the lights" results in lights being turned on using the first user profile, whereas a second wakeword may be associated with remote commands (e.g., "Roger, turn on the lights" results in lights being turned on using the second user profile).

In some examples, the system 100 may enable the first user to automatically connect to the second device 110b to initiate a conversation. For example, the second user may authorize the first user to initiate the conversation without the system 100 receiving an explicit acceptance command from the second user. Thus, the first user may initiate the conversation with the second device 110b and, if granted remote control, may initiate voice commands on behalf of the second device 110b. For example, the second user may enable the first user to automatically connect and may grant remote control to the first user (e.g., for a duration of time and/or permanently) at a first time, enabling the second user to automatically connect to the second device and initiate voice command(s) on behalf of the second device at a second time.

In some examples, the system 100 may require a password and/or authentication in order to enable remote control when the first user automatically connects to the second device (e.g., the system 100 does not receive an explicit acceptance command from the second user). Thus, the system 100 may prevent the first user from initiating voice commands without the second user being present unless the first user provides additional verification. Additionally or alternatively, the system 100 may enable the first user to connect to the second device without the system 100 receiving an explicit acceptance command from the second user by requiring additional authentication. For example, the first user may provide a username and password and/or additional verification in order to remotely authorize the first user to connect to the second device 110b.

As illustrated in FIG. 1A, the server(s) 120a may receive (130) a command granting a first user profile remote control to a second user profile. For example, the first user profile may be associated with a caller device (e.g., VoIP device 30, PSTN telephone 20, first device 110a, etc.) and the second device 110b may receive a voice command granting remote control to the caller device, a user associated with the caller device, and/or the first user profile.

After the first user profile is granted remote control to the second user profile, the server(s) 120a may receive (132) audio data originating from a device (e.g., caller device) that is associated with the first user profile. For example, the caller device may send audio data that corresponds to a voice command to the server(s) 120a or to the server(s) 120b and the server(s) 120b may send the audio data to the server(s) 120a. The server(s) 120a may optionally detect (134) a wakeword represented in the audio data and may determine (136) a voice command represented in the audio data. For example, the audio data may correspond to a conversation (e.g., real time synchronous communication session) between the first user and the second user and the server(s) 120a may perform speech processing on all of the audio data originating from the caller device. Thus, the server(s) 120a may determine that a voice command is represented in the audio data by detecting the wakeword, reducing an amount of speech processing to perform. However, the disclosure is not limited thereto and the audio data may correspond to only a portion of the conversation. For example, the first device 110a may detect the wakeword and send the audio data in response to detecting the wakeword, such that the audio data only corresponds to the voice command.

The server(s) 120a may optionally determine (138) that the voice command is intended for the second user profile. For example, the server(s) 120a may determine that a voice command originating from the caller device is intended for the second user profile based on context information included in the voice command (e.g., "Alexa, turn on lights in Bob's room") and/or an explicit command (e.g., "callee") to route the voice command to the second user profile (e.g., "Alexa, turn on lights for callee"). Thus, the server(s) 120a may differentiate between "Alexa, turn on the lights" (e.g., in a first room corresponding to a first location of the caller device) and "Alexa, turn on the lights in Bob's room" (e.g., in a second room corresponding to a second location of the second device 110b). However, the disclosure is not limited thereto and the server(s) 120a may automatically identify that voice commands originating from the caller device are intended for the second user profile. For example, after the remote control is granted to the first user profile, the system 100 may treat all incoming voice commands originating from the caller device as directed to the second user profile.

The server(s) 120a may determine (140) that the first user profile is granted remote control to the second user profile and may perform (142) the voice command as though the voice command originated from the second user profile. For example, the first user may say "Alexa, turn on the lights" and the caller device (e.g., first device 110a) may capture audio data corresponding to the utterance, detect that the wakeword (e.g., "Alexa") is represented in the audio data and send the audio data to the server(s) 120a for speech processing. The server(s) 120a may perform speech processing to understand the utterance and determine a command (e.g., turn on the lights) represented in the second audio data. After determining the command, the server(s) 120a may perform an action corresponding to the command, such as sending an instruction to a light switch and/or a device controlling the light switch to turn on the lights. As the first user profile is granted remote control to the second user profile, the server(s) 120a may perform the action using the second user profile. Thus, despite receiving the command from the caller device that is associated with the first user profile, the server(s) 120a may associate the command with the second user profile and may identify a second light switch in proximity to the second device 110b and send the instruction to the second light switch.

FIG. 1B illustrates a high-level conceptual block diagram of a system 100 configured to enable remote control by detecting a wakeword represented in incoming audio data. Although FIG. 1B, and other figures/discussion illustrate the operation of the system in a particular order, the steps described may be performed in a different order (as well as certain steps removed or added) without departing from the intent of the disclosure. As illustrated in FIG. 1B, the system 100 may include the Voice over Internet Protocol (VoIP) device 30, the public switched telephone network (PSTN) telephone 20 connected to the adapter 22, the first device 110a, the second device 110b and/or the server(s) 120 (e.g., server(s) 120a and/or server(s) 120b), which may all be communicatively coupled to network(s) 10, as discussed above with regard to FIG. 1A.

FIG. 1A illustrates a first example in which the system 100 is configured to enable remote control by associating a voice command originating from a first user profile with a second user profile. For example, a voice command originating from a caller device (e.g., VoIP device 30, PSTN telephone 20, first device 110a, etc.) that is associated with the first user profile may be treated by the server(s) 120a as though it originated from the callee device (e.g., second device 110b) instead. Thus, the first example is directed to the server(s) 120a enabling remote control.

When the caller device is configured to detect a wakeword (e.g., the first device 110a), the system 100 may enable end-to-end encryption of first audio data associated with a conversation, but may detect the wakeword and may separately send second audio data corresponding to a voice command. However, when the caller device is not configured to detect a wakeword (e.g., VoIP device 30, PSTN telephone 20, etc.), the system 100 may not be configured to enable end-to-end encryption as the server(s) 120a determines the voice command based on the first audio data itself. For example, the server(s) 120a may detect that the wakeword is represented in the first audio data and determine the voice command represented in the first audio data.

In contrast, FIG. 1B illustrates a second example in which the system 100 is configured to enable remote control by detecting a wakeword represented in incoming audio data. Thus, the second example is directed to the second device 110b enabling the remote control instead of the server(s) 120a. By detecting that the wakeword is represented in the incoming audio data using the second device 110b, the system 100 may be configured to enable end-to-end encryption of first audio data sent via the server(s) 120b and may separately send second audio data to the server(s) 120a to determine the voice command. For example, the second device 110b may disable safeguards that prevent accidentally detecting a wakeword represented in incoming audio data that is output using the speaker(s) 114.

In some examples, the second device 110b may disable and/or modify echo cancellation processing and/or secondary wakeword detection processing, enabling the second device 110b to output audio corresponding to the first audio data, capture second audio data using the microphone(s) 112 and detect the wakeword in the second audio data. Thus, the second device 110b may detect the wakeword based on generating the audio output. In other examples, the second device 110b may modify secondary wakeword detection processing and/or echo cancellation processing in order to detect the wakeword represented in the first audio data. For example, the second device 110b may detect that the wakeword is represented in incoming audio data using a secondary wakeword detection component and/or during the echo cancellation process and may generate the second audio data from the incoming audio data. Thus, the second device 110b generates the second audio data directly from the incoming audio data and not from capturing audio data using the microphone(s) 112.

As illustrated in FIG. 1B, the second device 110b may enable (150) wakeword detection for incoming audio data. The second device 110b may receive (152) incoming audio data originating from a first device associated with the first user profile (e.g., VoIP device 30, PSTN telephone 20, first device 110a, etc.), may detect (154) a wakeword represented in the incoming audio data, may generate (156) command audio data including a portion of the incoming audio data following the wakeword and may send (158) the command audio data to the server(s) 120a from the second user profile. Thus, the server(s) 120a may interpret the command audio data to determine the voice command and may treat the voice command as originating from the second device 110b despite the voice command actually originating from the caller device.

The system 100 of FIGS. 1A-1B may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 10. An audio capture component, such as microphone(s) 112 of device 110, captures audio 11 corresponding to a spoken utterance.

The device 110, using a wakeword detection component 220, then processes audio data corresponding to the input audio 11 to determine if a keyword (such as a wakeword) is detected in the audio data. Following detection of a wakeword, the speech-controlled device 110 sends audio data 111, corresponding to the utterance, to a server 120a that includes an ASR component 250. The audio data 111 may be output from an acoustic front end (AFE) 256 located on the device 110 prior to transmission, or the audio data 111 may be in a different form for processing by a remote AFE 256, such as the AFE 256 located with the ASR component 250.

The wakeword detection component 220 works in conjunction with other components of the device 110, for example the microphone(s) 112 to detect keywords in audio data corresponding to the input audio 11. For example, the device 110 may convert input audio 11 into audio data, and process the audio data with the wakeword detection component 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio, the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120a for speech processing (e.g., for purposes of executing a command in the speech). The audio data 111 may include data corresponding to the wakeword, or the portion of the audio data corresponding to the wakeword may be removed by the local device 110 prior to sending the audio data 111 to the server 120a.

Upon receipt by the server(s) 120a, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a respective probability/confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices including the ASR component 250 may include an AFE 256 and a speech recognition engine 258. The AFE 256 transforms the audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration each audio frame includes 25 ms of audio and the frames start at 10 ms intervals resulting in a sliding window where adjacent audio frames include 15 ms of overlapping audio. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110 may process audio data 111 into feature vectors (e.g., using an on-device AFE 256) and transmit the feature vector data to the server 120a across the network(s) 10 for ASR processing. Feature vector data may arrive at the server 120a encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 10. For example, ASR results in the form of a single textual representation of the speech, an N-best list including multiple hypotheses and respective scores, lattice, etc. may be sent to a server, such as the server 120a, for natural language understanding (NLU) processing, such as conversion of the text data into commands for execution, either by the speech-controlled device 110, by the server 120a, or by another device (e.g., a server running a search engine, etc.). For example, the ASR component 250 may output text data for further processing by an NLU 260, where the text data may include a single top scoring hypothesis or a N-best list including multiple hypotheses. The ASR confidence score data may include a respective score for each hypothesis in an N-best list or may include a single score for the top hypothesis output as the text data. In other configurations the ASR confidence score data may include general confidence data, such as one or more values that indicate how generally confident the ASR component 250 was in its processing, without necessarily linking that confidence to a specific hypothesis. The ASR confidence score data may be based on various factors such as audio quality, whether the hypotheses had similar scores or whether one hypothesis largely outscored the others, or other factors.

The device performing NLU processing (e.g., the server 120a) may include various components, including potentially dedicated processor(s), memory, storage, etc. The device performing NLU processing may include a dedicated NLU component 260, which may include a named entity recognition (NER) component 262, and intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250 based on the input audio data 111) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server 120a, an application server, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 260 may be configured to determine a "domain" of the utterance so as to determine and narrow down which services offered by an endpoint device (e.g., the server 120a, the speech-controlled device 110, an application server, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-controlled device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286 an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result.

An IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276)

with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may be sent to a user recognition component 302. The user recognition component 302 performs user recognition using the audio data 111, and optionally the ASR component output. The user recognition component 302 may include a scoring component that determines respective scores indicating whether the input utterance in the audio data 111 was spoken by particular users. The user recognition component 302 may also include a confidence component that determines an overall confidence as the accuracy of user recognition operations.

The output from the NLU processing, which may include tagged text data, commands, etc., and output of the user recognition component 302 (e.g., user recognition confidence data) may then be sent to a command processor 290, which may be located on a same or separate server 120a as part of the system 100. The system 100 may include more than one command processor 290, and the command processor 290 may be determined based on the NLU output. For example, if the NLU output includes a command to play music, the command processor 290 selected may correspond to a music playing application, such as one located on the speech-controlled device 110 or in a music playing appliance, configured to execute a music playing command. Many such command processors 290 may be available to the system depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

FIG. 3 illustrates an example of a user recognition component according to examples of the present disclosure. The user recognition component 302 of the server(s) 120a performs user recognition using various data including training data 305 corresponding to sample audio data corresponding to known users, user recognition feature/vector data 308, and secondary data 309. The user recognition component 302 may then output user recognition confidence data 311 which reflects a certain confidence that the input utterance was spoken by one or more particular users. The user recognition confidence data 311 may include an indicator of the verified user (such as a user ID corresponding to the speaker of the utterance) along with a confidence value corresponding to the user ID, such as a numeric value or binned value as discussed below.

The training data 305 may be stored in a user recognition data storage 304. The user recognition data storage 304 may be stored by the server(s) 120a, or may be a separate device. Further, the user recognition data storage 304 may be part of user profile storage 802. The user recognition data storage 304 may be a cloud-based storage. The training data 305 stored in the user recognition data storage 304 may be stored as waveforms and/or corresponding features/vectors. The training data 305 may correspond to data from various audio samples, each audio sample associated with a known user and/or user identity. For example, each user known to the system may be associated with some set of training data 305 for the known user. The user recognition component 302 may then use the training data 305 to compare against incoming audio data (represented by user recognition feature/vector data 308) to determine the identity of a user speaking an utterance. The training data 305 stored in the user recognition data storage 304 may thus be associated with multiple users of multiple devices. Thus, the training data 305 stored in the storage 304 may be associated with both a user that spoke the respective utterance, as well as the speech-controlled device 110 that captured the respective utterance.

The training data 305 for a particular user may include a feature vector of the same size as a vector of the user recognition feature/vector data 308. Thus, for example, if a feature vector 308 is of size F, the training data 305 may also be a feature vector of size F. To create such a training data feature vector, during a training period the system may either prompt a user to speak sample audio data or may identify sample audio data known to have been spoken by a particular user. The system may then process the sample audio data to create sample training data 305 (e.g., a feature vector of size F). The training data 305 may then be stored by the system (such as in data storage 304) and saved for use during runtime user recognition processing.

To perform user recognition, the user recognition component 302 may determine the speech-controlled device 110 from which the audio data 111 originated. For example, the audio data 111 may include a tag indicating the speech-controlled device 110. Either the speech-controlled device 110 or the server(s) 120a may tag the audio data 111 as such. The tag indicating the speech-controlled device 110 may be associated with the user recognition feature/vector data 308 produced from the audio data 111. The user recognition component 302 may send a signal to the user recognition data storage 304, with the signal requesting only training data 305 associated with known users of the speech-controlled device 110 from which the audio data 111 originated. This may include accessing a user profile associated with the speech-controlled device 110 and then only inputting training data 305 associated with users corresponding to the user profile of the device 110. This limits the universe of possible training data the recognition component 302 should consider at runtime when recognizing a user and thus decreases the amount of time to perform user recognition by decreasing the amount of training data 305 needed to be processed. Alternatively, the user recognition component 302 may access all (or some other subset of) training data 305 available to the system. However, accessing all training data 305 will likely increase the amount of time needed to perform user recognition based on the magnitude of training data to be processed.

If the user recognition component 302 receives training data 305 as an audio waveform, the user recognition component 302 may determine features/vectors of the waveform(s) or otherwise convert the waveform into a data format that can be used by the user recognition component 302 to actually perform the user recognition. The user recognition component 302 may then identify the user that spoke the utterance in the audio data 111 by comparing features/vectors of the user recognition feature/vector data 308 to training features/vectors (either received from the storage 304 or determined from training data 305 received from the storage 304).

The user recognition feature/vector data 308 may include multiple vectors each corresponding to different portions of the input utterance. Alternatively, the user recognition feature/vector data 308 may be a single vector representing audio qualities of the input utterance. For example, the single vector may be created using an encoder which can create a fixed-size vector to represent certain characteristics of the audio data entities. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. Accumulated/processed speech audio data for the utterance (from beginpoint to endpoint) may be represented in a single feature vector for the user verification feature/vector data 308, which may then be used for user recognition.

The user recognition component 302 may include a scoring component 322 which determines respective scores indicating whether the input utterance (represented by user verification feature/vector data 308) was spoken by particular users (represented by training data 305). The user recognition component 302 may also include a confidence component 324 which determines an overall confidence as the accuracy of the user recognition operations (such as those of the scoring component 322) and/or an individual confidence for each user potentially identified by the scoring component 322. The output from the scoring component 322 may include scores for all users with respect to which user recognition was performed (e.g., all users associated with the speech-controlled device 110). For example, the output may include a first score for a first user, a second score for a second user, and third score for a third user, etc. Although illustrated as two separate components, the scoring component 322 and confidence component 324 may be combined into a single component or may be separated into more than two components.

The scoring component 322 and confidence component 324 may implement one or more trained machine learning models (such neural networks, classifiers, etc.) as known in the art. For example, the scoring component 322 may use probabilistic linear discriminant analysis (PLDA) techniques. PLDA scoring determines how likely it is that the input user recognition feature vector 308 corresponds to a particular training data feature vector 305 for a particular user. The PLDA scoring may generate similarity scores for each training feature vector considered and may output the list of scores and users and/or the user ID of the speaker whose training data feature vector most closely corresponds to the input user recognition feature vector 308 of the utterance. The scoring component 322 may also use other techniques such as GMMs, generative Bayesian models, or the like, to determine similarity scores.

The confidence component 324 may input various data including information about an utterance length (e.g., number of frames or time of the utterance), audio condition/ quality data (such as signal-to-interference data or other metric data), fingerprint data, image data, or other factors to consider how confident the user recognition component 302 is with regard to the scores linking users to the input utterance. The confidence component 324 may also consider the similarity scores and user IDs output by the scoring component 322. Thus, the confidence component 324 may determine that poor input audio quality, or other factors, may result in a lower confidence of the user recognition component 302. Whereas better input audio quality, or other factors, may result in a higher confidence of the user recognition component 302. Precise determination of the confidence may depend on configuration and training of the confidence component 324 and the models used therein. The confidence component 324 may operate using a number of different machine learning models/techniques such as GMM, neural networks, etc. For example, the confidence component 324 may be a classifier configured to map a score output by the scoring component 322 to a confidence.

The user recognition component 302 may output user recognition confidence data 311 specific to a single user, or multiple users in the form of an N-best list. For example, the user recognition component 302 may output user recognition confidence data 311 with respect to each user indicated in the profile associated with the speech-controlled device 110 from which the audio data 111 was received. The user recognition confidence data 311 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 311 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 311 may only include information related to the top scoring user as determined by the user recognition component 302. The scores and bins may be based on information determined by the confidence component 324. The user recognition component 302 may also output a confidence value that the scores/bins are correct, where the confidence value indicates how confident the user recognition component 302 is in the output results. This confidence value may be determined by the confidence component 324.

The confidence component 324 may determine individual user confidences and differences between user confidences when determining the user recognition confidence data 311. For example, if a difference between a first user's confidence score and a second user's confidence score is large, and the first user's confidence score is above a threshold, then the user recognition component 302 is able to recognize the first user as the user that spoke the utterance with a much higher confidence than if the difference between the users' confidences were smaller.

The user recognition component 302 may perform certain thresholding to avoid incorrect user recognition results being output. For example, the user recognition component 302 may compare a confidence score output by the confidence component 324 to a confidence threshold. If the confidence score is not above the confidence threshold (for example, a confidence of "medium" or higher), the user recognition component 302 may not output user recognition confidence data 311, or may only include in that data 311 an indication that a user speaking the utterance could not be verified. Further, the user recognition component 302 may not output user recognition confidence data 311 until enough user recognition feature/vector data 308 is accumulated and processed to verify the user above a threshold confidence. Thus the user recognition component 302 may wait until a sufficient threshold quantity of audio data of the utterance has been processed before outputting user recognition confidence data 311. The quantity of received audio data may also be considered by the confidence component 324.

The user recognition component 302 may be defaulted to output binned (e.g., low, medium, high) user recognition confidence data 311. However, such may be problematic from the command processor(s) 290 perspective. For example, if the user recognition component 302 computes a single binned confidence for multiple users, the command processor(s) 290 may not be able to determine which user to determine content with respect to. In this situation, the user recognition component 302 may be configured to override its default setting and output user recognition confidence data 311 including values (e.g., 0.0-1.0) associated with the users associated with the same binned confidence. This enables the command processor(s) 290 to select content associated with the user associated with the highest confidence value. The user recognition confidence data 311 may also include the user IDs corresponding to the potential user(s) who spoke the utterance.

In addition, the user recognition component 302 may use secondary data 309 to inform user recognition processing. Thus, a trained model or other component of the user recognition component 302 may be trained to take secondary data 309 as an input feature when performing recognition. Secondary data 309 may include a wide variety of data types depending on system configuration and may be made available from other sensors, devices, or storage such as user profile data 802, etc. The secondary data 309 may include a time of day at which the audio data was captured, a day of a week in which the audio data was captured, the text data generated by the ASR component 250, and/or NLU results generated by the NLU component 260.

In one example, secondary data 309 may include image data or video data. For example, facial recognition may be performed on image data or video data received from the speech-controlled device 110 from which the audio data 111 was received. Facial recognition may be performed by the user recognition component 302, or another component of the server(s) 120a. The output of the facial recognition process may be used by the user recognition component 302. That is, facial recognition output data may be used in conjunction with the comparison of the features/vectors of the audio data 111 and training data 305 to perform more accurate user recognition.

The secondary data 309 may also include location data of the speech-controlled device 110. The location data may be specific to a building within which the speech-controlled device 110 is located. For example, if the speech-controlled device 110 is located in user A's bedroom, such location may increase user recognition confidence data associated with user A, but decrease user recognition confidence data associated with user B.

The secondary data 309 may further include type data indicating a type of the speech-controlled device 110. Different types of speech-controlled devices may include, for example, a smart watch, a smart phone, a tablet computer, and a vehicle. The type of speech-controlled device 110 may be indicated in a profile associated with the speech-controlled device 110. For example, if the speech-controlled device 110 from which the audio data 111 was received is a smart watch or vehicle belonging to user A, the fact that the speech-controlled device 110 belongs to user A may increase user recognition confidence data associated with user A, but decrease user recognition confidence data associated with user B.

The secondary data 309 may additionally include geographic coordinate data associated with the speech-controlled device 110. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 110. The global coordinates and associated locations may be associated with respective users in the user profile.

The secondary data 309 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 309 and considered by the user recognition component 302. If a mobile device (such as a phone, Tile, dongle, or other device) known to be associated with a particular user is detected proximate to (for example physically close to, connected to the same WiFi network as, or otherwise nearby) the speech-controlled device 110, this may be reflected in the secondary data 309 and considered by the user recognition component 302.

Depending on system configuration, the secondary data 309 may be configured to be included in the vector representation of the user recognition feature/vector data 308 so that all the data relating to the utterance to be processed by the scoring component 322 may be included in a single vector. Alternatively, the secondary data 309 may be reflected in one or more different data structures to be processed by the scoring component 322.

The ASR component 250 may output text data, which in turn is processed by the NLU component 260. The results of NLU processing performed by the NLU component 260 and the user recognition confidence data 311 output by the user recognition component 302 may be sent to one or more applications, represented by command processor(s) 290. The command processor(s) 290 that receives the NLU results and the user recognition confidence score data 311 may be determined by the server(s) 120a as corresponding to content responsive to the utterance in the audio data 111. For example, if the audio data 111 includes the utterance "Play my music," the NLU results and user recognition confidence data 311 may be sent to a music playing command processor 290. If user recognition confidence data 311 associated with a single user is passed to the command processor(s) 290, the command processor(s) 290 may identify content responsive to the utterance and associated with the user. If, instead, user recognition confidence score data 311 associated with multiple users is passed to the command processor(s) 290, the command processor(s) 290 may identify content responsive to the utterance and associated with the user associated with the highest recognition confidence.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
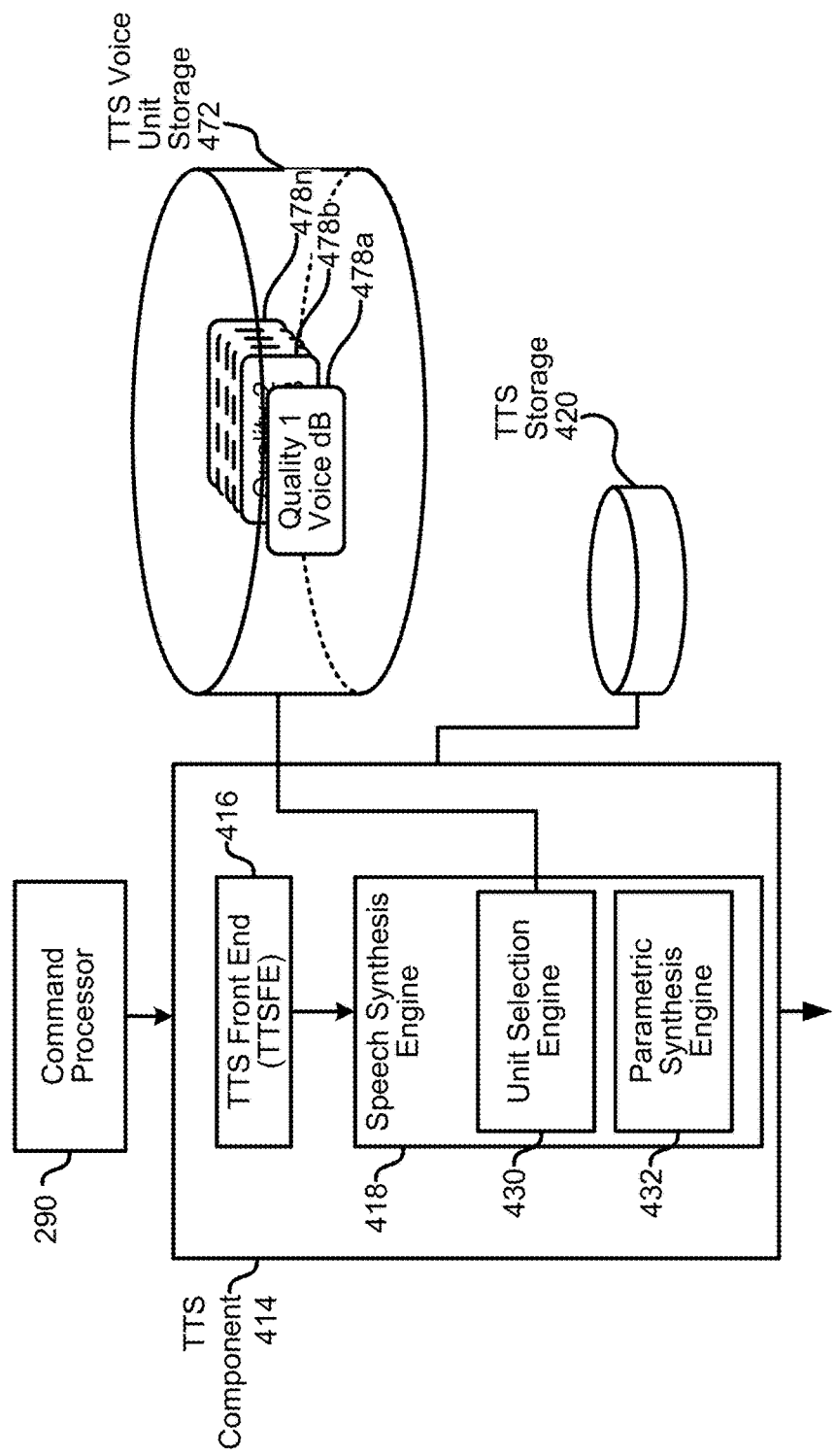
FIG. 4 illustrates an example of generating text-to-speech (TTS) or synthesized speech according to examples of the present disclosure.

FIG. 4 illustrates an example of generating text-to-speech (TTS) or synthesized speech according to examples of the present disclosure. The TTS component/processor 414 includes a TTS front end (TTSFE) 416, a speech synthesis engine 418, and TTS storage 420. The TTSFE 416 transforms input text data (for example from command processor 290) into a symbolic linguistic representation for processing by the speech synthesis engine 418. The TTSFE 416 may also process tags or other data input to the TTS component that indicate how specific words should be pronounced (e.g., an indication that a word is an interjection). The speech synthesis engine 418 compares the annotated phonetic units models and information stored in the TTS storage 420 for converting the input text into speech. The TTSFE 416 and speech synthesis engine 418 may include their own controller(s)/processor(s) and memory or they may use the controller/processor and memory 410 of the server(s) 120a, device 110, or other device, for example. Similarly, the instructions for operating the TTSFE 416 and speech synthesis engine 418 may be located within the TTS component 414, within the memory and/or storage of the server(s) 120*a*, device 110, or within an external device.

Text input into a TTS component 414 may be sent to the TTSFE 416 for processing. The front-end may include components for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 416 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS component 414 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis the TTSFE 416 may then perform linguistic prosody generation where the phonetic units are annotated with desired prosodic characteristics, also called acoustic features, which indicate how the desired phonetic units are to be pronounced in the eventual output speech. During this stage the TTSFE 416 may consider and incorporate any prosodic annotations that accompanied the text input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 416, referred to as a symbolic linguistic representation, may include a sequence of phonetic units annotated with prosodic characteristics. This symbolic linguistic representation may be sent to a speech synthesis engine 418, also known as a synthesizer, for conversion into an audio waveform of speech for output to an audio output device and eventually to a user. The speech synthesis engine 418 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 418 may perform speech synthesis using one or more different methods. In one method of synthesis called unit selection, described further below, a unit selection engine 430 matches the symbolic linguistic representation created by the TTSFE 416 against a database of recorded speech, such as a database of a voice corpus. The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 430 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech. 10012511*n* another method of synthesis called parametric synthesis parameters such as frequency, volume, noise, are varied by a parametric synthesis engine 432, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS component 414 may include an acoustic model, or other models, which may convert a symbolic linguistic representation into a synthetic acoustic waveform of the text input based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 416.

The parametric synthesis engine 432 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 418, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 430 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 430. As part of unit selection, the unit selection engine 430 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 420, in storage 412, or in another storage component. For example, different unit selection databases may be stored in TTS voice unit storage 472. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 418 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS component 414 may be sent to an audio output component, such as a speaker for playback to a user or may be sent for transmission to another device, such as another server(s) 120a, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS component 414 may be configured to perform TTS processing in multiple languages. For each language, the TTS component 414 may include specially configured data, instructions and/or components to synthesize speech in the desired language(s). To improve performance, the TTS component 414 may revise/update the contents of the TTS storage 420 based on feedback of the results of TTS processing, thus enabling the TTS component 414 to improve speech recognition.

Other information may also be stored in the TTS storage 420 for use in speech recognition. The contents of the TTS storage 420 may be prepared for general TTS use or may be customized to include sounds and words that are likely to be used in a particular application. For example, for TTS processing by a global positioning system (GPS) device, the TTS storage 420 may include customized speech specific to location and navigation. In certain instances the TTS storage 420 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 418 may include specialized databases or models to account for such user preferences.

For example, to create the customized speech output of the system, the system may be configured with multiple voice corpuses/unit databases 478a-478n, where each unit database is configured with a different "voice" to match desired speech qualities. The voice selected by the TTS component 414 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 478 may then be used during runtime to perform unit selection to synthesize speech having a speech quality corresponding to the input speech quality.

Figure 5:
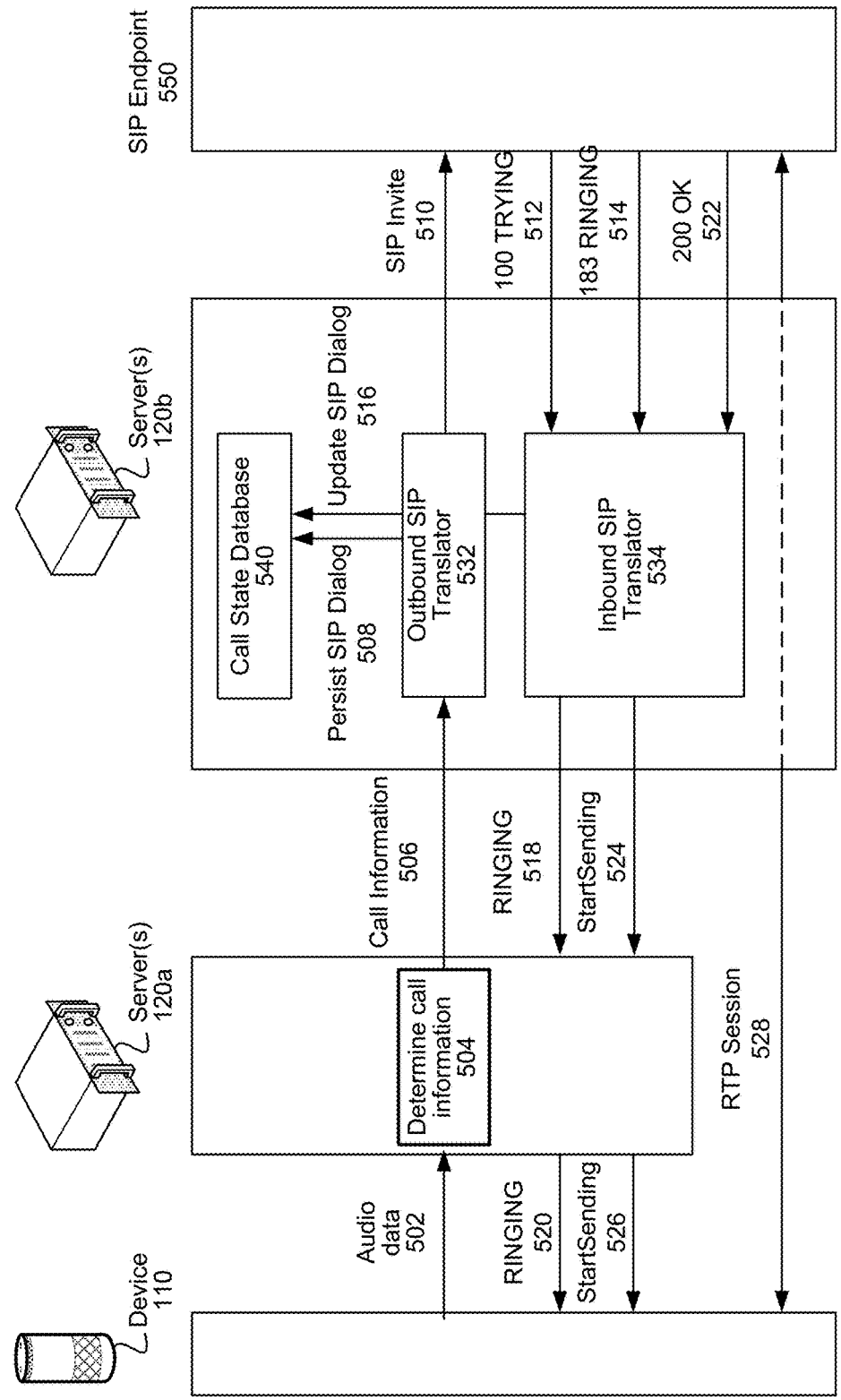
FIG. 5 illustrates an example of signaling to initiate a communication session according to examples of the present disclosure.

FIG. 5 illustrates an example of signaling to initiate a communication session according to examples of the present disclosure. Typically, the server(s) 120a are configured to enable voice commands (e.g., perform ASR, NLU, etc. to identify a voice command included in audio data), whereas the server(s) 120b are configured to enable communication sessions (e.g., using session initiation protocol (SIP)). For example, the server(s) 120a may be configured to perform speech processing to identify call information associated with a communication session and the server(s) 120b may send SIP messages to endpoints (e.g., adapter 22, VoIP device 30, device 110, remote devices, etc.) in order to establish the communication session for sending and receiving audio data and/or video data. The communication session may use network protocols such as real-time transport protocol (RTP), RTP Control Protocol (RTCP), Web Real-Time communication (WebRTC) and/or the like. For example, the server(s) 120b may send SIP messages to initiate a single RTP media stream between two endpoints (e.g., direct RTP media stream between the adapter 22/VoIP device 30, first device 110a and the second device 110b) and/or to initiate and facilitate RTP media streams between the two endpoints (e.g., RTP media streams between the adapter 22/VoIP device 30, first device 110a and the server(s) 120b and between the server(s) 120b and the second device 110b). During a communication session, the server(s) 120b may initiate two media streams, with a first media stream corresponding to incoming audio data from the adapter 22/VoIP device 30, first device 110a to the second device 110b and a second media stream corresponding to outgoing audio data from the second device 110b to the adapter 22/VoIP device 30, first device 110a, although for ease of explanation this may be illustrated as a single RTP media stream.

As illustrated in FIG. 5, the device 110 may send (502) audio data to the server(s) 120a and the server(s) 120a may determine (504) call information using the audio data and may send (506) the call information to the server(s) 120b. The server(s) 120a may determine the call information by performing ASR, NLU, etc., as discussed above with regard to FIGS. 2-4, and the call information may include a data source name (DSN), a number/device/user profile from which to call, a number/device/user profile to which to call, encodings and/or additional information. For example, the server(s) 120a may identify from which device (e.g., first device 110a) the user would like to initiate the communication session, to which device (e.g., second device 110b) the user would like to initiate the communication session, etc.

The server(s) 120b may include an outbound SIP translator 532, an inbound SIP translator 534 and a call state database 540. The outbound SIP translator 532 may include logic to convert commands received from the server(s) 120a into SIP requests/responses and may handle sending outgoing SIP requests and sending responses to incoming SIP requests. After receiving the call information by the outbound SIP translator 532, the outbound SIP translator 532 may persist (508) a SIP dialog using the call state database 540. For example, the DSN may include information such as the name, location and driver associated with the call state database 540 (and, in some examples, a user identifier (ID) and password of the user) and the outbound SIP translator 532 may send a SIP dialog to the call state database 540 regarding the communication session. The call state database 540 may persist the call state if provided a device ID and one of a call ID or a dialog ID. The outbound SIP translator 532 may send (510) a SIP Invite to a SIP Endpoint 550, which may be the adapter 22, the VoIP device 30, the first device 110a, a remote device, a Session Border Controller (SBC) or the like.

The inbound SIP translator 534 may include logic to convert SIP requests/responses into commands to send to the server(s) 120a and may handle receiving incoming SIP requests and incoming SIP responses. The SIP endpoint 550 may send (512) a 100 TRYING message to the inbound SIP translator 534 and may send (514) a 183 RINGING message to the inbound SIP translator 534. The inbound SIP translator 534 may update (516) the SIP dialog using the call state database 540 and may send (518) a RINGING message to the server(s) 120a, which may send (520) the RINGING message to the device 110.

When the communication session is accepted by the SIP endpoint 550, the SIP endpoint 550 may send (522) a 200 OK message to the inbound SIP translator 534, the inbound SIP translator 545 may send (524) a startSending message to the server(s) 120a and the server(s) 120a may send (526) the startSending message to the device 110. The startSending message may include information associated with an internet protocol (IP) address, a port, encoding or the like required to initiate the communication session. Using the startSending message, the device 110 may establish (528) an RTP communication session with the SIP endpoint 550 via the server(s) 120b.

Figure 6B:
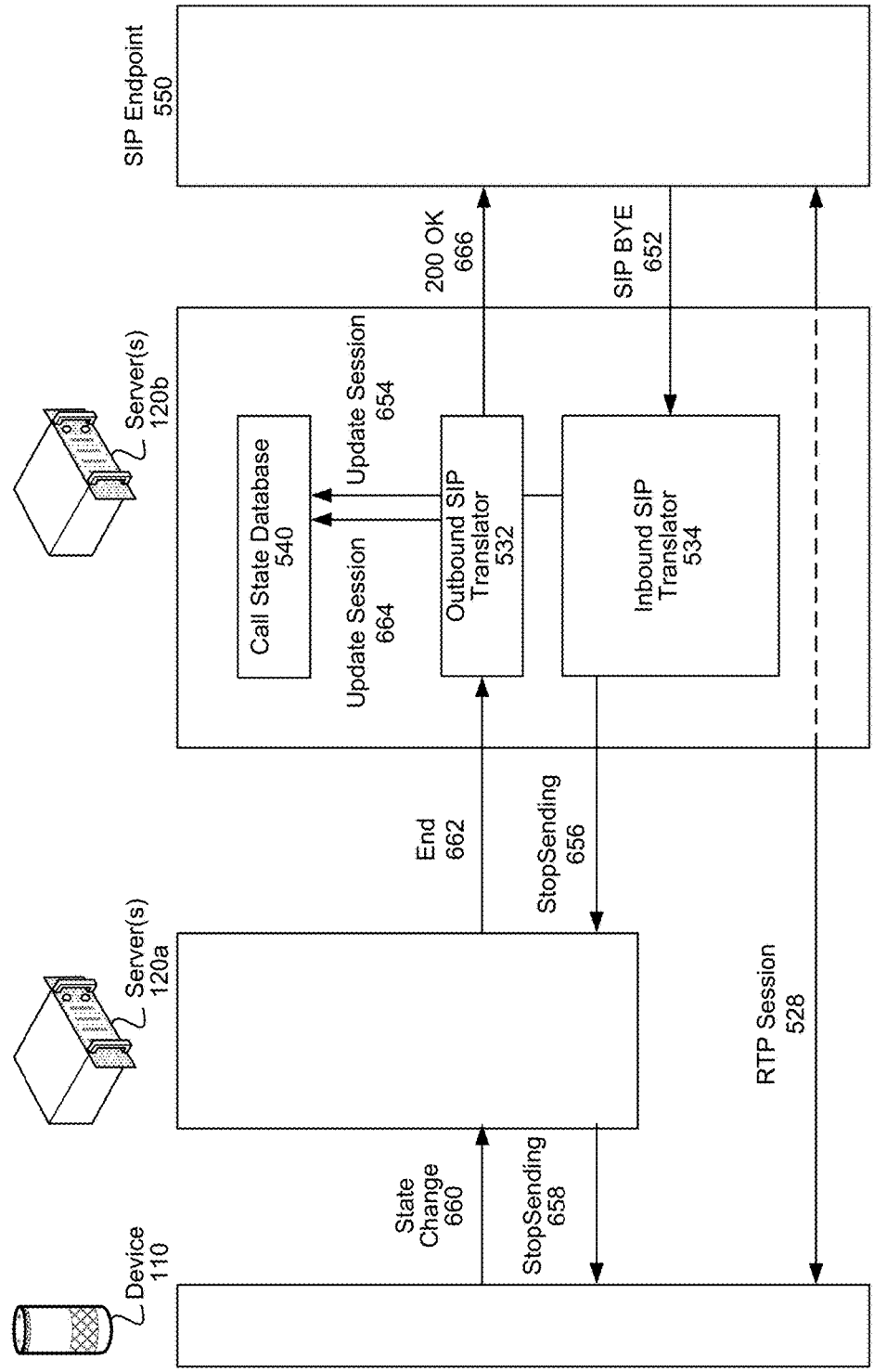

FIG. 6A-6B illustrate examples of signaling to end a communication session according to examples of the present disclosure. After establishing the RTP communication session 528 between the device 110 and the SIP endpoint 550, the RTP communication session may be ended by the user inputting a command to end the communication session to the device 110, as illustrated in FIG. 6A, or a remote party inputting a command to end the communication session to the SIP endpoint 550, as illustrated in FIG. 6B.

As illustrated in FIG. 6A, the device 110 may send (602) a state change message to the server(s) 120a and the server(s) 120a may send (604) an end message to the server(s) 120b. The outbound SIP translator 532 may update (606) the session using the call state database 540 and may send (608) a SIP BYE message to the SIP endpoint 550. The SIP endpoint 550 may send (610) a 200 OK message to the inbound SIP translator 534 and the inbound SIP translator 534 may update (612) the session using the call state database 540. Thus, the RTP communication session 528 may be ended between the device 110 and the SIP endpoint 550.

As illustrated in FIG. 6B, the SIP endpoint 550 may send (652) a SIP BYE message to the inbound SIP translator 534 and the inbound SIP translator 534 may update (654) the session using the call state database 540. The inbound SIP translator 534 may send (656) a stopSending message to the server(s) 120*a* and the server(s) 120*a* may send (658) the stopSending message to the device 110. The device 110 may send (660) a state change message to the server(s) 120*a* and the server(s) 120*a* may send (662) an End message to the outbound SIP translator 532, the End message including a DSN. The outbound SIP translator 532 may then update (664) the session using the call state database 540. Thus, the RTP communication session 528 may be ended between the device 110 and the SIP endpoint 550.

Figure 7A:
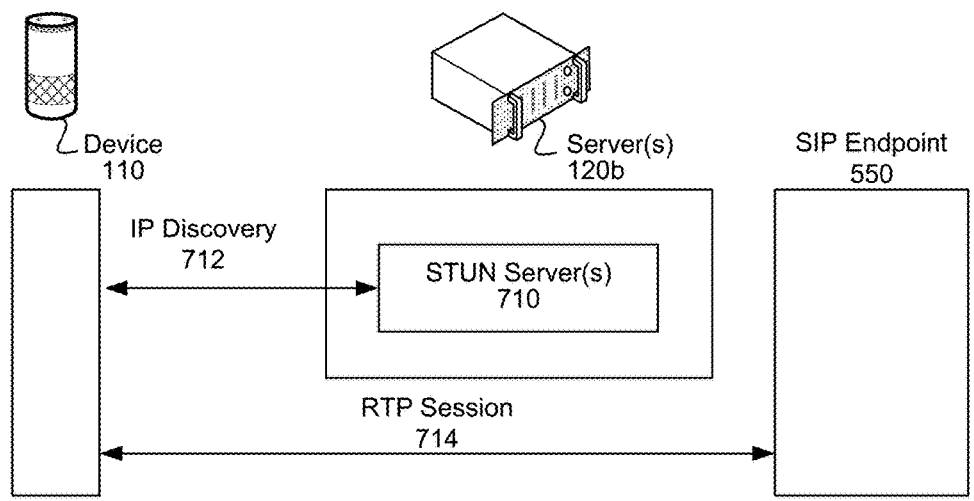
FIG. 7A-7B illustrate examples of establishing media streams between devices according to examples of the present disclosure.
Figure 7B:
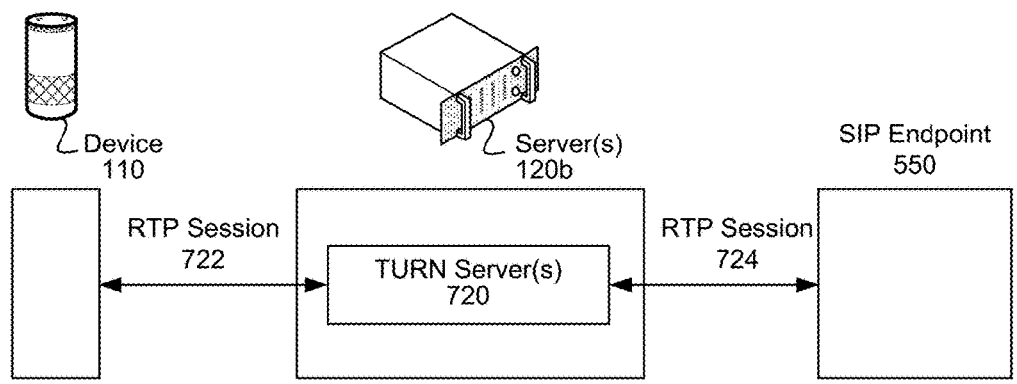

FIG. 7A-7B illustrate examples of establishing media streams between devices according to examples of the present disclosure. In some examples, the device 110 may have a publicly accessible IP address and may be configured to establish the RTP communication session directly with the SIP endpoint 550. To enable the device 110 to establish the RTP communication session, the server(s) 120*b* may include Session Traversal of User Datagram Protocol (UDP) Through Network Address Translators (NATs) server(s) (e.g., STUN server(s) 710). The STUN server(s) 710 may be configured to allow NAT clients (e.g., device 110 behind a firewall) to setup communication sessions with a VoIP provider hosted outside of the local network by providing a public IP address, the type of NAT they are behind and a port identifier associated by the NAT with a particular local port. As illustrated in FIG. 7A, the device 110 may perform (712) IP discovery using the STUN server(s) 710 and may use this information to set up an RTP communication session 714 (e.g., UDP communication) between the device 110 and the SIP endpoint 550 to establish a communication session.

In some examples, the device 110 may not have a publicly accessible IP address. For example, in some types of NAT the device 110 cannot route outside of the local network. To enable the device 110 to establish an RTP communication session, the server(s) 120*b* may include Traversal Using relays around NAT (TURN) server(s) 720. The TURN server(s) 720 may be configured to connect the device 110 to the SIP endpoint 550 when the client 110 is behind a NAT. As illustrated in FIG. 7B, the device 110 may establish (722) an RTP session with the TURN server(s) 720 and the TURN server(s) 720 may establish an RTP session with the SIP endpoint 550. Thus, the device 110 may communicate with the SIP endpoint 550 via the TURN server(s) 720. For example, the device 110 may send outgoing audio data to the server(s) 120*b* and the server(s) 120*b* may send the outgoing audio data to the SIP endpoint 550. Similarly, the SIP endpoint 550 may send incoming audio data to the server(s) 120*b* and the server(s) 120*b* may send the incoming audio data to the device 110.

Figure 8:
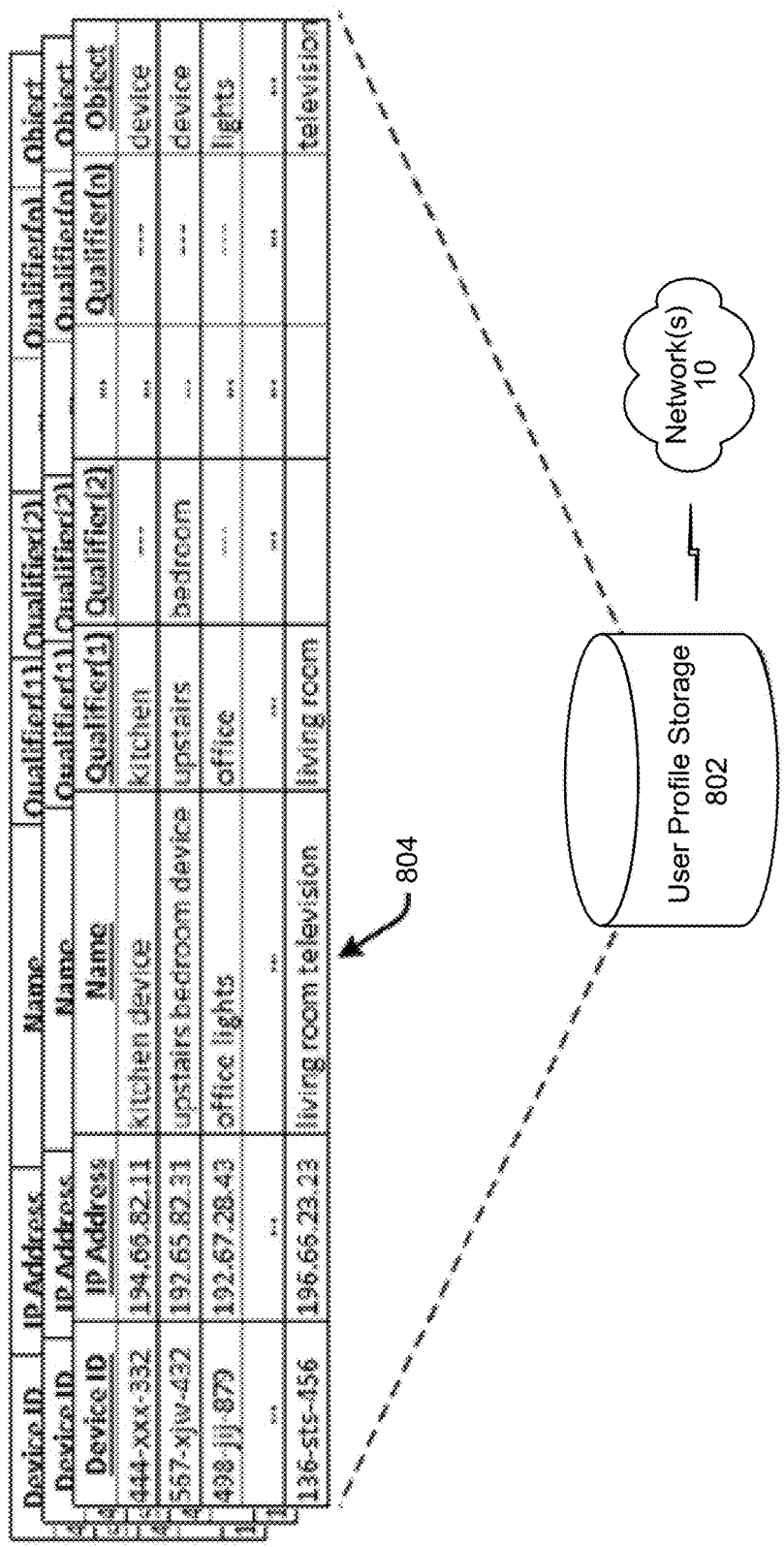
FIG. 8 illustrates data stored and associated with user profiles according to examples of the present disclosure.

The server(s) 120*a* and/or the server(s) 120*b* may include or refer to data regarding user accounts, shown by the user profile storage 802 illustrated in FIG. 8. The user profile storage 802 may be located proximate to server(s) 120, or may otherwise be in communication with various components, for example over network(s) 10. The user profile storage 802 may include a variety of information related to individual users, households, accounts, etc. that interact with the system 100. For illustration, as shown in FIG. 8, the user profile storage 802 may include data regarding the devices associated with particular individual user accounts 804. In an example, the user profile storage 802 is a cloud-based storage. Such data may include device identifier (ID), speaker identifier (ID) data, voice profiles for users, internet protocol (IP) address information, name of device data, and location of device data for different devices as well as names by which the devices may be referred to by a user. Further qualifiers describing the devices may also be listed along with a description of the type of object of the device. In addition, while not illustrated, each user profile 304 may include data regarding the locations of individual devices (including how close devices may be to each other in a home, if the device location is associated with a user bedroom, etc.), address data, or other such information. Data included in each user profile 304 may correspond to the primary wakeword detection component and/or the secondary wakeword detection component to determine whether or not a wakeword is included in output audio data. The output audio data may be generated and transmitted from a remote device via a network(s) 10.

Figure 9:
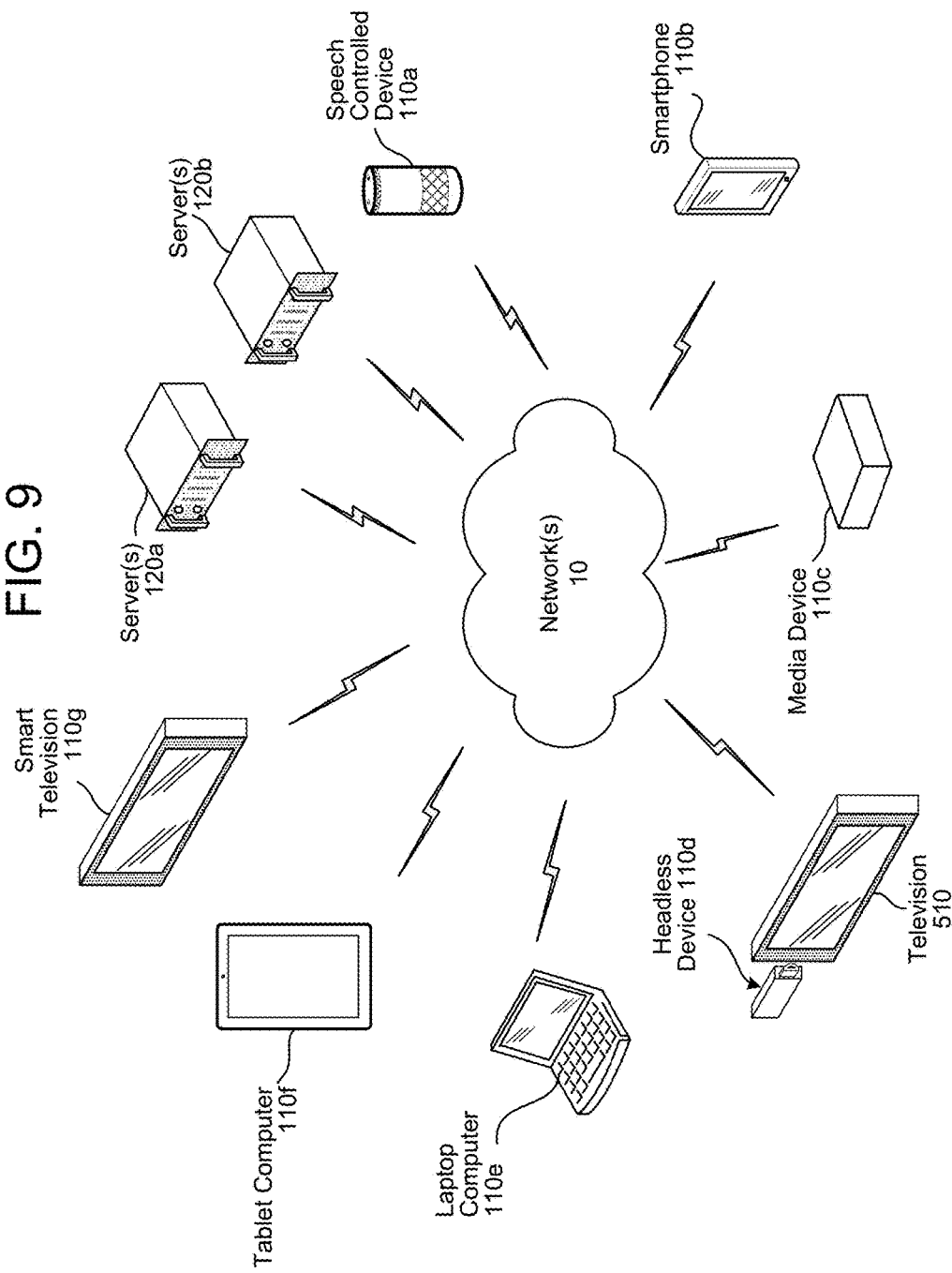
FIG. 9 illustrates an example of a computer network for use with the system according to examples of the present disclosure.

As illustrated in FIG. 9, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a speech controlled device 110*a*, a smartphone 110*b*, a media device 110*c*, a headless device 110*d* connected to a television 910, a laptop computer 110*e*, a tablet computer 110*f* and/or a smart television 110*g*, may be connected to the network(s) 10 through a wired and/or wireless connection. Thus, while the examples illustrated above are directed to the speech controlled device 110*b*, the disclosure is not limited thereto and the device 110 may be any device capable of capturing audio from and/or outputting audio to a user. In addition, the server(s) 120*a* and the server(s) 120*b* may communicate with the device 110 via the network(s) 10.

While the examples described herein illustrate the device 110 performing multiple functions, the disclosure is not limited thereto. Instead, the server(s) 120*a* may perform any of the functions described herein without departing from the disclosure. For example, the server(s) 120*a* may assist the device 110 with Automatic Speech Recognition (ASR) processing, Natural Language Understanding (NLU) processing, command processing, and/or generating synthesized speech. A single server 120*a* may be capable of performing all speech processing or multiple server(s) 120*a* may combine to perform the speech processing. In addition, certain speech detection or command execution functions may be performed by device 110. Thus, the device 110 and/or the server(s) 120*a* may perform the functions described herein without departing from the disclosure.

Figure 10:
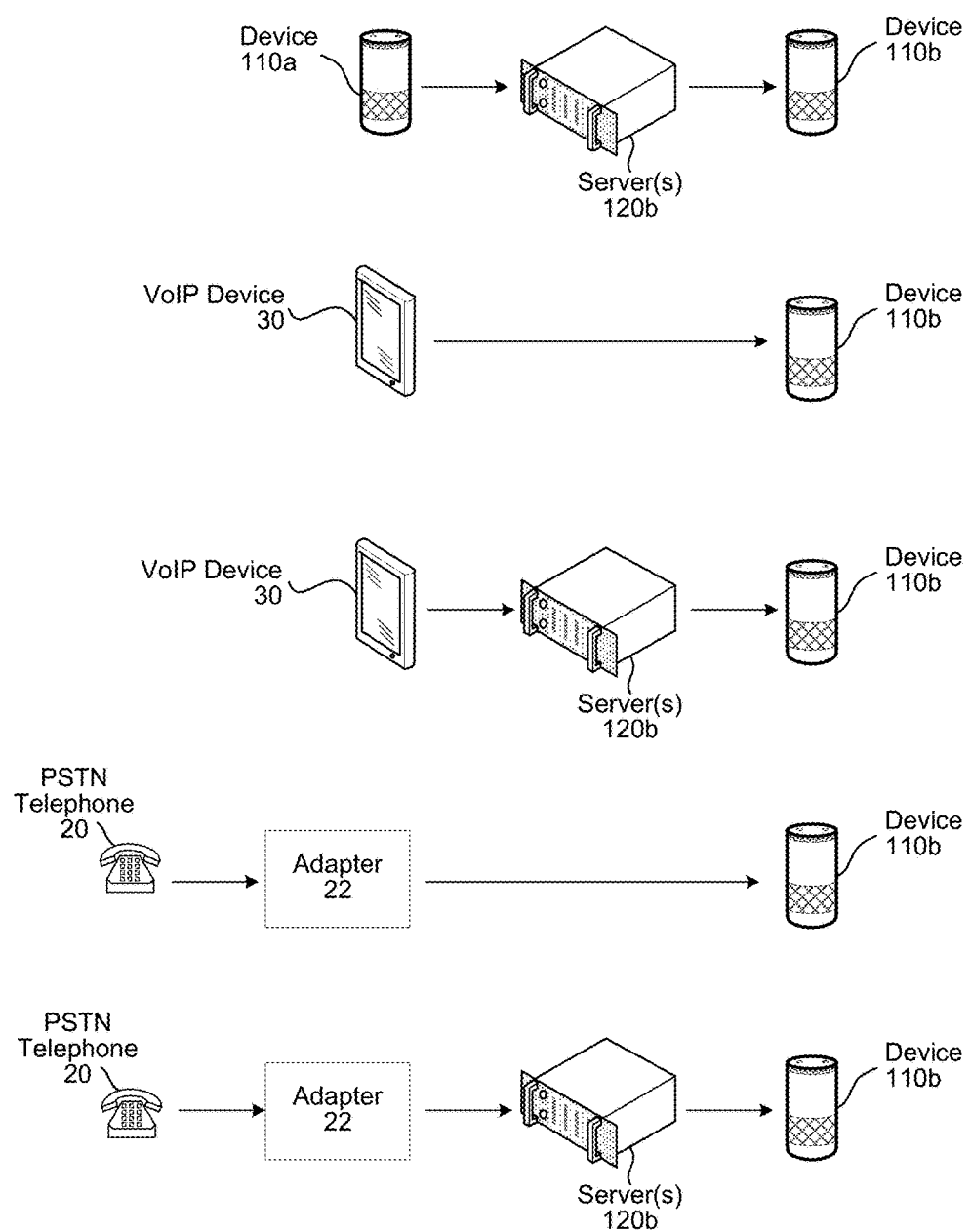
FIG. 10 illustrates examples of communication paths according to examples of the present disclosure.

FIG. 10 illustrates examples of communication paths according to embodiments of the present disclosure. As illustrated in FIG. 10, the system 100 may enable remote control for audio data traveling from the caller device to the callee device via multiple different communication paths. For example, a first communication path may correspond to the first device 110*a* sending audio data to the server(s) 120*b* and the server(s) 120*b* sending the audio data to the second device 110*b*. A second communication path may correspond to the VoIP device 30 sending audio data to the second device 110*b*, while a third communication path may correspond to the VoIP device 30 sending audio data to the server(s) 120*b* and the server(s) 120*b* sending the audio data to the second device 110*b*. A fourth communication path may correspond to the PSTN telephone 20 sending audio data to the adapter 22 and the adapter 22 sending the audio data to the second device 110*b*, while the fifth communication path may correspond to the PSTN telephone 20 sending audio data to the adapter 22, the adapter 22 sending the audio data to the server(s) 120*b* and the server(s) 120*b* sending the audio data to the second device 110*b*.

FIG. 1A illustrates a first example in which the system 100 is configured to enable remote control by associating a voice command originating from a first user profile with a second user profile. Thus, the first example is directed to the server(s) 120*a* enabling remote control, which is enabled using the first communication path, the third communication path and the fifth communication path, as discussed in greater detail below with regard to FIG. 12. In addition, when the first device 110*a* is configured to detect a wakeword, the first communication path enables end-to-end encryption of first audio data and may separately send second audio data to the server(s) 120*a* to determine the voice command, as discussed in greater detail below with regard to FIG. 13.

FIG. 1B illustrates a second example in which the system 100 is configured to enable remote control by detecting a wakeword represented in incoming audio data. Thus, the second example is directed to the second device 110*b* enabling the remote control, which is enabled by all of the communication paths, as discussed in greater detail below with regard to FIG. 14. By detecting that the wakeword is represented in the incoming audio data using the second device 110*b*, the system 100 may be configured to enable end-to-end encryption of first audio data sent via the server(s) 120*b* and may separately send second audio data to the server(s) 120*a* to determine the voice command.

FIG. 11 is a communication diagram conceptually illustrating an example of granting a first user profile remote control to a second user profile according to embodiments of the present disclosure. As illustrated in FIG. 11, the second device 110*b* (e.g., callee device) may generate (1110) audio data, may detect (1112) that a wakeword is represented in the audio data, and may send (1114) audio data to the server(s) 120*a*. The server(s) 120*a* may determine (1116) that the audio data grants the first user profile remote control to the second user profile.

In some examples, the server(s) 120*a* may optionally grant (1118) the first user profile remote control to the second user profile (e.g., set a flag, store an indication, store in settings or otherwise save the association between the first user profile and the second user profile), may optionally send (1120) an instruction to enable wakeword detection for incoming audio data to the second device 110*b* and the second device 110*b* may optionally enable (1122) wakeword detection for incoming audio data.

FIG. 12 is a communication diagram conceptually illustrating an example of enabling remote control by detecting a voice command during a conversation according to embodiments of the present disclosure. As illustrated in FIG. 12, the server(s) 120*a* may determine (1116) that the audio data grants the first user profile remote control to the second user profile. After determining that remote control has been granted, a caller device 1200 may send (1210) conversation audio data to the server(s) 120*b* and the server(s) 120*b* may send (1212) the conversation audio data to the second device 110*b*.

In addition, the server(s) 120*b* may send (1214) the conversation audio data to the server(s) 120*a*. The conversation audio data may correspond to audio data representing a conversation between a first user of the caller device 1200 and a second user of the second device 110*b*. Thus, the server(s) 120*a* may "listen" to the conversation and determine whether the conversation audio data represents a voice command. For example, the server(s) 120*a* may optionally detect (1216) whether a wakeword is represented in the conversation audio data, determine (1218) a voice command represented in the conversation audio data, determine (1220) that the first user profile is granted remote control to the second user profile and may initiate (1222) the voice command based on the second user profile. Thus, the server(s) 120*a* may perform an action (e.g., execute a command, send an instruction to execute a command, etc.) corresponding to the voice command as though the voice command was received from the second device 110*b*.

As part of step 1218, the server(s) 120*a* may determine an identity of the speaker, as discussed in greater detail above with regard to the user recognition component 302 illustrated in FIG. 3. In some examples, the system 100 may tag audio data with device identifier (ID) and/or a user ID. For example, the first device 110*a* may be associated with a first user and the system 100 may tag first audio data originating from the first device 110*a* with a first user ID and a first device ID associated with the first device 110*a*. The server(s) 120*a* may use the first user ID and/or the first device ID to determine the identity of the speaker.

When three or more devices are included in a communication session, the system 100 may mix audio data. For example, the second device 110*b* may receive audio data corresponding to first audio data originating from the first device 110*a* and second audio data originating from an additional device. To enable restricted remote control of the second user profile, the system 100 may tag portions of the mixed audio data based on where the audio originated from. For example, if speech is represented in the first audio data but not the second audio data at a first time, the mixed audio data may include an indication of the first user ID and/or the first device ID at the first time.

FIG. 13 is a communication diagram conceptually illustrating an example of enabling remote control by associating a voice command originating from a first user profile with a second user profile according to embodiments of the present disclosure. As illustrated in FIG. 13, the server(s) 120*a* may grant (1118) the first user profile remote control to the second user profile. After the remote control has been granted, the first device 110*a* may send (1310) conversation audio data to the server(s) 120*b* and the server(s) 120*b* may send (1312) the conversation audio data to the second device 110*b*.

While capturing and sending the conversation audio data, the first device 110*a* may detect (1314) a wakeword, may generate (1316) command audio data corresponding to the wakeword and may send (1318) the command audio data to the server(s) 120*a*. For example, the first device 110*a* may detect that the wakeword is represented in the conversation audio data and may generate the command audio data from a portion of the conversation audio data.

In some examples, the command audio data may be generated and/or processed separately from the conversation audio data. For example, the first device 110*a* may capture the conversation audio data using two or more microphone(s) 112 and may separately capture the command audio data using a single microphone 112. Additionally or alternatively, the first device 110*a* may perform first audio processing on the conversation audio data and may perform second audio processing on the command audio data. However, the disclosure is not limited thereto and the first device 110a may generate the command audio data from the conversation audio data without departing from the disclosure. Additionally or alternatively, the first device 110a may not send the command audio data to the server(s) 120a, but instead may send a command to the server(s) 120b to send a portion of the conversation audio data (e.g., command audio data) to the server(s) 120a. Thus, the first device 110a sends the conversation audio data to the server(s) 120b and the server(s) 120b forwards at least a portion of the conversation audio data to both the second device 110b and the server(s) 120a.

The server(s) 120a may determine (1320) a voice command represented in the command audio data, may optionally determine (1322) that the voice command is intended for the second user profile, may determine (1324) that the first user profile is granted remote control to the second user profile, may associate (1326) the voice command with the second user profile and may initiate (1328) the voice command based on the second user profile. Thus, the server(s) 120a may perform an action (e.g., execute a command, send an instruction to execute a command, etc.) corresponding to the voice command as though the voice command was received from the second device 110b.

FIG. 14 is a communication diagram conceptually illustrating an example of enabling remote control by detecting a wakeword represented in incoming audio data according to embodiments of the present disclosure. As illustrated in FIG. 14, the second device 110b may enable (1122) the wakeword detection for incoming audio data. After enabling the wakeword detection, a caller device 1400 may send (1410) conversation audio data to the server(s) 120b and the server(s) 120b may send (1412) the conversation audio data to the second device 110b.

The second device 110b may detect (1414) that a wakeword is represented in the conversation audio data, may generate (1416) command audio data and send (1418) the command audio data to the server(s) 120a. In some examples, the second device 110b may disable and/or modify echo cancellation processing and/or a secondary wakeword detection processing, enabling the second device 110b to output audio corresponding to the conversation audio data, capture the command audio data using the microphone(s) 112 and detect the wakeword in the command audio data. Thus, the second device 110b may detect the wakeword based on generating the audio output. In other examples, the second device 110b may modify echo cancellation processing and/or the secondary wakeword detection component in order to detect the wakeword directly from the conversation audio data. For example, the second device 110b may detect that the wakeword is represented in the conversation audio data during the echo cancellation process/secondary wakeword processing and may generate the command audio data from the conversation audio data. Thus, the second device 110b may generate the command audio data directly from the conversation audio data and not from capturing audio data using the microphone(s) 112.

The server(s) 120a may determine (1420) a voice command represented in the command audio data and may initiate (1422) the voice command based on the second user profile. Thus, the server(s) 120a may perform an action (e.g., execute a command, send an instruction to execute a command, etc.) corresponding to the voice command as though the voice command was received from the second device 110b.

While FIGS. 11-14 illustrate the server(s) 120a determining a voice command from audio data, the disclosure is not limited thereto. Instead, the server(s) 120 may determine a command from text data without performing ASR. For example, the first device 110a may send a message including text data to the server(s) 120a, the server(s) 120b and/or the second device 110b and the server(s) 120a may perform NLU processing on the text data in order to determine a command to execute. Thus, the remote control may grant the first user profile (e.g., associated with the first device 110a) the ability to initiate commands for the second user profile (e.g., associated with the second device 110b) via voice commands, textual commands (e.g., text messages, electronic messages, text-based user interfaces, or the like) or using other techniques known to one of skill in the art without departing from the disclosure. For example, instead of granting remote control during a communication session, a user associated with the second user profile may input a command delegating control (e.g., granting access rights, authorization or the like) to the first user profile. Based on the delegation of control, the first user profile may input commands to the server(s) 120a using voice commands (e.g., during a communication session), textual commands and/or the like at any time.

One drawback to the use of a wakeword is that a system may detect the wakeword when the wakeword was detected by the device 110, but was not actually spoken by a user 2 with the intention of controlling the device 110. This may occur because the device 110 may use techniques to allow for the detection of wakewords from multiple users and may not be able to distinguish between the actual user 2 and wakewords from other sources, including potentially instances of the wakeword output by the device 110 itself. For example, if the device 110 detects the wakeword followed by a command, then generates audio output in response to processing the command (such as playing music, outputting a news report, or the like), the wakeword may be included in the resulting output audio data 115 (e.g., the song, news report, etc.).

If output audio data 115 is actually output as output audio 15 (e.g., an audio wave) from the speaker(s) 114 of the device 110, the inadvertent wakeword (e.g., the wakeword originating from the output audio data 115 rather than from the user 2) may be detected by the microphone(s) 112 of the device and processed as if it were an intended wakeword. Thus, if the inadvertent wakeword is detected by the device 110, the device 110 may not necessarily know if the wakeword was spoken by the user 2 or originated from the speaker(s) 114 of the device 110. As a result, the device 110 may inadvertently halt its operation or attempt to listen for, detect and process a new command, even if such control of the device 110 was not intended. For present discussion, a wakeword that is detected by a device 110, but should not be used to control the device 110, is referred to as an inadvertent wakeword. A command following a wakeword that is detected by a device 110, but should not be used to control the device 110, is referred to as an inadvertent command.

One example of such an inadvertent wakeword is a wakeword that is output as part of or included in output audio data 115 played in response to a command that was input to the device 110. For example, the device 110 may detect a wakeword and a command following the wakeword. The command may be processed and may result in output audio data 115 that includes the wakeword. Such output audio data 115 may include a news report, television show, advertisement, call with another device, or any other audio content, wherein the audio content includes the wakeword.

Another example of an inadvertent wakeword is a wakeword that is output as part of or included in output audio data 115 corresponding to incoming audio data during a communication session (e.g., conversation). Thus, the inadvertent wakeword may be spoken by a remote user that does not have authorization to control the device 110. Once generated or produced, the output audio data 115 including the inadvertent wakeword may be sent to the device 110 to be output from the speaker(s) 114.

Acoustic Echo Cancellation (AEC) is one technique for avoiding processing of the output audio data 115 that was output by the device 110 but then captured as input audio data 113. AEC refers to a process of removing output audio data 115 from input audio data 113 to isolate speech (e.g., an utterance) and/or other sounds for processing. For example, the device 110 can capture speech (e.g., speech command, outgoing speech corresponding to a conversation, etc.) while outputting output audio 15 (e.g., music, incoming speech corresponding to the conversation, etc.) and AEC processing may remove the output audio 15 to isolate the speech. In AEC, the device 110 knows what audio data (e.g., output audio data 115) is being processed for output to the speaker(s) 114, knows the positioning relationship between the speaker(s) 114 and microphone(s) 112, and can thus, accounting for propagation and other delays, attempt to subtract the output audio data 115 that was sent to the speaker(s) from the input audio data 113 captured by the microphone(s) 112.

As illustrated in FIG. 15A, the device 110 may receive the output audio data 115 from the remote server(s) 120b via the network(s) 10 and may output the output audio 15 based on the output audio data 115 using speaker(s) 114. For example, the output audio data 115 may be converted to audio waves and output via the speaker(s) 114 as output audio 15. The output audio 15 may be broadcast out into the environment in which the microphone(s) 112 may detect the output audio 15. While the device 110 is outputting the output audio 15, the device 110 may capture input audio data 113 using microphone(s) 112, which captures any audio in the environment around the device 110. Thus, when a user 2 generates input audio 11 (e.g., speech command, outgoing speech corresponding to the conversation, etc.), the input audio data 113 may include the input audio 11 and the output audio 15. The output audio 15 may negatively impact speech processing performed by the server(s) 120a (e.g., reduce a confidence level and/or a reliability of speech processing results) and/or may degrade audio quality during a communication session.

To improve the speech processing and/or audio quality, an acoustic echo canceller (AEC) 1508 may process the input audio data 113 to remove the output audio data 115 and generate audio data 111 that corresponds to the input audio 11. For example, the AEC 1508 may use techniques known to one of skill in the art to effectively remove the output audio data 115 (e.g., x) from the input audio data 113 (e.g., z=x+y) to generate the audio data 111 (e.g., y). The device 110 may send the audio data 111 to the server(s) 120a for speech processing or the like, although the disclosure is not limited thereto and the device 110 may send the audio data 111 to the server(s) 120b during a communication session without departing from the disclosure.

FIG. 15B illustrates an example of temporarily disabling AEC processing when remote control is granted according to examples of the present disclosure. In some examples, when remote control is granted to a caller device, the device 110 may be configured to detect a wakeword in incoming audio data and send command audio data corresponding to the incoming audio data to the server(s) 120a. Thus, the server(s) 120a receive the command audio data from the device 110 and may interpret a voice command represented in the command audio data as though the voice command originated from the device 110. However, the wakeword detection component 220 may be downstream of the AEC processing. Therefore, due to the AEC processing, the device 110 may be unable to detect the wakeword in the audio data 111 as the AEC processing generates the audio data 111 by removing the output audio data 115 from the input audio data 113.

To enable the device 110 to detect the wakeword corresponding to the output audio data 115 in the audio data 111, the system 100 may send a notification (e.g., notification that remote control is granted 1510) to the device 110 and the device 110 may disable the AEC 1508, as illustrated in FIG. 15B. As the AEC 1508 is disabled, the audio data 111 may correspond to the input audio data 113 and a wakeword corresponding to the output audio 15 (e.g., output audio data 115) may be represented in the audio data 111. Thus, the device 110 may be configured to detect the wakeword based on the incoming audio data by disabling the AEC processing.

While FIG. 15B illustrates an example of disabling the AEC 1508 while remote control has been granted, the disclosure is not limited thereto and the device 110 may disable the AEC 1508 for shorter periods of time without departing from the disclosure. For example, the device 110 may include a secondary wakeword detection component 220b configured to detect the wakeword in the output audio data 115 and the device 110 may disable the AEC 1508 based on the secondary wakeword detection component 220b detecting the wakeword, as described in greater detail below with regard to FIGS. 16D and 17B.

As illustrated in FIG. 16A, the device 110 may perform wakeword detection using a wakeword detection component 220. During normal operation, the device 110 may perform the wakeword detection by detecting audio waves (e.g., input audio data 113, which may be processed to generate audio data 111) that may include a wakeword using the microphone(s) 112. The audio data 111 may include the detected wakeword followed by a command, both uttered by the user 2. Once the initial wakeword is detected, the device 110 may transmit the audio data 111 including the command to the server(s) 120a for processing. However, a wakeword included in the output audio data 115 may be output in the output audio 15 and may trigger an inadvertent wakeword by the wakeword detection component 220 (e.g., wakeword in output audio detectable by microphone 1602).

As described above, AEC is one technique for avoiding processing of the output audio data 115 that was output by the device 110 but then captured as input audio data 113. AEC is not perfect, however, and even while performing AEC a device may not fully cancel out all audio and thus some remnants of the output audio data 115 may still remain after performing AEC on the input audio data 113. This means that if a wakeword was included in the output audio data 115 being sent to speaker(s) 114, some representation of that wakeword may still remain in uncancelled data (e.g., audio data 111) following AEC processing. Further, if the wakeword detection component 220 (which may sit downstream from AEC 1508), particularly if tuned aggressively, may still detect a wakeword in the post-AEC data (e.g., audio data 111). Thus, even for a system using AEC, or other audio processing techniques, further techniques may be needed to prevent inadvertent wakewords from being detected and processed, which may thereby interfere with proper system operation.

In order to avoid inadvertent wakeword detection, the device 110 may be configured to temporarily disable wakeword detection during the time in which the wakeword will be output from the speaker(s) 114 and detectable by the microphone(s) 112 (e.g., during playback of output audio data 115 upon detecting the wakeword in the output audio data 115). Such a configuration may involve multiple wakeword detectors (e.g., wakeword detection components 220), as illustrated in FIG. 16B. For example, FIG. 16B illustrates that the device 110 may include a primary wakeword detection component 220a and a secondary wakeword detection component 220b, which may detect a wakeword in the output audio data 115 before it is output from the speaker(s) 114. The secondary wakeword detection component 220b may receive the output audio data 115 from the server(s) 120b via the network(s) 10 during a communication session (e.g., incoming audio data corresponding to a conversation). Upon receipt of the output audio data 115, the secondary wakeword detection component 220b may determine that the output audio data 115 includes the wakeword (e.g., detect wakeword 1604). In response to determining that the output audio data 115 includes the wakeword, the secondary wakeword detection component 220b and/or a wakeword synchronization component 1622 may send data (e.g., indicator to ignore incoming wakeword 1606) corresponding to instructions to the primary wakeword detection component 220a, wherein the instructions are to ignore the incoming wakeword. In other words, the instructions to ignore the incoming wakeword may disable the primary wakeword detection component 220a during a time interval in which the wakeword will be output from the speaker(s) 114 as part of the output audio data 115. Thus, the wakeword detection component 220a will temporarily ignore the wakeword represented in the audio data 111.

The wakeword synchronization component 1622 may be in communication with the primary wakeword detection component 220a and the secondary wakeword detection component 220b to receive an indicator (such as a timestamp) of a wakeword occurrence in the output audio data 115. The primary wakeword detection component 220a and the secondary wakeword detection component 220b may also be configured to receive data corresponding to an indication of when the wakeword appears in input audio data 111 or in the output audio data 115. For example, the secondary wakeword detection component 220b may determine when the output audio data 115 includes the wakeword. It may then identify the presence of and/or time of the wakeword in the output audio data 115. The wakeword synchronization component 1622 may, based on wakeword timestamps, indicate to the primary wakeword detection component 220a when to deactivate (and then reactivate) wakeword detection. In an example embodiment, the wakeword synchronization component 1622 may generate an instruction to the primary wakeword detection component 220a to avoid detection of a wakeword at a specific time stamp or time interval when the secondary wakeword detection component 220b detects a wakeword included in the output audio data 115.

In another example embodiment, the wakeword synchronization component 1622 may be configured to receive inputs from the primary wakeword detection component 220a and the secondary wakeword detection component 220b and perform logical functions on the inputs to generate instructions to be transmitted to the primary wakeword detection component 220a and/or the secondary wakeword detection component 220b. The instructions may activate or deactivate primary wakeword detection component 220a at specific time periods and/or for specific time intervals. The time periods and/or time intervals may be based on time stamps received from the secondary wakeword detection component 220b, wherein the time stamps may correspond to an instance of a wakeword detected in output audio data 115. Based on the time stamps and the configuration of the device 110 (which may provide the wakeword synchronization component 1622 with a priori knowledge of how long audio data takes from being received to being played by a speaker(s) 114 to being recaptured as audio by the microphone(s) 112), the wakeword synchronization component 1622 may disable the primary wakeword detection component 220a during the time window the wakeword is likely to be detected. The time stamps may thus correspond to a delay in the detection of a wakeword. The time stamps may also be dynamic or static, wherein the time stamps may at different times in the input audio data 111 and the output audio data 115. The time stamps may also may be merged and/or manipulated by the wakeword synchronization component 1622.

The output audio data 115 may correspond to incoming audio data during a communication session and may be transmitted to the secondary wakeword detection component 220b from the server(s) 120b via the network(s) 10. The secondary wakeword detection component 220b may determine if a wakeword is in the output audio data 115. The secondary wakeword detection component 220b may also determine a time interval of each instance the wakeword appears in the output audio data 115. For example, the secondary wakeword detection component 220b may determine the wakeword appears at a first point corresponding to 3 seconds after the beginning of the output audio data 115 and the wakeword appearance may end at a second point corresponding to 4 seconds after the beginning of the output audio data 115 (or 1 second after the first point of the output audio data 115).

Upon detection of the wakeword in the output audio data 115 and determining the time interval of each wakeword appearance in the output audio data 115, the secondary wakeword detection component 220b, wakeword synchronization component 1622, and/or other component may send an indicator/signal to the primary wakeword detection component 220a to ignore the incoming wakeword. For example, the indicator/signal to the primary wakeword detection component 220a may indicate the presence of the wakeword and exactly when and for how long the wakeword appears in the output audio data 115. Therefore, when the output audio data 115 is output from the speaker(s) 114 and detectable by the microphone(s) 112, the primary wakeword detection component 220a will ignore the wakeword and not interrupt playback of the output audio data 115 from the speaker(s) 114. As a result, the output audio data 115 is played without interruption. However, a wakeword uttered by the user 2 outside of the time interval(s) of which the wakeword appears in the output audio data 115 will not be ignored by the primary wakeword detection component 220a.

In some examples, when remote control is granted to a caller device, the device 110 may be configured to detect a wakeword in incoming audio data and send command audio data corresponding to the incoming audio data to the server(s) 120a. Thus, the server(s) 120a receive the command audio data from the device 110 and may interpret a voice command represented in the command audio data as though the voice command originated from the device 110. In order to enable the device 110 to detect the wakeword in the audio data 111, the device 110 may temporarily disable the secondary wakeword detection component 220b when remote control is granted.

FIGS. 16C-16E illustrate examples of disabling or modifying a secondary wakeword engine when remote control is granted according to examples of the present disclosure. To enable the device 110 to detect the wakeword corresponding to the output audio data 115 in the audio data 111, the system 100 may send a notification (e.g., notification that remote control is granted 1610) to the device 110 and the device 110 may disable the secondary wakeword detection component 220 and/or the wakeword sync component 1622, as illustrated in FIG. 16C. As the secondary wakeword detection component 220 and/or the wakeword sync component 1622 is disabled. the wakeword synchronization component 1622 may not send an indicator (e.g., does not send indicator 1612) when the wakeword is detected in the output audio data 115. Thus, the primary wakeword detection component 220a is not be disabled when the wakeword is detected in the output audio data 115 and may detect the wakeword corresponding to the output audio data 115 in the audio data 111.

Additionally or alternatively, the wakeword synchronization component 1622 may send an indicator to disable the AEC 1508 (e.g., indicator to disable echo cancellation 1614), as illustrated in FIG. 16D. Thus, the AEC 1508 may perform AEC processing while remote control is granted but the AEC processing is only temporarily disabled when the wakeword is detected in the output audio data 115.

While FIGS. 16C-16D illustrate the primary wakeword detection component 220a detecting the wakeword in the audio data 111 corresponding to input audio data 113 captured by the microphone(s) 112, the disclosure is not limited thereto. Instead, when the device 110 receives the notification (e.g., notification that remote control is granted 1610), the secondary wakeword detection component 220b and/or the AEC 1508 may detect the wakeword in the output audio data 115 and generate command audio data 1620 directly from the output audio data 115, as illustrated in FIG. 16E. Thus, the device 110 may generate the command audio data 1620 without using the microphone(s) 112 and may send the command audio data 1620 to the server(s) 120a for speech processing. In some examples, the secondary wakeword detection component 220b may detect the wakeword in the output audio data 115 and generate the command audio data 1620, but the disclosure is not limited thereto and the AEC 1508 may be modified to generate the command audio data 1620 from the output audio data 115 without departing from the disclosure.

In some examples, the second device 110b may generate the command audio data selectively based on whether remote control is granted to an individual speaker. For example, the system 100 may tag audio data with device identifier (ID) and/or a user ID and the second device 110b may only generate the command audio data when a wakeword corresponds to a device ID or user ID that is granted remote control of the second user profile. To illustrate an example, the first device 110a may be associated with a first user and the system 100 may tag first audio data originating from the first device 110a with a first user ID and a first device ID associated with the first device 110a. If the second device 110b detects that the wakeword is represented in the first audio data, the second device 110b may determine that the first user ID/first device ID corresponding to the wakeword is granted remote control prior to generating the command audio data.

When three or more devices are included in a communication session, the system 100 may mix audio data. For example, the second device 110b may receive audio data corresponding to first audio data originating from the first device 110a and second audio data originating from an additional device. To enable restricted remote control of the second user profile, the system 100 may tag portions of the mixed audio data based on where the audio originated from. For example, if speech is represented in the first audio data but not the second audio data at a first time, the mixed audio data may include an indication of the first user ID and/or the first device ID at the first time. Thus, if the second device 110b detects that the wakeword is represented in the mixed audio data, the second device 110b may determine the user ID/device ID corresponding to the wakeword and determine that the user ID/device ID is granted remote control prior to generating the command audio data.

Figure 17A:
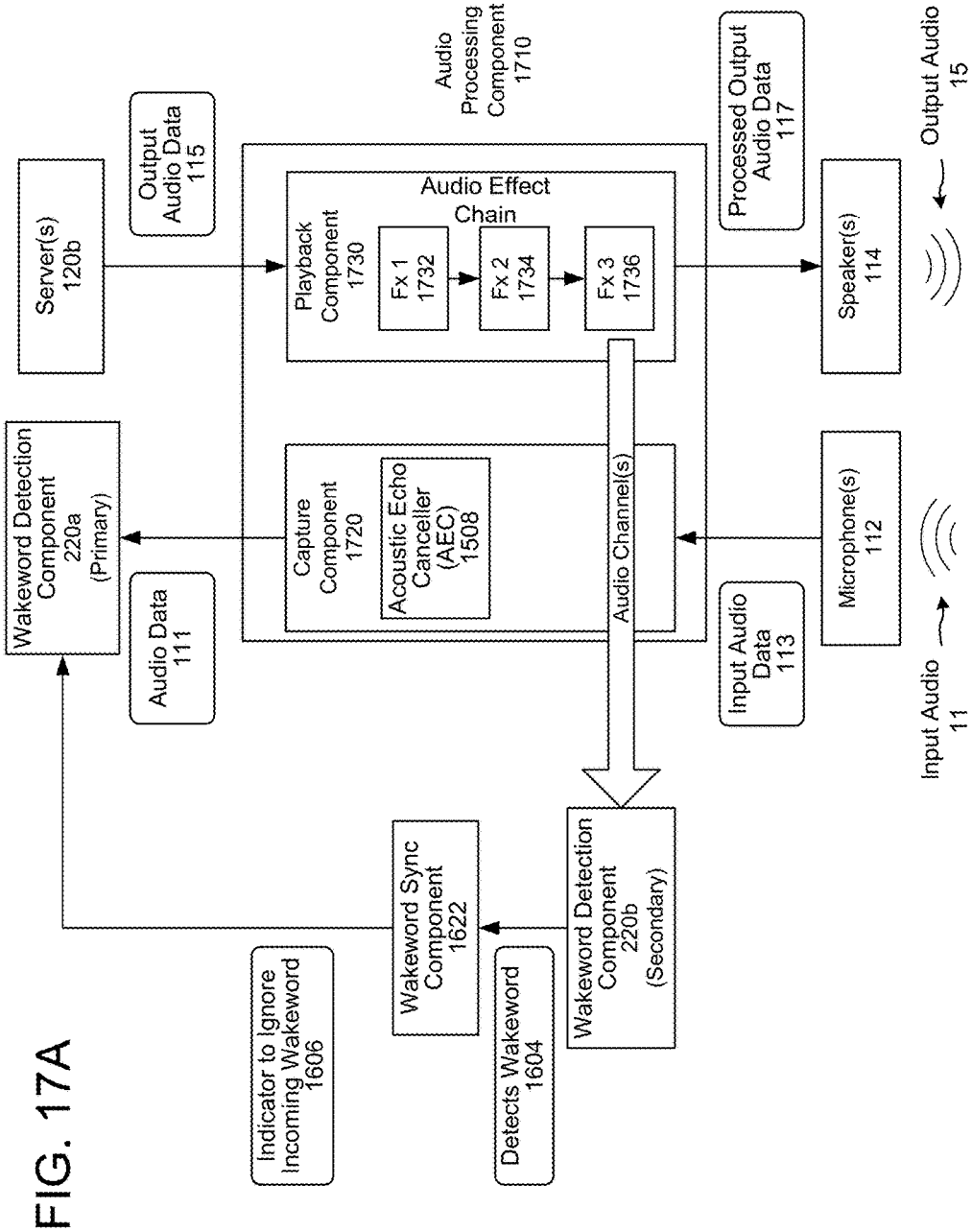
FIGS. 17A-17B illustrate example component diagrams of an audio processing component according to examples of the present disclosure.
Figure 17B:
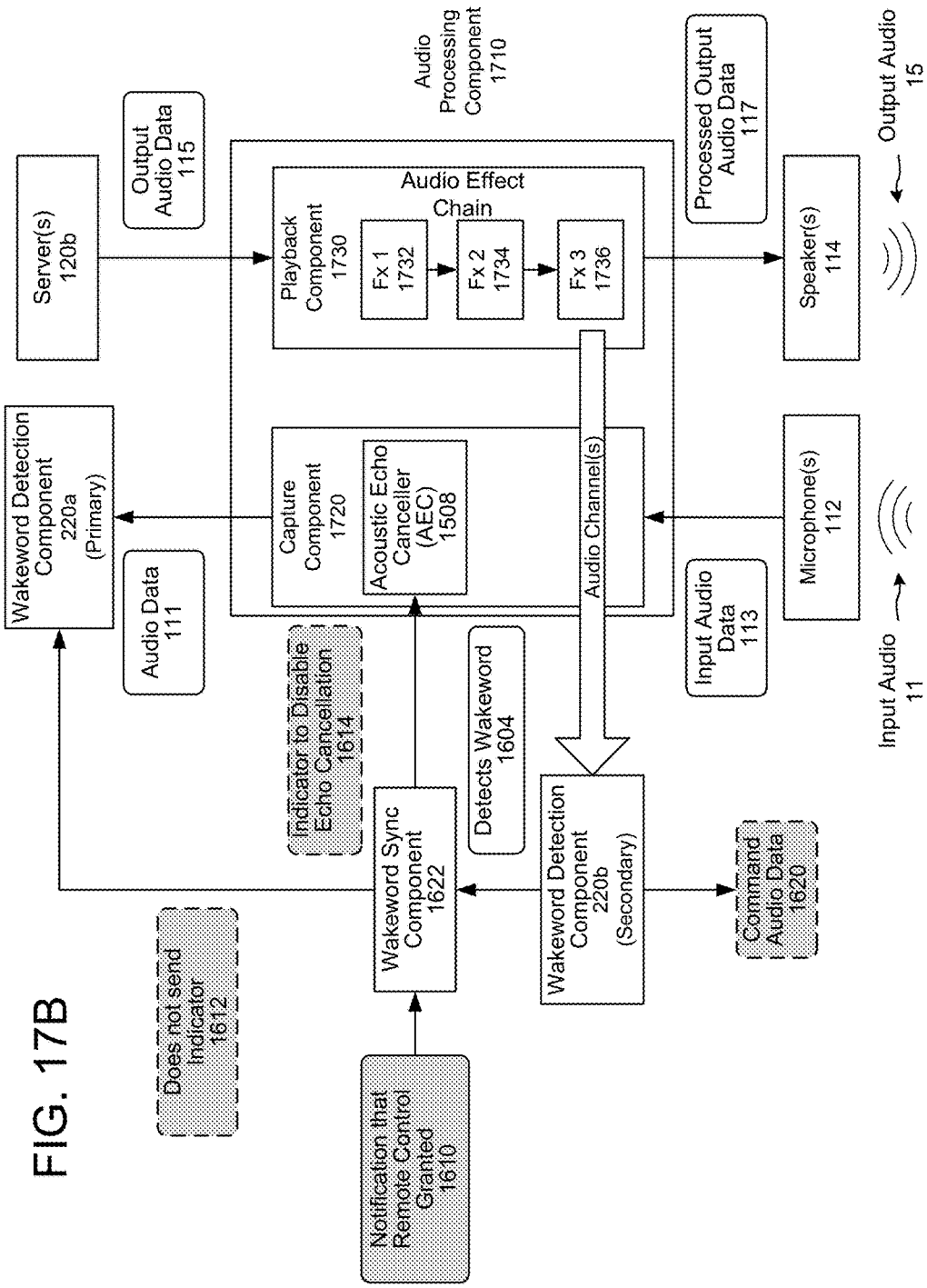

FIGS. 17A-17B illustrate example component diagrams of an audio processing component according to examples of the present disclosure. The illustrated components may reside in the device 110, although the disclosure is not limited thereto and the components may reside in another device communicatively connected to the microphone(s) 112, the speaker(s) 114, and/or the device 110 without departing from the disclosure. The components may include an audio processing component 1722 to process audio data received from a remote device (e.g., server(s) 120a, server(s) 120b, etc.) and/or captured by the microphone(s) 112. The components may also include the primary wakeword detection component 220a configured to detect a wakeword that is uttered by a user 2 and represented in input audio data 113 captured by the microphone(s) 112. For example, the microphone(s) 112 may be configured to detect an utterance of the user 2 as audio waves and convert the audio waves (audio input 11) into the input audio data 113. The input audio data 113 comprises data corresponding audio waves in an environment around the microphone(s) 112, such as the wakeword and any audio waves (audio input 11) immediately following the wakeword corresponding to a command or request uttered by the user 2. The input audio data 113 may be processed by a capture component 1720 to generate audio data 111. For example, the AEC 1508 may perform AEC processing on the input audio data 113, as discussed above with regard to FIGS. 15A-15B. The primary wakeword detection component 220a may be configured determine if the wakeword is included in the input audio data 111. The primary wakeword detection component 220a determines wakeword appearance by processing (utilizing the processing methods described above herein) the incoming audio data 111 to detect a wakeword. As a result of the processing, and after determining that the input audio data 111 includes the wakeword, instructions/data corresponding to the input audio data 111 (e.g., a command from the server 120a after processing the utterance) may be transmitted to the server(s) 120a for processing.

During a communication session, the output audio data 115 may be received from the server(s) 120b and may be processed by a playback component 1730 to generate processed output audio data 117, which may be output by the speaker(s) 114 to generate output audio 15. However, the disclosure is not limited thereto and the output audio data 115 may be received from the server(s) 120a or any remote device and/or generated by the device 110.

The playback component 1730 may include an audio equalizer or similar component may, include a plurality of effect components (Fx 1 1732, Fx 2 1734, Fx 3 1736, and so on) that are configured to modify and/or manipulate audio data (output audio data 115) as the audio data passes through the plurality of effect components. Each one of the effect components may perform a unique function to be applied to the audio data. For example, a component may perform equalization, reverb, noise cancellation, noise suppression or any other functional effect on the audio data. Such effects may include treble boost (amplifying audio data, for example above 1 kHz), bass boost (amplifying audio data, for example, between 60-90 Hz, mid-range boost (amplifying audio data, for example between 400 Hz and 2.6 kHz), or a variety of known audio effects/functions. The effect components may also perform a function on the audio data wherein the audio data is not modified, but merely copied or passed through to another component of the playback component 1730 or passed to another component external to the playback component 1730. For example, after the audio data is manipulated through at least one effect component, the audio data may be copied and transmitted to one or more audio channels. The audio channel(s) may be monitored or accessed to determine its content or the identity of audio data present thereon. The audio channel may provide access to the output audio data 115 and/or processed output audio data 117 so it can be determined if the wakeword is included in the output audio data 115 without any framework level modifications to the output audio data 115.

The audio data processed by various system components may be in one of a plurality of formats. For example, audio data determined by the microphone(s) 112 may be in a first format, which may be the format the wakeword detection components 220 are configured to process. Output audio data 115 may be in a different format when it is sent to device 110. Thus, the audio processing component 1722 (e.g., capture component 1720 and/or playback component 1730) may also be configured to perform a plurality of operations to convert, sample, re-sample, or down-sample the audio data, or otherwise convert the audio data between formats. For example, the input audio data 113 may be in a first format (such as a 16 kHz monochannel format) and the output audio data 115 may be in a second format (such as a 44.1 kHz, five channel format). The input audio data 113 and/or the output audio data 115 may be sampled at a rate corresponding to 16 kHz and a mono-channel at 16 bits per sample, little endian format. Audio data may be stored in a memory of a computing device. Audio data in little endian format corresponds to storing the least significant byte of the audio data in the smallest address, as opposed to big endian format where the most significant byte of the audio data is stored in the smallest address. Other examples of processing may include storage, level compression, data compression, transmission, enhancement (e.g., equalization, filtering, noise cancellation, echo, or reverb addition or removal, etc.). However, the audio data may be sampled at other rates and at other quality metrics to satisfy the specifications of the described embodiments herein.

The components of the device 110 (e.g., speaker(s) 114, microphone(s) 112, primary wakeword detection component 220a, secondary wakeword detection component 220b, wakeword synchronization component 222, etc.) may reside at different locations throughout the system 100. A system 100 where the device components reside in locations external from the device 110 may be described as a distributed system. For example, the speaker(s) 114 may be a wireless speaker in communication with the device 110, but not physically located within a structure of the device 110. Similarly, the microphone(s) 112 may be a wireless microphone in communication with the device 110, but not physically located within a structure of the device 110. The same goes for each of the primary wakeword detection component 220a, secondary wakeword detection component 220b, and the wakeword synchronization component 1622, which may each be in communication with the device 110 but not physically located within the device 110. The flexibility of where each of these device components may be located may allow the distributed system 100 to be configured in an arrangement that satisfies the specifications of the invention.

As the input audio data 113 and the audio data 111 include similar audio data, the wakeword detection components 220 may process either the input audio data 113 or the audio data 111 without departing from the disclosure. For ease of explanation, the following description will refer to the wakeword detection components 220 processing the audio data 111, although the disclosure is not limited thereto. Similarly, as the output audio data 115 and the processed output audio data 117 include similar audio data, the wakeword detection components 220 may process either the output audio data 115 or the processed output audio data 117 without departing from the disclosure. For ease of explanation, the following description will refer to the wakeword detection components 220 processing the output audio data 115, although the disclosure is not limited thereto.

The secondary wakeword detection component 220b may perform processing on the output audio data 115 to determine if the output audio data 115 includes the wakeword. The audio processing component 1722 may be in communication with the secondary wakeword detection component 220b to detect a wakeword that is included in output audio data 115. The audio processing component 1722 may receive the output audio data 115 and perform multiple processing functions on the output audio data 115. The multiple processing functions may be executed by a playback component 1730, as described above. A copy of the output audio data 115 may be provided to an audio channel to separately determine if the wakeword is in the output audio data 115 before the output audio data 115 is output to the speaker(s) 114. Therefore, a wakeword presence determination is made before the output audio data 115 is sent to the speaker(s) 114 to generate the output audio 15. This allows the audio processing component 1722 to transmit the output audio data 115 to the secondary wakeword detection component 220b via the audio channel(s).

The secondary wakeword detection component 220b may detect the wakeword anywhere throughout the output audio data 115. For example, the wakeword may be detected in the beginning, middle or towards the end of the output audio data 115. The output audio data 115 may correspond to a sentence, song audio, song lyrics, news broadcast, or any other audio containing speech or words.

The audio processing component 1722/secondary wakeword detection component 220b may also determine during which time interval the wakeword exists in the result. For example, once it is determined that the wakeword is included in the resulting output audio data 115, the secondary wakeword detection component 220b may identify a time interval in which the wakeword appears. For example, the wakeword may be found at a first point corresponding to 3 seconds after the beginning of the output audio data and the wakeword may end at a second point corresponding to 4 seconds after the beginning of the output audio data (or 1 second after the first point of the output audio data). The wakeword may be found at any interval of time within a result comprising output audio data. The audio processing component 1722/secondary wakeword detection component 220b may also determine a number of times the wakeword exists in the result and also determine a corresponding time interval at which the wakeword is present. The audio processing component 1722 may delay the output of the output audio data to allow sufficient time for a determination to be made of whether or not the output audio data includes the wakeword.

Once a determination is made that the output audio data 115 includes a wakeword, the audio processing component 1722 may generate and send instructions to the primary wakeword detection component 220a to disable wakeword detection to avoid interruption of the output audio data 115 being broadcast from the speech-controlled device 110. Wakeword detection may be disabled by deactivating a microphone(s) 112 connected to the speech-controlled device 110, wherein the microphone(s) 112 may be configured to detect input audio 11 that may include a wakeword. Wakeword detection may also be disabled by executing instructions for the primary wakeword detection component 220a to not respond when a wakeword is identified in a stream of output audio data 115. It should be appreciated that disabling wakeword detection can be performed in a number of different ways, as long as the identified wakeword fails to interrupt the device when the wakeword is output from the speaker(s) 114 of the device 110.

To process the recording/captured wakewords and/or audible commands, the audio processing component 1722 may employ audio fingerprinting techniques and other speech/audio comparison techniques. For example, the audio processing component 1722 may use audio or acoustic fingerprinting techniques such as those described above. In this aspect, a digital summary of audio including an device generated wakeword and/or audible command may be generated based on frequency, intensity, time, and other parameters of potential instantiations of the wakeword. This digital summary may then be stored and compared to audio or acoustic fingerprints of incoming audio data to determine if the wakeword is detected.

The audio processing component 1722 (including the wakeword detection components 220) may use various wakeword/keyword detection techniques such as those described above using HMMs, GMMs, LVCSR, etc.

FIG. 17A illustrates normal operation of the secondary wakeword detection component 220b, in which the secondary wakeword detection component 220b detects the wakeword in the output audio data 115 (e.g., detects wakeword 1604) and the wakeword synchronization component 1622 sends an indicator to disable the primary wakeword detection component 220a (e.g., indicator to ignore incoming wakeword 1606). In contrast, FIG. 17B illustrates operation of the secondary wakeword detection component 220b and/or the wakeword synchronization component 1622 when remote control is granted. For example, the device 110 may receive a notification that remote control is granted from the server(s) 120a (e.g., notification that remote control granted 1610) and the secondary wakeword detection component and/or the wakeword synchronization component 1622 may perform various functionality to enable the device 110 to detect the wakeword represented in the output audio data 115.

In some examples, the secondary wakeword detection component 220b and/or the wakeword synchronization component 1622 may be disabled, such that the wakeword synchronization component 1622 does not send an indicator of the wakeword being detected in the output audio data 115 (e.g., does not send indicator 1612) to the primary wakeword detection component 220a. Thus, the primary wakeword detection component 220a is not disabled and the device 110 may detect the wakeword represented in the audio data 111. Additionally or alternatively, the wakeword synchronization component 1622 may send an indicator to the AEC 1508 (e.g., indicator to disable echo cancellation 1614) that disables the AEC 1508 upon detection of the wakeword in the output audio data 115. Thus, the AEC 1508 is temporarily disabled and the primary wakeword detection component 220a may detect the wakeword represented in the audio data 111. In some examples, the secondary wakeword detection component 220b may generate audio data directly from the output audio data 115 (e.g., command audio data 1620) upon detecting the wakeword in the output audio data 115. Thus, the device 110 may send the command audio data 1620 to the server(s) 120a for speech processing.

Figure 18A:
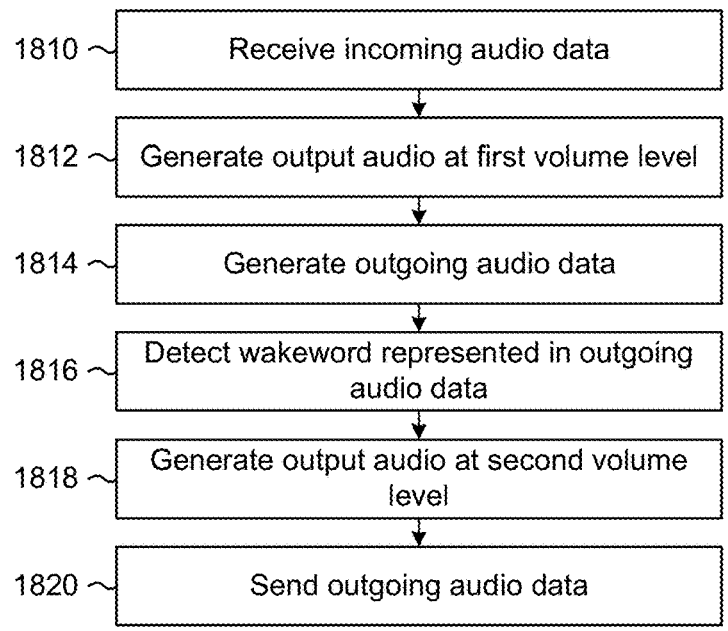
FIGS. 18A-18B are flowcharts conceptually illustrating an example method for controlling a volume level of output audio according to examples of the present disclosure.
Figure 18B:
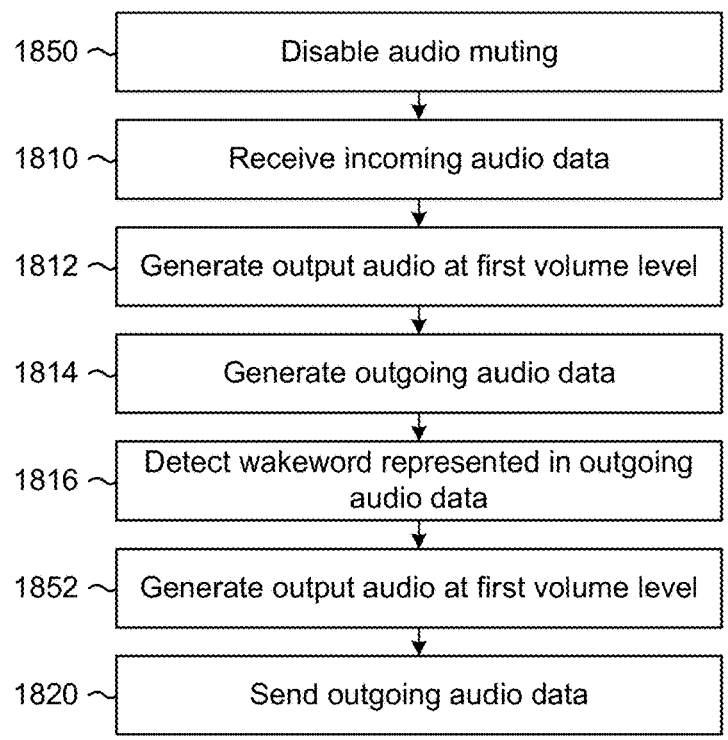

FIGS. 18A-18B are flowcharts conceptually illustrating an example method for controlling a volume level of output audio according to examples of the present disclosure. During normal operation, a device 110 may perform audio muting upon detecting a wakeword to reduce a volume level of outgoing audio in order to improve speech recognition of an incoming voice command. For example, the device 110 may play music or other audio over speakers at a first volume level before detecting a wakeword represented in an utterance from a user local to the device 110. Upon detecting the wakeword, the device 110 may play the music or other audio at a second volume level (e.g., lower volume level) in order to capture the utterance with less noise or distortion caused by the music or other audio. Performing the audio muting may improve speech recognition of the incoming voice command by the server(s) 120a.

As illustrated in FIG. 18A, during normal operation the device 110 may receive (1810) incoming audio data (e.g., music, telephone conversation, etc.) and may generate (1812) output audio corresponding to the incoming audio data at a first volume level using one or more speakers. While generating the output audio, the device 110 may generate (1814) outgoing audio data using one or more microphones and may detect (1816) a wakeword represented in outgoing audio data. For example, the device 110 may capture audio corresponding to the voice command. In order to improve speech recognition of the voice command, the device 110 may perform audio muting and may generate (1818) the output audio at a second volume level that is lower than the first volume level. The device 110 may then send (1820) the outgoing audio data to the server(s) 120a with less distortion or interference caused by the output audio.

While audio muting improves speech recognition for local voice commands (e.g., originating from users in proximity to the device 110), audio muting negatively affects speech recognition for remote voice commands included in the incoming audio data (e.g., originating from a remote device). For example, after detecting the wakeword the device 110 would decrease the volume level of the output audio, thereby decreasing a volume level of the voice command. In order to improve speech recognition for remote voice commands, the device 110 may disable the audio muting during a remote control session. As a result, the device 110 may generate the output audio at a consistent volume level even after detecting a wakeword.

As illustrated in FIG. 18B, the device 110 (e.g., "callee device," such as the second device 110b) may disable (1850) audio muting. For example, the device 110 may receive a command to disable audio muting from a user (e.g., external button, secondary wakeword, etc.), an instruction to disable audio muting from the server(s) 120a, an indication that the device 110 is included in a remote control session as a callee device (e.g., first user profile associated with the first device 110*a* is granted remote control to second user profile associated with the second device 110*b*), and/or the like.

While audio muting is disabled, the device 110 may receive (1810) the incoming audio data (e.g., telephone conversation, etc.) and may generate (1812) the output audio corresponding to the incoming audio data at the first volume level using the one or more speakers. While generating the output audio, the device 110 may generate (1814) the outgoing audio data using the one or more microphones and may detect (1816) the wakeword represented in the outgoing audio data. As audio muting is disabled, however, the device 110 may generate (1852) the output audio at the first volume level despite detecting the wakeword, such that the outgoing audio data corresponds to the incoming audio data without a decrease in volume level. The device 110 may then send (1820) the outgoing audio data corresponding to the remote voice command to the server(s) 120*a*.

Figure 19B:
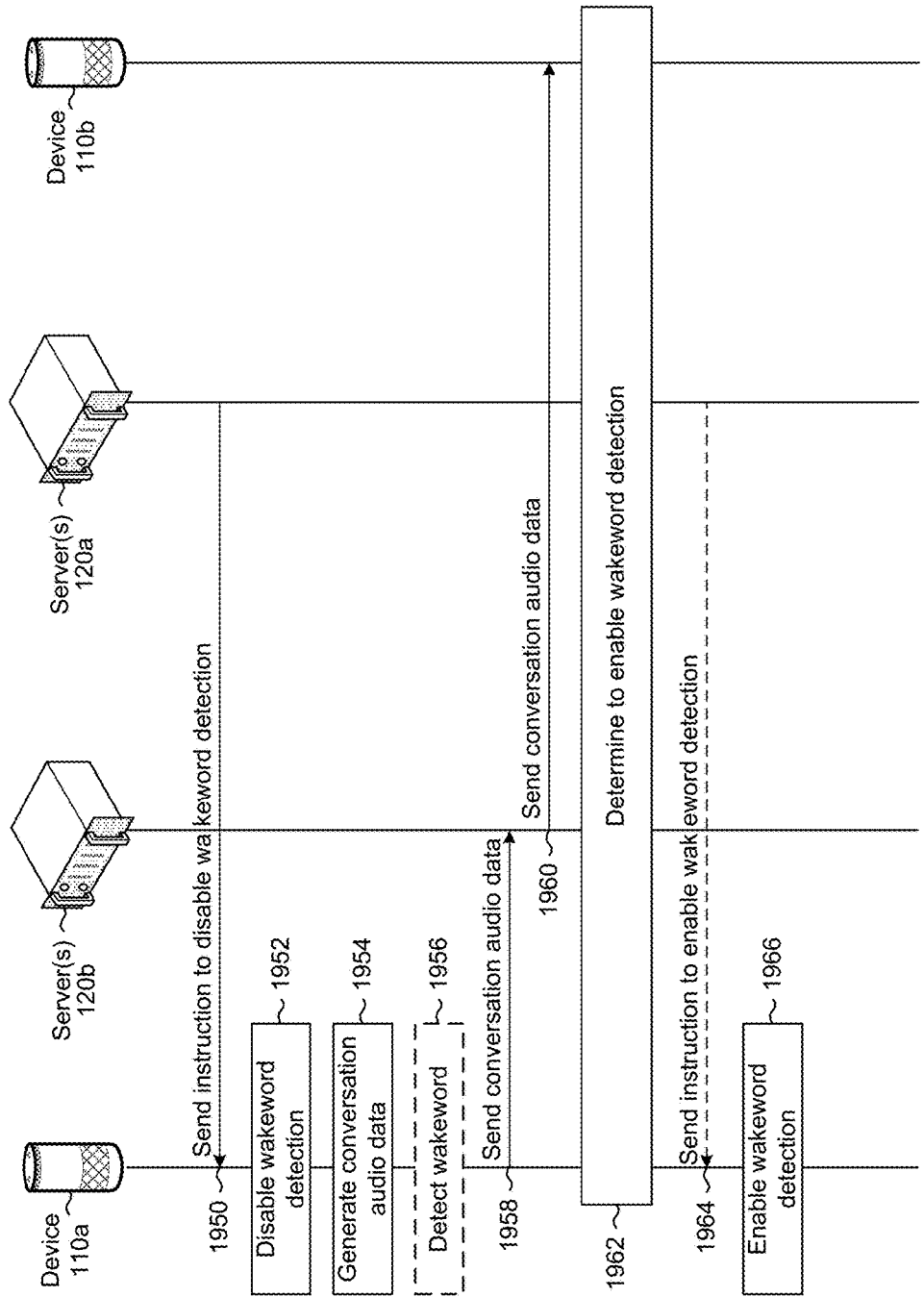

FIGS. 19A-19C are communication diagrams conceptually illustrating example methods of disabling and enabling wakeword detection according to examples of the present disclosure. While FIGS. 16A-17B described wakeword detection performed by the second device 110*b* (e.g., callee device), FIGS. 19A-19C describe wakeword detection performed by the first device 110*a* (e.g., caller device).

During normal operation the first device 110*a* may detect a wakeword during a communication session (e.g., telephone conversation) and send audio data corresponding to the wakeword to the server(s) 120*a* separate from the communication session. For example, a user of the first device 110*a* may input a voice command to the first device 110*a* during the communication session (e.g., "Alexa, what is the weather") and the first device 110*a* may send the voice command to the server(s) 120*a* for further processing, without interrupting the communication session or sending the voice command to the second device 110*b*.

As illustrated in FIG. 19A, the first device 110*a* may generate (1910) conversation audio data during a communication session and may send (1912) the conversation audio data to the server(s) 120*b* and the server(s) 120*b* may send (1914) the conversation audio data to the second device 110*b*. The first device 110*a* may detect (1916) a wakeword represented in the conversation audio data and may generate (1918) command audio data including a portion of the conversation audio data following the wakeword. Thus, the first device 110*a* may separate the wakeword and following voice command from the conversation audio data and may send (1920) the command audio data to the server(s) 120*a*. The server(s) 120*a* may determine (1922) a voice command represented in the command audio data and initiate (1924) the voice command.

In some examples of enabling remote control, during a remote control session the wakeword and following voice command are intended for the second device 110*b* and should be included in the conversation audio data. Therefore, the first device 110*a* may disable wakeword detection in order to enable the second device 110*b* to receive the wakeword and corresponding voice command. Wakeword detection may be disabled by disabling a wakeword detection component 220 and/or ignoring output from the wakeword detection component. Thus, in some examples the wakeword detection component 220 continues to detect wakewords despite wakeword detection being disabled.

As illustrated in FIG. 19B, the server(s) 120*a* may send (1950) an instruction to disable wakeword detection to the first device 110*a* and the first device 110*a* may disable (1952) the wakeword detection. For example, the server(s) 120*a* may determine that the first user profile and/or the first device 110*a* is granted remote control of the second user profile and may send the instruction to disable the wakeword detection to begin the remote control session. However, while FIG. 19B illustrates the server(s) 120*a* sending an explicit instruction to the first device 110*a* in order to disable wakeword detection, the disclosure is not limited thereto and the first device 110 may determine to disable wakeword detection without an explicit instruction. For example, the server(s) 120*a* may send an indication that the first device 110*a* is a caller device in a remote control session or the like. Thus, the server(s) 120*a* may not send an explicit instruction to disable the wakeword detection but the first device 110*a* may disable the wakeword detection during the remote control session.

As a result of disabling wakeword detection, the first device 110*a* may generate (1954) conversation audio data, may optionally detect (1956) the wakeword represented in the conversation audio data and may send (1958) the conversation audio data to the server(s) 120*b* and the server(s) 120*b* may send the conversation audio data to the second device 110*b*. Thus, the first device 110*a* does not generate command audio data despite the wakeword being represented in the conversation audio data, such that the conversation audio data includes the wakeword and corresponding voice command. In some examples, the wakeword detection component 220 is disabled and the first device 110*a* does not detect the wakeword in step 1956. In other examples, the wakeword detection component 220 is not disabled and detects the wakeword in step 1956, but the output of the wakeword detection component 220 is ignored.

While the wakeword detection is disabled, the first device 110*a* is unable to capture and/or execute voice commands. Therefore, after the remote control session ends, the wakeword detection must be enabled. As illustrated in FIG. 19B, the system 100 may determine (1962) to enable wakeword detection, the server(s) 120*a* may optionally send (1964) an instruction to enable the wakeword detection and the first device 110*a* may enable (1966) the wakeword detection.

FIG. 19C illustrates example methods of determining to enable wakeword detection. In some examples, the first device 110*a* may determine to enable wakeword detection and may enable the wakeword detection without receiving an instruction from the server(s) 120*a*. Additionally or alternatively, the server(s) 120*a* may determine to enable the wakeword detection and may send the instruction to enable the wakeword detection to the first device 110*a*.

As illustrated in FIG. 19C, the system 100 may receive (1962*a*) a physical input to end the remote control session, such as a button press on the first device 110*a* and/or the second device 110*b*. If received by the second device 110*b*, the second device 110*b* may send an indication of the remote control session ending and/or a command to end the remote control session to the server(s) 120*a* and the server(s) 120*a* may send an instruction to enable the wakeword detection to the first device 110*a*.

In some examples, the first device 110*a* may detect (1962*b*) a secondary wakeword that corresponds to a command to enable wakeword detection. For example, the wakeword detection component 220 may be enabled during the remote control session and the first device 110*a* may ignore a first wakeword (e.g., primary wakeword associated with voice commands) until detecting a second wakeword (e.g., secondary wakeword indicating that wakeword detection should be enabled). In some examples, detecting the secondary wakeword may result in the remote control session ending (e.g., the first device 110*a* may send an indication of the remote control session ending and/or a command to end the remote control session to the server(s) 120*a*). However, the disclosure is not limited thereto, and the first device 110*a* may be configured to enable wakeword detection during the remote control session in order to input a local voice command. For example, the first device 110*a* may detect the secondary wakeword and enable wakeword detection, detect the wakeword and execute a voice command corresponding to the wakeword, then disable wakeword detection. Thus, the user may control the first device 110*a* without interrupting the remote control session. In some examples, the first device 110*a* may enable wakeword detection until detecting the secondary wakeword a second time, such that the user may control the first device 110*a* using multiple voice commands before disabling wakeword detection.

While the above example describes the secondary wakeword enabling and/or disabling wakeword detection, the disclosure is not limited thereto. The user may instead input local voice commands to the first device 110*a* using the secondary wakeword without departing from the disclosure. For example, during the remote control session the primary wakeword may correspond to voice commands associated with the second device 110*b* but the secondary wakeword may correspond to voice commands associated with the first device 110*a*.

In some examples, the system 100 may determine (1962*c*) that a timer associated with the remote control session expires. For example, the first device 110*a*, the second device 110*b* and/or the server(s) 120*a* may determine that the timer has expired and the system 100 may end the remote control session. As part of ending the remote control session, the server(s) 120*a* may optionally send an instruction to the first device 110*a* to enable wakeword detection and/or the first device 110*a* may enable wakeword detection. For example, the first device 110*a* may enable wakeword detection upon the timer expiring without receiving an explicit instruction from the server(s) 120*a*, although the disclosure is not limited thereto.

In some examples, the system 100 may determine (1962*d*) that a communication session associated with the remote control session ends. For example, the first device 110*a*, the second device 110*b* and/or the server(s) 120*a* may determine that the communication session ended and the system 100 may end the remote control session. As part of ending the remote control session, the server(s) 120*a* may optionally send an instruction to the first device 110*a* to enable wakeword detection and/or the first device 110*a* may enable wakeword detection. For example, the first device 110*a* may enable wakeword detection upon the communication session ending without receiving an explicit instruction from the server(s) 120*a*, although the disclosure is not limited thereto.

In some examples, the system 100 may receive (1962*e*) a voice command instruction the system 100 to end the remote control session. For example, the server(s) 120*a* may receive a voice command from the second device 110*b* instructing the server(s) 120*a* to end the remote control session. While the voice command may originate from the second device 110*b* (e.g., a second user in proximity to the second device 110*b*) and/or the first device 110*a* (e.g., a first user in proximity to the first device 110*a*), the server(s) 120*a* may receive the voice command from the second device 110*b* as a result of the remote control session.

While FIGS. 19B-19C illustrate the first device 110*a* disabling wakeword detection, the disclosure is not limited thereto. Instead, the server(s) 120*a* may track (e.g., set a flag, store an association, store an indicator or the like) which device is the caller device (e.g., first device 110*a*) and which device is the callee device (e.g., second device 110*b*) and may ignore voice commands originating from the caller device. For example, the server(s) 120*a* may receive identical voice commands from the first device 110*a* and the second device 110*b*, may determine that the first device 110*a* is the caller device and may ignore the request associated with the first device 110*a*. Thus, instead of disabling wakeword detection on the first device 110*a*, both the first device 110*a* and the second device 110*b* may detect the same wakeword and the server(s) 120*a* may selectively ignore voice commands received from the first device 110*a*.

Figure 20B:
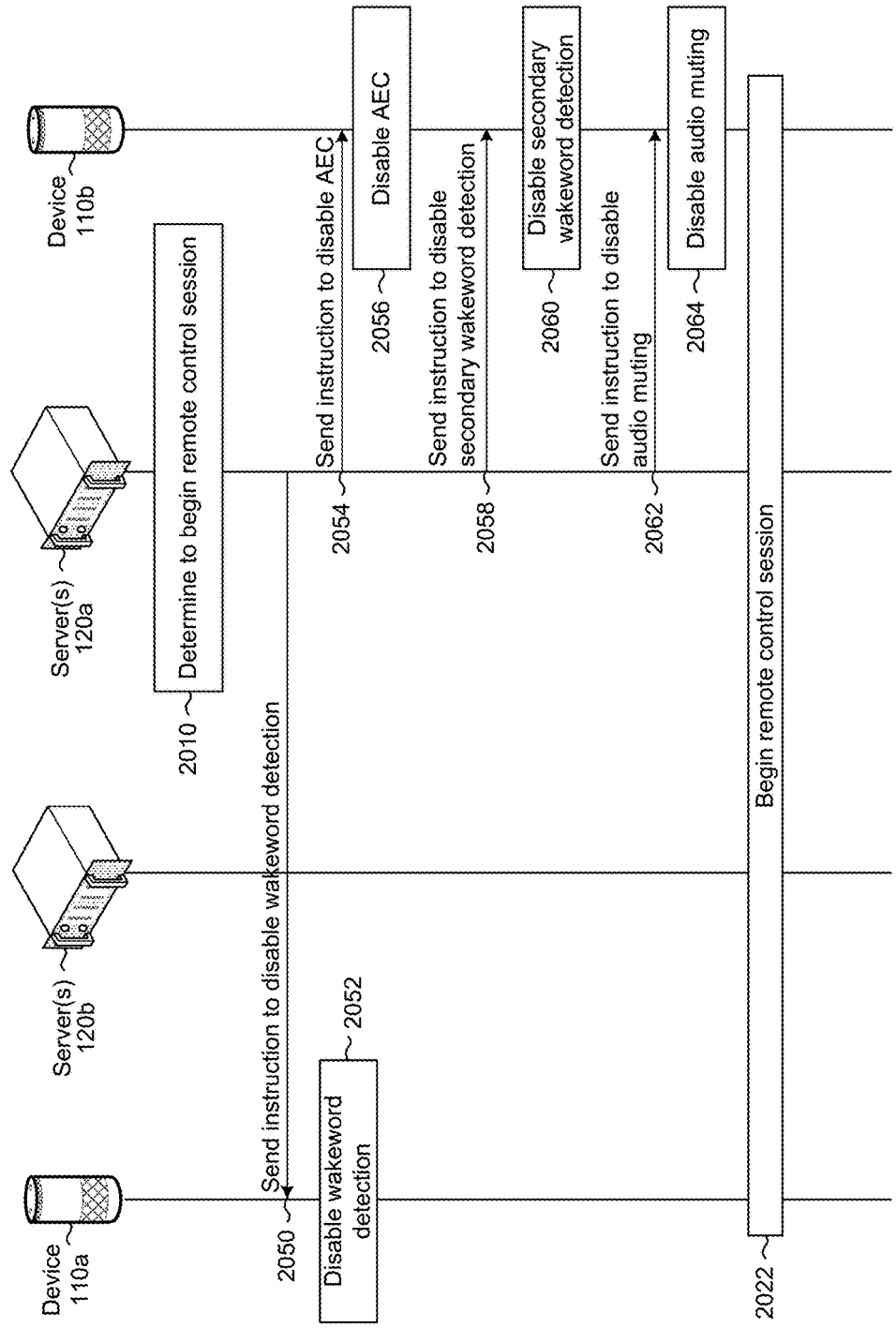

FIGS. 20A-20C are communication diagrams conceptually illustrating example methods of beginning and ending remote control sessions according to examples of the present disclosure. FIG. 20A illustrates examples of the server(s) 120*a* sending a single instruction to begin and end the remote control session and the first device 110*a* and the second device 110*b* performing one or more steps in response to the instruction. For example, the server(s) 120*a* may send a single instruction to the second device 110*b* to begin the remote control session and the second device 110*b* may disable Acoustic Echo Cancellation (AEC), disable secondary wakeword detection and/or disable audio muting. Additionally or alternatively, FIGS. 20B-20C illustrate examples of the server(s) 120*a* sending specific instructions to disable and/or enable wakeword detection, AEC, secondary wakeword detection, and/or audio muting. Thus, the server(s) 120*a* may determine which of the first device 110*a* and the second device 110*b* is the caller device and the callee device (e.g., caller device controls the callee device during the remote control session) and may send appropriate instructions.

As illustrated in FIG. 20A, the server(s) 120*a* may determine (2010) to begin a remote control session. For example, the server(s) 120*a* may determine that a first user profile associated with the first device 110*a* is granted remote control to the second user profile associated with the second device 110*b*. In some examples, the server(s) 120*a* may determine to begin the remote control session based on audio data (e.g., voice command from the second device 110*b*), although the disclosure is not limited thereto. Instead, the server(s) 120*a* may receive a command to begin the remote control session from other devices associated with the second user profile without departing from the disclosure. For example, the server(s) 120*a* may receive an explicit instruction via a user interface (e.g., user interface associated with the second device 110*b* or another device associated with the second user profile), may receive a textual command (e.g., text message including text data from a device associated with the second user profile), or the like.

While many of the drawings and corresponding description refer to the server(s) 120*a* receiving voice commands, the disclosure is not limited thereto and the system 100 may process textual commands without departing from the disclosure. To process a textual command, the server(s) 120*a* may skip automatic speech recognition (ASR) and perform natural language understanding (NLU) on the textual command itself. Thus, the system 100 may enable remote control of the second user profile in response to voice commands, explicit instructions via user interfaces, textual commands and/or the like and during the remote control session the server(s) 120*a* may execute commands that correspond to voice commands, textual commands or any combination thereof.

After determining to begin the remote control session, the server(s) 120*a* may send (2012) an instruction to begin the remote control session to the first device 110*a* and the first device 110*a* may disable (2014) wakeword detection. For example, the instruction may specify that the first device 110*a* is a caller device and the first device 110*a* may perform one or more steps associated with being the caller device. The server(s) 120*a* may also send (2014) an instruction to begin the remote control session to the second device 110*b* and the second device 110*b* may disable (2016) AEC, disable (2018) secondary wakeword detection and/or disable (2020) audio muting. For example, the instruction may specify that the second device 110*b* is a callee device and the second device 110*b* may perform one or more steps associated with being the callee device. While FIG. 20A illustrates the second device 110*b* disabling each of AEC, secondary wakeword detection and audio muting, the disclosure is not limited thereto and the second device 110*b* may disable any combination thereof without departing from the disclosure.

The system 100 may begin (2022) the remote control session and may enable the first device 110*a* to control the second user profile associated with the second device 110*b*. For example, voice commands originating from the first device 110*a* may be sent to the server(s) 120*a* as though they originated from the second device 110*b*. As discussed in greater detail above with regard to FIG. 19C, the server(s) 120*a* may determine (2024) to end the remote control session. For example, the system 100 may receive a physical input to end the remote control session (e.g., physical input received by the first device 110*a* and/or the second device 110*b* instructing the system 100 to send a command to the server(s) 120*a* to end the remote control session), may detect a secondary wakeword (e.g., by the first device 110*a*) corresponding to a command to end the remote control session, may determine that a timer associated with the remote control session has expired, may determine that a communication session ended (e.g., the first device 110*a* and/or the second device 110*b* sent a command to end the communication session and/or disconnected from the communication session), may receive a voice command to end the remote control session (e.g., by the second device 110*b*, originating from the first device 110*a* and/or the second device 110*b*), or the like.

After determining to end the remote control session, the server(s) 120*a* may send (2026) an instruction to end the remote control session to the first device 110*a* and the first device 110*a* may enable (2028) wakeword detection. For example, the instruction may specify that the first device 110*a* is the caller device and the first device 110*a* may perform one or more steps associated with being the caller device. The server(s) 120*a* may also send (2030) an instruction to end the remote control session to the second device 110*b* and the second device 110*b* may enable (2032) AEC, enable (2034) secondary wakeword detection and/or enable (2036) audio muting. For example, the instruction may specify that the second device 110*b* is a callee device and the second device 110*b* may perform one or more steps associated with being the callee device. While FIG. 20A illustrates the second device 110*b* enabling each of AEC, secondary wakeword detection and audio muting, the disclosure is not limited thereto and the second device 110*b* may enable any combination thereof without departing from the disclosure.

While FIG. 20A illustrates the server(s) 120*a* sending a single instruction to the first device 110*a* and a single instruction to the second device 110*b* to begin/end the remote control session, the disclosure is not limited thereto. Instead, the server(s) 120*a* may selectively control each of the steps involved in enabling the remote control session. For example, FIG. 20B illustrates examples of the server(s) 120*a* sending specific instructions to disable wakeword detection, AEC, secondary wakeword detection, and/or audio muting, while FIG. 20C illustrates examples of the server(s) 120*a* sending specific instructions to enable wakeword detection, AEC, secondary wakeword detection, and/or audio muting.

As illustrated in FIG. 20B, the server(s) 120*a* may determine (2010) to begin the remote control session and may send (2050) an instruction to disable wakeword detection to the first device 110*a* and the first device 110*a* may disable (2052) the wakeword detection. The server(s) 120*a* may send (2054) an instruction to disable AEC to the second device 110*b* and the second device 110*b* may disable (2056) the AEC. The server(s) 120*a* may send (2058) an instruction to disable the secondary wakeword detection to the second device 110*b* and the second device 110*b* may disable (2060) the secondary wakeword detection. Additionally or alternatively, the server(s) 120*a* may send (2062) an instruction to disable the audio muting to the second device 110*b* and the second device 110*b* may disable (2064) the audio muting. While FIG. 20B illustrates the second device 110*b* disabling each of AEC, secondary wakeword detection and audio muting, the disclosure is not limited thereto and the second device 110*b* may disable any combination thereof without departing from the disclosure. As a result, the system 100 may begin (2022) the remote control session.

As illustrated in FIG. 20C, the server(s) 120*a* may determine (2024) to end the remote control session and may send (2070) an instruction to enable wakeword detection to the first device 110*a* and the first device 110*a* may enable (2072) the wakeword detection. The server(s) 120*a* may send (2074) an instruction to enable AEC to the second device 110*b* and the second device 110*b* may enable (2076) the AEC. The server(s) 120*a* may send (2078) an instruction to enable the secondary wakeword detection to the second device 110*b* and the second device 110*b* may enable (2080) the secondary wakeword detection. Additionally or alternatively, the server(s) 120*a* may send (2082) an instruction to enable the audio muting to the second device 110*b* and the second device 110*b* may enable (2084) the audio muting. While FIG. 20C illustrates the second device 110*b* enabling each of AEC, secondary wakeword detection and audio muting, the disclosure is not limited thereto and the second device 110*b* may enable any combination thereof without departing from the disclosure.

While many of the drawings and corresponding description refer to enabling remote control during a communication session, the disclosure is not limited thereto. Instead, the system 100 may enable remote control during an asynchronous communication session and/or enable an asynchronous remote control session without departing from the disclosure. For example, the system 100 may receive a command to grant remote control of the second user profile to the first user profile at a first time and may receive a command from the first user profile to control the second user profile at a second time. In some examples, the system 100 may execute the command as it is received (e.g., at the second time), allowing the first user profile to control the second user profile without acknowledgement and/or confirmation from the second user profile. However, the disclosure is not limited thereto and in some examples, the system 100 may receive the command from the first user profile at the second time but may request acknowledgement and/or confirmation (e.g., an explicit acceptance command) from the second user profile before executing the command at a third time. The system 100 may receive the command from the first user profile as a voice command (e.g., audio data corresponding to the voice command), a textual command (e.g., text message including text data corresponding to the command), an explicit instruction via a user interface, or the like.

FIG. 21 is a communication diagram conceptually illustrating an example method for enabling asynchronous remote control according to examples of the present disclosure. As illustrated in FIG. 21, the server(s) 120a may determine (2110) that the first user profile is granted remote control to the second user profile and may send (2112) a notification of remote control being granted to the first device 110a. The first device 110a may receive (2114) a command from a user (e.g., generate audio data corresponding to a voice command, generate an explicit instruction using a user interface, and/or generate a text data corresponding to a textual command) and may send (2116) the command to the server(s) 120a.

The server(s) 120a may determine (2118) the command and may send (2120) a notification of the command to the second device 110b. The second device 110b may output (2122) audio indicating the command, may generate (2124) audio data corresponding to an utterance, detect (2126) a wakeword represented in the audio data and may send (2128) the audio data to the server(s) 120a. For example, the second device 110b may generate the audio using one or more speakers and receive an acceptance command using one or more microphones. The server(s) 120a may determine (2130) that the audio data authorizes execution of the command and may initiate (2132) the command based on the second user profile.

While FIG. 21 illustrates the server(s) 120a receiving audio data corresponding to an acceptance command from the second device 110b, the disclosure is not limited thereto. Instead, the system 100 may enable remote control via text messages, such that the first device 110a sends the command to the server(s) 120a via text message and/or the second device 110b sends an acceptance command to the server(s) 120a via text message without departing from the disclosure.

To illustrate an example, a second user associated with the second device 110b may input a command (e.g., "Alexa, allow Alice to turn on privacy mode") and the server(s) 120a may process the command and determine that the second user is granting remote control to the first user (e.g., Alice). The system 100 may send a notification to the first device 110a and the first user may input a command (e.g., "Alexa, enable privacy mode") to the first device 110a. The server(s) 120a may process the command, but prior to executing the command, may send a notification to the second device 110b of the command. The second device 110b may prompt the second user to accept the command (e.g., "Do you want to enable privacy mode?") and the second user may input an acceptance command (e.g., "Yes.") confirming that the second user would like the system 100 to execute the command.

In some examples, the system 100 may differentiate between multiple users associated with the second user profile. For example, if the second user granted remote control to the first user profile, the system 100 would not request an acceptance command from a third user. As an example, if the second device 110b detects the third user after receiving the notification, the system 100 would not execute the command or prompt the third user to accept the command. Instead, the second device 110b would wait until the second device 110b detects the second user, at which point the second device 110b may prompt the second user to input the acceptance command.

Figure 22C:
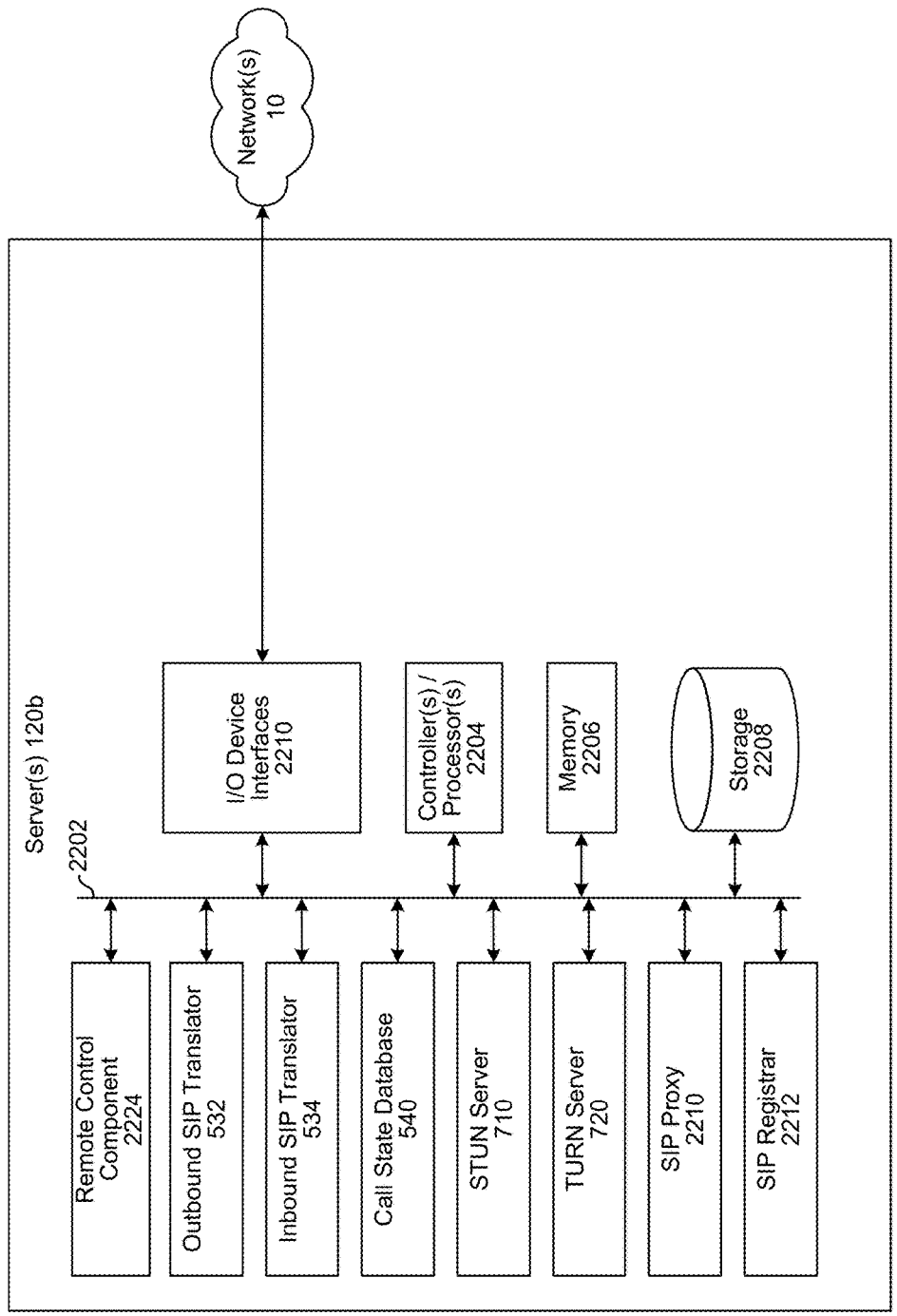

FIGS. 22A-22C are block diagrams conceptually illustrating example components of a system for enabling remote control for voice commands according to embodiments of the present disclosure. FIG. 22A is a block diagram conceptually illustrating a device 110 that may be used with the described system 100. FIG. 22B is a block diagram conceptually illustrating example components of a remote device, such as remote server(s) 120a that may assist with Automatic Speech Recognition (ASR), Natural Language Understanding (NLU) processing, command processing, generating and storing progress data and/or generating synthesized speech. Multiple such server(s) 120a may be included in the system, such as one server(s) 120a for ASR, one server(s) 120a for NLU, etc. FIG. 22C is a block diagram conceptually illustrating example components of a remote device, such as remote server(s) 120b that may assist with communication. Multiple such server(s) 120b may be included in the system 100.

In operation, the system 100 may include computer-readable and computer-executable instructions that reside on the device 110, server(s) 120a and/or the server(s) 120b, as will be discussed further below. The device 110 may be an electronic device capable of receiving incoming audio data, generating outgoing audio data, determining voice commands and/or generating synthesized speech. Examples of electronic devices may include audio devices (e.g., speech-controlled devices, telecommunications devices, etc.), computers (e.g., a desktop, a laptop, a server or the like), portable devices (e.g., a smart phone, tablet or the like), media devices (e.g., televisions, video game consoles, media components or the like) or the like. The device 110/server(s) 120a/server(s) 120b may also be a component of any of the abovementioned devices or systems.

As illustrated in FIGS. 22A-22C, the device 110/server(s) 120a/server(s) 120b may include an address/data bus 2202 for conveying data among components of the device 110/server(s) 120a/server(s) 120b. Each component within the device 110/server(s) 120a/server(s) 120b may also be directly connected to other components in addition to (or instead of) being connected to other components across the bus 2202.

The device 110/server(s) 120a/server(s) 120b may include one or more controllers/processors 2204, that may each include a central processing unit (CPU) for processing data and computer-readable instructions, and a memory 2206 for storing data and instructions. The memory 2206 may include volatile random access memory (RAM), non-volatile read only memory (ROM), non-volatile magnetoresistive (MRAM) and/or other types of memory. The device 110/server(s) 120a/server(s) 120b may also include a data storage component 2208, for storing data and controller/processor-executable instructions (e.g., instructions to perform the algorithm illustrated in FIGS. 1A, 1B, 11, 12, 13 and/or 14). The data storage component 2208 may include one or more non-volatile storage types such as magnetic storage, optical storage, solid-state storage, etc. The device 110/server(s) 120a/server(s) 120b may also be connected to removable or external non-volatile memory and/or storage (such as a removable memory card, memory key drive, networked storage, etc.) through the input/output device interfaces 2210.

The device 110/server(s) 120a/server(s) 120b includes input/output device interfaces 2210. A variety of components may be connected through the input/output device interfaces 2210. For example, the device 110 may be connected to a microphone(s) 112, speakers 114, and/or a display 116. However, the disclosure is not limited thereto and the device 110 may not include integrated microphone(s) 112, speakers 114, and/or display 116. Thus, the microphone(s) 112, speakers 114, display 116, and/or other components may be integrated into the device 110 or may be separate from the device 110 without departing from the disclosure. In some examples, the device 110 may include an inertial measurement unit (IMU), gyroscope, accelerometers or other component configured to provide motion data or the like associated with the device 110. If an array of microphones 112 is included, approximate distance to a sound's point of origin may be performed acoustic localization based on time and amplitude differences between sounds captured by different microphones of the array. The device 110 (using microphone 112, wakeword detection component 220, ASR component 250, etc.) may be configured to determine audio data corresponding to detected audio. The device 110 (using input/output device interfaces 2210, etc.) may also be configured to transmit the audio data to server(s) 120a for further processing or to process the data using internal components such as a wakeword detection component 220.

The input/output device interfaces 2210 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 2210 may also include an interface for an external peripheral device connection such as universal serial bus (USB), FireWire, Thunderbolt, Ethernet port or other connection protocol that may connect to network(s) 10. The input/output device interfaces 2210 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 and/or the server(s) 120a may include a wakeword detection component 220, an automatic speech recognition (ASR) 250, a natural language understanding (NLU) 260, a command processor 290 and/or a text-to-speech (TTS) component 314 as described above with regard to FIGS. 2-3.

The ASR component 250 in device 110 may be of limited or extended capabilities. The ASR component 250 may include the language models 254 stored in ASR model storage component 252, and an ASR component 250 that performs the automatic speech recognition process. If limited speech recognition is included, the ASR component 250 may be configured to identify a limited number of words, such as keywords detected by the device, whereas extended speech recognition may be configured to recognize a much larger range of words.

The device 110 and/or server(s) 120a may include a limited or extended NLU component 260. The NLU component in device 110 may be of limited or extended capabilities. The NLU component 260 may comprise the name entity recognition component 262, the intent classification component 264 and/or other components. The NLU component 260 may also include a stored knowledge base and/or entity library, or those storages may be separately located.

The device 110 and/or server(s) 120a may also include a command processor 290 that is configured to execute commands/functions associated with a spoken command as described above.

The device 110 may include a wakeword detection component 220, which may be a separate component or may be included in an ASR component 250. The wakeword detection component 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection component 220 receives captured audio and processes the audio (for example, using model(s) 232) to determine whether the audio corresponds to particular keywords recognizable by the device 110 and/or system 100. The storage 2208 may store data relating to keywords and functions to enable the wakeword detection component 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection component 220 may access the storage 2208 and compare the captured audio to the stored models and audio sequences using audio comparison, pattern recognition, keyword spotting, audio signature, and/or other audio processing techniques.

In some examples, the device 110 may not include the ASR 250, the NLU 260, the command processor 290 and/or the TTS component 314. Instead, the server(s) 120a may include these components and may receive audio input, perform ASR/NLU on the audio input to generate and store program data, determine a command and/or generate synthesized speech. Thus, the device 110 may receive data and/or instructions from the server(s) 120a to perform functionality associated with the ASR 250, the NLU 260, the command processor 290 and/or the TTS component 314. Additionally or alternatively, in some examples the server(s) 120a may not include the wakeword detection component 220.

The server(s) 120b may further include an outbound SIP translator 532, an inbound SIP translator 534, a call state database 540, a STUN server 710, a TURN server 720, a SIP proxy 2210 and/or a SIP Registrar 2212 as described above with regard to FIGS. 5-7. The SIP Proxy 2210 may be configured to signal communications endpoints (e.g., devices 110, adapter 22 and/or VoIP device 30) when establishing and/or maintaining a communication session. For example, when a communication session is acknowledged by an endpoint to establish the communication session, the SIP proxy 1110 may receive an answer request. The SIP Registrar 1112 may be a SIP endpoint that accepts REGISTER requests and records the address and other parameters from the user agent (e.g., device 110b). The SIP Registrar 1112 may provide a location service for subsequent requests. For example, the location service links one or more internet protocol (IP) addresses to the SIP uniform resource identifier (URI) of the registering agent. Multiple user agents may register for the same URI, with the result that all registered user agents receive the calls to the URI.

The device 110/server(s) 120a/server(s) 120b further include a remote access component 2224, which may comprise processor-executable instructions stored in storage 2208 to be executed by controller(s)/processor(s) 2204 (e.g., software, firmware, hardware, or some combination thereof). For example, components of the remote control component 2224 may be part of a software application running in the foreground and/or background on the device 110/server(s) 120a/server(s) 120b. The remote control component 2224 may control the device 110/server(s) 120a/server(s) 120b as discussed above, for example with regard to FIGS. 1A, 1B, 1I, 12, 13 and/or 14. Some or all of the controllers/components of the remote control component 2224 may be executable instructions that may be embedded in hardware or firmware in addition to, or instead of, software. In one embodiment, the device 110/server(s) 120a/server(s) 120b may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120a/server(s) 120b and its various components may be executed by the controller(s)/processor(s) 2204, using the memory 2206 as temporary "working" storage at runtime. The executable instructions may be stored in a non-transitory manner in non-volatile memory 2206, storage 2208, or an external device. Alternatively, some or all of the executable instructions may be embedded in hardware or firmware in addition to or instead of software.

The components of the device 110/server(s) 120a/server(s) 120b, as illustrated in FIGS. 22A-22C, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   generating, by a first speech-controlled device in a first environment, first audio data using one or more microphones;
   sending at least a portion of the first audio data to a second speech-controlled device in a second environment physically remote from the first environment, the first audio data corresponding to a communication from the first speech-controlled device to the second speech-controlled device;
   detecting that a wakeword is represented in the first audio data;
   generating second audio data including at least a portion of the first audio data following the wakeword, the second audio data corresponding to a first command to disable wakeword detection;
   sending the second audio data to a remote server;
   receiving, from the remote server in response to the first command, an instruction to disable wakeword detection;
   disabling the wakeword detection;
   generating, while the wakeword detection is disabled, third audio data corresponding to the communication from the first speech-controlled device to the second speech-controlled device and including a second command to perform a second action; and
   sending at least a portion of the third audio data to the second speech-controlled device.

2. The computer-implemented method of claim 1, further comprising:
   detecting, using a wakeword detection component, that the wakeword is represented in the third audio data;
   determining that the wakeword detection is disabled;
   determining to ignore the wakeword;
   detecting, using the wakeword detection component, that a second wakeword is represented in the third audio data, the second wakeword corresponding to a command to enable the wakeword detection; and
   enabling the wakeword detection.

3. The computer-implemented method of claim 1, further comprising, by the first speech-controlled device prior to receiving the instruction to disable the wakeword detection:
   detecting, using the wakeword detection, that a second wakeword is represented in the first audio data;
   generating fourth audio data including at least a portion of the first audio data following the second wakeword; and
   sending the fourth audio data to the remote server, the fourth audio data corresponding to a third command to perform a third action.

4. The computer-implemented method of claim 1, further comprising:
   receiving fourth audio data originating from the second speech-controlled device;
   outputting first audio corresponding to a first portion of the fourth audio data, the first audio having a first volume level;
   generating fifth audio data using the one or more microphones;
   detecting that the wakeword is represented in the fifth audio data;
   outputting second audio corresponding to a second portion of the fourth audio data, the second audio having a second volume level that is less than the first volume level;
   receiving a notification that the second speech-controlled device is granted remote control of the first speech-controlled device;
   receiving sixth audio data originating from the second speech-controlled device;
   outputting third audio corresponding to a first portion of the sixth audio data, the third audio having the first volume level;
   generating, using the one or more microphones, seventh audio data corresponding to at least a portion of the third audio;
   detecting that the wakeword is represented in the seventh audio data; and
   outputting fourth audio corresponding to a second portion of the sixth audio data, the fourth audio having the first volume level.

5. A computer-implemented method, comprising:
   generating, by a first device in a first environment, first audio data;
   sending at least a portion of the first audio data to a second device in a second environment physically remote from the first environment, the first audio data corresponding to a communication from the first device to the second device;
   detecting that a wakeword is represented in the first audio data;
   generating second audio data including at least a portion of the first audio data following the wakeword, the second audio data corresponding to a first command to disable wakeword detection;
   sending at least the second audio data to a remote server;
   receiving, from the remote server in response to the first command, an instruction to disable wakeword detection;
   disabling the wakeword detection;
   generating, while the wakeword detection is disabled, third audio data corresponding to the communication from the first device to the second device and including a second command to perform an action; and
   sending at least a portion of the third audio data to the second device.

6. The computer-implemented method of claim 5, further comprising, by the first device prior to receiving the instruction to disable the wakeword detection:
   detecting that the wakeword is represented in the first audio data;
   generating fourth audio data including at least a portion of the first audio data following the wakeword; and
   sending the fourth audio data to the remote server, the fourth audio data corresponding to a third command to perform a second action associated with a first user profile corresponding to the first device.

7. The computer-implemented method of claim 6, further comprising, by the first device prior to receiving the instruction to disable the wakeword detection:
   detecting that a second wakeword is represented in the first audio data, the second wakeword being different from the first wakeword;
   generating fifth audio data including at least a portion of the first audio data following the second wakeword; and
   sending the fifth audio data to the remote server, the fifth audio data corresponding to a fourth command to perform a third action associated with a second user profile corresponding to the second device.

8. The computer-implemented method of claim 5, further comprising:

receiving, from the remote server, a second instruction to enable the wakeword detection; and
enabling the wakeword detection.

9. The computer-implemented method of claim 5, further comprising:
detecting, using a wakeword detection component, that the wakeword is represented in the third audio data;
determining that the wakeword detection is disabled; and
determining to ignore the wakeword.

10. The computer-implemented method of claim 5, further comprising:
detecting, using a wakeword detection component, that a second wakeword is represented in the third audio data, the second wakeword different than the first wakeword and corresponding to a third command to enable the wakeword detection; and
enabling the wakeword detection.

11. The computer-implemented method of claim 5, further comprising, by the first device prior to receiving the instruction to disable the wakeword detection:
detecting that wakeword is represented in the first audio data;
generating fourth audio data including at least a portion of the first audio data following the wakeword; and
sending the fourth audio data to the remote server, the fourth audio data corresponding to a third command to perform a second action associated with a user profile corresponding to the second device.

12. The computer-implemented method of claim 5, further comprising:
receiving fourth audio data originating from the second device;
outputting first audio corresponding to a first portion of the fourth audio data, the first audio having a first volume level;
generating fifth audio data;
detecting that the wakeword is represented in the fifth audio data;
outputting second audio corresponding to a second portion of the fourth audio data, the second audio having a second volume level that is less than the first volume level;
receiving a notification that the second device is granted remote control of the user profile;
receiving sixth audio data originating from the second device;
outputting third audio corresponding to a first portion of the sixth audio data, the third audio having the first volume level;
generating seventh audio data corresponding to at least a portion of the sixth audio;
detecting that the wakeword is represented in the seventh audio data; and
outputting fourth audio corresponding to a second portion of the sixth audio data, the fourth audio having the first volume level.

13. The computer-implemented method of claim 5, wherein generating the third audio data further comprises:
capturing speech using at least one microphone associated with the first device, wherein the speech is generated by a user in the first environment.

14. The computer-implemented method of claim 5, wherein generating the third audio data further comprises:
generating, by the first device while the wakeword detection is disabled, the third audio data, wherein the third audio data corresponds to speech generated in the first environment.

15. A system comprising:
at least one processor; and
memory including instructions operable to be executed by the at least one processor to to cause the system to:
receive, by a first device in a first environment, from a remote server, an instruction to begin a remote control session between the first device and a second device in a second environment physically remote from the first environment;
disable wakeword detection in response to receiving the instruction to begin the remote control session;
generate, by the first device, first audio data;
send at least a portion of the first audio data to the second device, the first audio data corresponding to a communication from the first device to the second device;
generate, while the wakeword detection is disabled, second audio data corresponding to the communication from the first device to the second device and including a command to perform an action; and
send at least a portion of the second audio data to the second device.

16. The system of claim 15, wherein the memory further comprises instructions that, when executed by the at least one processor, further cause the first device to, prior to receiving the instruction to begin the remote control session:
generate third audio data;
detect that a wakeword is represented in the third audio data;
generate fourth audio data including at least a portion of the third audio data following the wakeword; and
send the fourth audio data to the remote server, the fourth audio data corresponding to a second command to perform a second action associated with a first user profile corresponding to the first device.

17. The system of claim 16, wherein the memory further comprises instructions that, when executed by the at least one processor, further cause the first device to, prior to receiving the instruction to begin the remote control session:
detect that a second wakeword is represented in the third audio data;
generate fifth audio data including at least a portion of the third audio data following the second wakeword; and
send the fifth audio data to the remote server, the fifth audio data corresponding to a third command to perform a third action associated with a second user profile corresponding to the second device.

18. The system of claim 15, wherein the memory further comprises instructions that, when executed by the at least one processor, further cause the first device to:
receive, from the remote server, a second instruction to end the remote control session; and
enable the wakeword detection.

19. The system of claim 15, wherein the memory further comprises instructions that, when executed by the at least one processor, further cause the first device to:
detect, using a wakeword detection component, that a wakeword is represented in the second audio data;
determine that the wakeword detection is disabled; and
determine to ignore the wakeword.

20. The system of claim 19, wherein the memory further comprises instructions that, when executed by the at least one processor, further cause the first device to:

detect, using the wakeword detection component, that a second wakeword is represented in the second audio data, the second wakeword corresponding to a command to enable the wakeword detection; and enable the wakeword detection.

21. The system of claim 15, wherein the memory further comprises instructions that, when executed by the at least one processor, further cause the first device to, prior to receiving the instruction to begin the remote control session:

generate third audio data;

detect that a wakeword is represented in the third audio data;

generate fourth audio data including at least a portion of the third audio data following the wakeword; and send the fourth audio data to the remote server, the fourth audio data corresponding to a second command to perform a second action associated with a user profile corresponding to the second device.

22. The system of claim 15, wherein the memory further comprises instructions that, when executed by the at least one processor, further cause the first device to:

receive third audio data originating from the second device;

output first audio corresponding to a first portion of the third audio data, the first audio having a first volume level;

generate fourth audio data;

detect that a wakeword is represented in the fourth audio data;

output second audio corresponding to a second portion of the third audio data, the second audio having a second volume level that is less than the first volume level;

receive a notification that the second device is granted remote control of the user profile;

receive fifth audio data originating from the second device;

output third audio corresponding to a first portion of the fifth audio data, the third audio having the first volume level;

generate sixth audio data corresponding to at least a portion of the fifth audio;

detect that the wakeword is represented in the sixth audio data; and output fourth audio corresponding to a second portion of the fifth audio data, the fourth audio having the first volume level.

23. A computer-implemented method, comprising:

generating, by a first device in a first environment, first audio data;

sending at least a portion of the first audio data to a second device in a second environment physically remote from the first environment, the first audio data corresponding to a communication from the first device to the second device;

receiving, from a remote server, an instruction to disable wakeword detection;

disabling the wakeword detection;

generating, while the wakeword detection is disabled, second audio data corresponding to the communication from the first device to the second device and including a command to perform an action;

sending at least a portion of the second audio data to the second device;

receiving, from the remote server, a second instruction to enable the wakeword detection; and enabling the wakeword detection.

* * * * *